(12) United States Patent
Haghighi et al.

(10) Patent No.: US 12,469,315 B2
(45) Date of Patent: Nov. 11, 2025

(54) SYSTEMS, METHODS, AND APPARATUSES FOR IMPLEMENTING TRANSFERABLE VISUAL WORDS BY EXPLOITING THE SEMANTICS OF ANATOMICAL PATTERNS FOR SELF-SUPERVISED LEARNING

(71) Applicant: Arizona Board of Regents on behalf of Arizona State University, Scottsdale, AZ (US)

(72) Inventors: Fatemeh Haghighi, Tempe, AZ (US); Mohammad Reza Hosseinzadeh Taher, Tempe, AZ (US); Zongwei Zhou, Tempe, AZ (US); Jianming Liang, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 599 days.

(21) Appl. No.: 17/676,134

(22) Filed: Feb. 19, 2022

(65) Prior Publication Data
US 2022/0309811 A1    Sep. 29, 2022

Related U.S. Application Data

(63) Continuation-in-part of application No. 17/246,032, filed on Apr. 30, 2021.
(Continued)

(51) Int. Cl.
*G06V 20/70* (2022.01)
*G06V 10/26* (2022.01)
(Continued)

(52) U.S. Cl.
CPC .............. *G06V 20/70* (2022.01); *G06V 10/26* (2022.01); *G06V 10/761* (2022.01);
(Continued)

(58) Field of Classification Search
CPC ...... G06V 20/70; G06V 10/761; G06V 10/82; G06V 10/26; G06V 10/774; G06V 10/764; G06V 2201/03
See application file for complete search history.

(56) References Cited

U.S. PATENT DOCUMENTS 8,204,842 B1    6/2012    Zhang et al.
9,811,765 B2    11/2017   Wang et al.
(Continued)

OTHER PUBLICATIONS

Chen et al., Self-supervised learning for medical image analysis using image context restoration, Jul. 2018, IEEE (Year: 2018).*
(Continued)

*Primary Examiner* — Wednel Cadeau
(74) *Attorney, Agent, or Firm* — Elliott, Ostrander & Preston, P.C.

(57) ABSTRACT

Described herein are means for the generation of Transferable Visual Word (TransVW) models through self-supervised learning in the absence of manual labeling, in which the trained TransVW models are then utilized for the processing of medical imaging. For instance, an exemplary system is specially configured to perform self-supervised learning for an AI model in the absence of manually labeled input, by performing the following operations: receiving medical images as input; performing a self-discovery operation of anatomical patterns by building a set of the anatomical patterns from the medical images received at the system; performing a self-classification operation of the anatomical patterns; performing a self-restoration operation of the anatomical patterns within cropped and transformed 2D patches or 3D cubes derived from the medical images received at the system by recovering original anatomical patterns to learn different sets of visual representation; and providing a semantics-enriched pre-trained AI model having a trained encoder-decoder structure with skip connections in between
(Continued)

based on the performance of the self-discovery operation, the self-classification operation, and the self-restoration operation. Other related embodiments are disclosed.

8 Claims, 41 Drawing Sheets

Related U.S. Application Data

(60) Provisional application No. 63/151,567, filed on Feb. 19, 2021, provisional application No. 63/110,265, filed on Nov. 5, 2020, provisional application No. 63/018,335, filed on Apr. 30, 2020.

(51) Int. Cl.
| | |
|---|---|
| *G06V 10/74* | (2022.01) |
| *G06V 10/764* | (2022.01) |
| *G06V 10/774* | (2022.01) |
| *G06V 10/82* | (2022.01) |

(52) U.S. Cl.
CPC .......... *G06V 10/764* (2022.01); *G06V 10/774* (2022.01); *G06V 10/82* (2022.01); *G06V 2201/03* (2022.01)

(56) References Cited

U.S. PATENT DOCUMENTS

| | | | | |
|---|---|---|---|---|
| 2018/0196873 | A1 | 7/2018 | Yerebakan et al. | |
| 2019/0057774 | A1 | 2/2019 | Velez et al. | |
| 2020/0069973 | A1* | 3/2020 | Lou .................. | G16H 30/20 |
| 2021/0319556 | A1* | 10/2021 | Chauhan ............ | G06T 7/0014 |
| 2021/0343014 | A1 | 11/2021 | Haghighi et al. | |
| 2022/0309811 | A1 | 9/2022 | Haghighi et al. | |

OTHER PUBLICATIONS

Notice of Allowance for U.S. Appl. No. 17/246,032, mailed Sep. 30, 2024, 16 pages.
Notice of Allowance for U.S. Appl. No. 17/246,032, mailed Nov. 25, 2024, 12 pages.
Raghu, M., et al., "Transfusion: Understanding Transfer Learning for Medical Imaging," arXiv preprint arXiv:1902.07208, 2019, 22 pages.
Ross, T. et al., "Exploiting the potential of unlabeled endoscopic video data with self-supervised learning," International Journal of Computer Assisted Radiology and Surgery 13, 2018, pp. 925-933.
Sabokrou, M. et al., "Self-Supervised Representation Learning via Neighborhood-Relational Encoding," In Proceedings of IEEE/CVF International Conference on Computer Vision, 2019, pp. 8010-8019.
Setio, A.A.A. et al., "Validation, comparison, and combination of algorithms for automatic detection of pulmonary nodules in computed tomography images: the LUNA16 challenge," Medical Image Analysis 42, 2017, pp. 1-13, https://doi.org/10.1016/j.media.2017.06.015.
Simonyan, K. et al., "Very Deep Convolutional Networks for Large-Scale Image Recognition," arXiv preprint arXiv:1409.1556, 2014.
Simpson, A.L. et al., "A large annotated medical image dataset for the development and evaluation of segmentation algorithms," arXiv preprint arXiv:1902.09063, 2019, 15 pages.
Sivic, J. et al., "Video google: a text retrieval approach to object matching in videos," Proceedings ninth IEEE international conference on computer vision, 2003, pp. 1470-1477, IEEE.
Taher, M.R.H., et al., "CAiD: A Self-supervised Learning Framework for Empowering Instance Discrimination in Medical Imaging," Proceedings of Machine Learning Research, 2022, 20 pages.
Tajbakhsh, N. et al., "Computer-aided Pulmonary Embolism Detection Using a Novel Vessel-aligned Multi-planar Image Representation and Convolutional Neural Networks," Medical Image Computing and Computer-Assisted Intervention—MICCAI 2015: 18th International Conference, Munich, Germany, Oct. 5-9, 2015, Proceedings, Part II 18, 2015, pp. 62-69, Springer International Publishing.
Tajbakhsh, N. et al., "Convolutional Neural Networks for Medical Image Analysis: Full Training or Fine Tuning?," IEEE Transactions on Medical Imaging, vol. 35, No. 5, May 2016, pp. 1299-1312.
Tajbakhsh, N. et al., "Embracing imperfect datasets: A review of deep learning solutions for medical image segmentation," Medical Image Analysis, 63, 2020, p. 101693, 30 pages.
Van Gansbeke, W., et al, "Scan: Learning to Classify Images Without Labels," European Conference on Computer Vision, 2020, pp. 268-285, Springer International Publishing.
Vincent, P. et al., "Extracting and Composing Robust Features with Denoising Autoencoders," In Proceedings of the 25th International Conference on Machine Learning, 2008, pp. 1096-1103.
Wang, H. et al., "Comparison of machine learning methods for classifying mediastinal lymph node metastasis of non-small cell lung cancer from 18 F-FDG PET/CT images," EJNMMI research 7(1), 2017, pp. 1-11.
Wang, X. et al., "ChestX-ray8: Hospital-scale Chest X-ray Database and Benchmarks on Weakly-Supervised Classification and Localization of Common Thorax Diseases," Proceedings of the IEEE Conference on Computer Vision and Pattern Recognition, 2017, pp. 3462-3471.
Wang, Y. et al., "E2-Train: Training State-of-the-Art CNNs with Over 80% Less Energy" Advances in Neural Information Processing Systems, 32, 2019, 13 pages.
Wu, B. et al., "Joint Learning for Pulmonary Nodule Segmentation, Attributes and Malignancy Prediction," In 2018 IEEE 15th International Symposium on Biomedical Imaging (ISBI 2018), 2018, pp. 1109-1113, IEEE.
Yan, X. et al., "ClusterFit: Improving Generalization of Visual Representations," In Proceedings of the IEEE/CVF Conference on Computer Vision and Pattern Recognition, 2020, pp. 6509-6518.
Yosinski, J. et al., "How transferable are features in deep neural networks?" Advances in Neural Information Processing Systems, 27 (NIPS 2014), arXiv preprint arXiv:1411.1792.
Yue-Hei Ng, J. et al., "Exploiting Local Features from Deep Networks for Image Retrieval," In Proceedings of IEEE Conference on Computer Vision and Pattern Recognition Workshops, 2015, pp. 53-61.
Zhan, X. et al., "Online Deep Clustering for Unsupervised Representation Learning," In Proceedings of IEEE/CVF Conference on Computer Vision and Pattern Recognition, 2020, pp. 6688-6697.
Zhang, L. et al., "AET vs. AED: Unsupervised Representation Learning by Auto-Encoding Transformations Rather than Data," Proceedings of the IEEE/CVF Conference on Computer Vision and Pattern Recognition, 2019, pp. 2542-2550.
Zhang, R. et al., "Colorful Image Colorization," In Computer Vision—ECCV 2016: 14th European Conference, Amsterdam, The Netherlands, Oct. 11-14, 2016, Proceedings, Part III 14, 2016, pp. 649-666, Springer International Publishing.
Zhou, Z. et al., "Fine-tuning Convolutional Neural Networks for Biomedical Image Analysis: Actively and Incrementally," In 30th IEEE Conference on Computer Vision and Pattern Recognition, CVPR 2017, pp. 4761-4772.
Zhou, Z. et al., "Models genesis," Medical Image Analysis, vol. 67, 2021, p. 101840, 23 pages.
Zhou, Z. et al., "Models Genesis: Generic Autodidactic Models for 3D Medical Image Analysis," Medical Image Computing and Computer Assisted Intervention—MICCAI 2019: 22nd International Conference, Shenzhen, China, Oct. 13-17, 2019, Proceedings, Part IV 22, 2019, Springer International Publishing, pp. 384-393.
Zhuang, X. et al., "Self-supervised Feature Learning for 3d Medical Images by Playing a Rubik's Cube," Medical Image Computing and Computer Assisted Intervention—MICCAI 2019: 22nd International Conference, Shenzhen, China, Oct. 13-17, 2019, Proceedings, Part IV 22, 2019, Springer International Publishing, 9 pages.
"SIIM-ACR Pneumothorax Segmentation" (Online) (2019), https://www.kaggle.com/c/siim-acr-pneumothorax-segmentation/, 26 pages.

(56) References Cited

OTHER PUBLICATIONS

Advisory Action for U.S. Appl. No. 17/246,032, dated May 6, 2024, 3 pages.
Alex, V. et al., "Semisupervised learning using denoising autoencoders for brain lesion detection and segmentation," Journal of Medical Imaging 4(4), 2017, 041311-041311.
Arandjelovic, R. et al., "NetVLAD: CNN architecture for weakly supervised place recognition," In Proceedings of the IEEE Conference on Computer Vision and Pattern Recognition, 2016, pp. 5297-5307.
Ardila, D. et al., "End-to-end lung cancer screening with three-dimensional deep learning on low-dose chest computed tomography," Nature Medicine 25(6), 2019, pp. 954-961.
Armato III, S.G. et al., "The lung image database consortium (LIDC) and image database resource initiative (IDRI): a completed reference database of lung nodules on CT scans," Medical Physics 38(2), 2011, pp. 915-931.
Bai, W. et al., "Self-Supervised Learning for Cardiac MR Image Segmentation by Anatomical Position Prediction," In Medical Image Computing and Computer Assisted Intervention—MICCAI 2019: 22nd International Conference, Shenzhen, China, Oct. 13-17, 2019, Proceedings, Part II, 2019, pp. 541-549. Springer International Publishing.
Bakas, S. et al., "Identifying the Best Machine Learning Algorithms for Brain Tumor Segmentation, Progression Assessment, and Overall Survival Prediction in the Brats Challenge," arXiv preprint arXiv:1811.02629, 2018, 28 pages.
Bengio, Y. "Learning Deep Architectures for AI", Foundations and Trends in Machine Learning, vol. 2, No. 1, 2009. 35 pages.
Bilic, P. et al., "The Liver Tumor Segmentation Benchmark (LiTS)," Medical Image Analysis, 84, 102680, arXiv preprint arXiv:1901.04056, 2019.
Caron, M. et al., "Deep Clustering for Unsupervised Learning of Visual Features," In Proceedings of the European Conference on Computer Vision (ECCV), 2018, pp. 132-149.
Caron, M. et al., "Unsupervised Pre-Training of Image Features on Non-Curated Data," Proceedings of the IEEE International Conference on Computer Vision, 2019, pp. 2959-2968.
Carreira, J. et al., "Quo Vadis, Action Recognition? A New Model and the Kinetics Dataset," In 2017 IEEE Conference on Computer Vision and Pattern Recognition (CVPR), (Jul. 2017), pp. 6299-6308.
Chaitanya, K. et al., "Contrastive learning of global and local features for medical image segmentation with limited annotations," Advances in Neural Information Processing Systems vol. 33, 2020, pp. 12546-12558.
Chen, L. et al., "Self-supervised learning for medical image analysis using image context restoration," Medical Image Analysis, vol. 58, 2019, 12 pages, https://doi.org/10.1016/j.media.2019.101539.
Chen, S. et al., Med3d: Transfer Learning for 3d Medical Image Analysis. arXiv preprint arXiv:1904.00625, 2019, 12 pages.
Deshpande, A. et al., "Learning Large-Scale Automatic Image Colorization," In Proceedings of the IEEE International Conference on Computer Vision, 2015, pp. 567-575.
Doersch, C. et al., "Unsupervised Visual Representation Learning by Context Prediction," Proceedings of the IEEE International Conference on Computer Vision, 2015, pp. 1422-1430, https://doi.org/10.1109/ICCV.2015.167.
Fan, Z., et al., "A Generic Unified Deep Model for Learning from Multiple Tasks," 34 pages.
Feng, Z. et al., "Self-Supervised Representation Learning by Rotation Feature Decoupling," In Proceedings of the IEEE/CVF Conference on Computer Vision and Pattern Recognition, 2019, pp. 10364-10374.
Final Office Action for U.S. Appl. No. 17/246,032 dated Feb. 23, 2024, 15 pages.
Gibson, E. et al., "Automatic Multi-Organ Segmentation on Abdominal CT with Dense V-Networks," IEEE Transactions on Medical Imaging, vol. 37, No. 8, Aug. 2018, pp. 1822-1834.
Gibson, E. et al., "Niftynet: a deep-learning platform for medical imaging," Computer Methods and Programs in Biomedicine 158, 2018, pp. 113-122.
Gidaris, S. et al., "Learning Representations by Predicting Bags of Visual Words," In Proceedings of IEEE/CVF Conference on Computer Vision and Pattern Recognition, 2020, pp. 6926-6936.
Gidaris, S. et al., "Unsupervised Representation Learning by Predicting Image Rotations," In ICLR 2018, 17 pages.
Gong, Y. et al., "Multi-Scale Orderless Pooling of Deep Convolutional Activation Features," In Computer Vision—ECCV 2014: 13th European Conference, Zurich, Switzerland, Sep. 6-12, 2014, Proceedings, Part VII 13, 2014, pp. 392-407, Springer International Publishing.
Goyal, P. et al., "Scaling and Benchmarking Self-Supervised Visual Representation Learning," Proceedings of the IEEE/CVF International Conference on Computer Vision, 2019, pp. 6390-6399.
Guo, Z., et al., "Discriminative, Restorative, and Adversarial Learning: Stepwise Incremental Pretraining," 15 pages.
Haghighi, F. et al., "Learning semantics-enriched representation via Self-discovery, Self-classification, and Self-restoration," Medical Image Computing and Computer Assisted Intervention—MICCAI 2020: 23rd International Conference, Lima, Peru, Oct. 4-8, 2020, Proceedings, Part I 23, 2020, pp. 137-147, Springer International Publishing.
Haghighi, F. et al., "Transferable visual words: Exploiting the Semantics of Anatomical Patterns for Self-supervised Learning," IEEE Transactions on Medical Imaging, 40(10), 2021, pp. 2857-2868, https://doi.org/10.1109/TMI.2021.3060634.
Haghighi, F., et al., "DiRA: Discriminative, Restorative, and Adversarial Learning for Self-supervised Medical Image Analysis," In Proceedings of the IEEE/CVF Conference on Computer Vision and Pattern Recognition (2022), pp. 20792-20802.
Haghighi, F., et al., Transferable Visual Worlds, IEEE Transactions on Medical Imaging, 2020, 21 pages.
Hendrycks, D. et al., "Using Self-Supervised Learning Can Improve Model Robustness and Uncertainty," Advances in Neural Information Processing Systems, 32, 2019,12 pages.
Huh, M. et al., "What makes ImageNet good for transfer learning?," arXiv preprint arXiv:1608.08614 (2016), 10 pages.
Isensee, F. et al., "Automated Design of Deep Learning Methods for Biomedical Image Segmentation," arXiv preprint arXiv:1904.08128, 2020, 55 pages.
Jenni, S. et al., "Steering Self-Supervised Feature Learning Beyond Local Pixel Statistics," Proceedings of the IEEE/CVF Conference on Computer Vision and Pattern Recognition, 2020, pp. 6408-6417.
Johnson, T.B. et al., "Training Deep Models Faster with Robust, Approximate Importance Sampling," Advances in Neural Information Processing Systems 31, 2018, pp. 7265-7275.
Kim, D. et al., "Learning Image Representations by Completing Damaged Jigsaw Puzzles," In 2018 IEEE Winter Conference on Applications of Computer Vision (WACV), 2018, pp. 793-802, IEEE.
Kornblith, S. et al., "Do Better ImageNet Models Transfer Better?" In Proceedings of the IEEE/CVF Conference on Computer Vision and Pattern Recognition, 2019, pp. 2656-2666.
Larsson, G. et al., "Colorization as a Proxy Task for Visual Understanding," In Proceedings of the IEEE Conference on Computer Vision and Pattern Recognition, 2017, pp. 6874-6883.
Larsson, G. et al., "Learning Representations for Automatic Colorization," In Computer Vision—ECCV 2016: 14th European Conference, Amsterdam, The Netherlands, Oct. 11-14, 2016, Proceedings, Part IV, 14, 2016, pp. 577-593, Springer International Publishing.
Lowe, D. G., "Distinctive Image Features from Scale-Invariant Keypoints," International Journal of Computer Vision, 60(2), 2004, pp. 91-110.
Minderer, M. et al., "Automatic Shortcut Removal for Self-Supervised Representation Learning," In International Conference on Machine Learning. PMLR, 2020, pp. 6927-6937.
Mundhenk, T. N. et al., "Improvements to Context Based Self-Supervised Learning." 2018 IEEE/CVF Conference on Computer Vision and Pattern Recognition, 2018, pp. 9339-9348, https://doi.org/10.1109/CVPR.2018.00973.

(56) References Cited

OTHER PUBLICATIONS

Newell, A. et al., "How Useful is Self-Supervised Pretraining for Visual Tasks?" In Proceedings of the IEEE/CVF Conference on Computer Vision and Pattern Recognition, 2020, pp. 7343-7352.

Neyshabur, B. et al., "What is being transferred in transfer learning?" Advances in Neural Information Processing Systems 33, 2020, pp. 512-523.

Non-final Office Action for U.S. Appl. No. 17/246,032, dated Jul. 5, 2023, 15 pages.

Noroozi, M. et al., "Unsupervised Learning of Visual Representations by Solving Jigsaw Puzzles," European Conference on Computer Vision, 2016, pp. 69-84, Springer International Publishing, arXiv preprint arXiv:1603.09246, 16 pages.

Notice of Allowance for U.S. Appl. No. 17/246,032, dated Aug. 1, 2024, 12 pages.

Pathak, D. et al., "Context Encoders: Feature Learning by Inpainting," 2016 Proceedings of the IEEE Conference on Computer Vision and Pattern Recognition (CVPR), pp. 2536-2544, https://doi.org/10.1109/CVPR.2016.278.

* cited by examiner

Table 1 — 300

| Code* | Application | Object | Modality | Dataset | Common with pretext task |   |   |
|---|---|---|---|---|---|---|---|
|   |   |   |   |   | Organ | Dataset | Modality |
| NCC | Lung nodule false positive reduction | Lung Nodule | CT | LUNA 16 | ✓ |   | ✓ |
| NCS | Lung nodule segmentation | Lung Nodule | CT | LIDC-IDRI | ✓ | ✓ | ✓ |
| ECC | Pulmonary embolism false positive reduction | Pulmonary Emboli | CT | PE-CAD |   |   | ✓ |
| LCS | Liver segmentation | Liver | CT | LiTS-2017 |   | ✓ | ✓ |
| BMS | Brain Tumor Segmentation | Brain Tumor | MRI | BraTS2018 |   |   |   |
| DXC | Fourteen thorax diseases classification | Thorax Diseases | X-ray | ChestX-Ray14 | ✓ | ✓ |   |
| PXS | Pneumothorax Segmentation | Pneumothorax | X-ray | SIIM-ACR-2019 | ✓ |   |   |
| * | The first letter denotes the object of interest ("N" for lung nodule, "B" for brain tumor, "L" for liver, etc); the second letter denotes the modality ("C" for CT, "X" for X-ray, "M" for MRI); the last letter denotes the task ("C" for classification, "S" for segmentation). | | | | | | |

FIG. 3

FIG. 5

Table 2 - 500

| Pre-training task | | | Target tasks 510 | | | | | |
|---|---|---|---|---|---|---|---|---|
| Method | Supervised | Dataset | NCC (%) 505 | NCS (%) 506 | ECC (%) 507 | LCS (%) 508 | BMS (%) 509 |
| Random | X | N/A | 94.25 ± 5.07 | 74.05 ± 1.97 | 80.36 ± 3.58 | 79.76 ± 5.42 | 59.87 ± 4.04 |
| NiftyNet | ✓ | Pancreas-CT, BTCV | 94.14 ± 4.57 | 52.98 ± 2.05 | 77.33 ± 8.05 | 83.23 ± 1.05 | 60.78 ± 1.60 |
| Medical Net | ✓ | 3DSeg-8 | 95.80 ± 0.51 | 75.68 ± 0.32 | 86.43 ± 1.44 | 85.52 ± 0.58 | 66.09 ± 1.35 |
| I3D | ✓ | Kinetics | 98.26 ± 0.27 | 71.58 ± 0.55 | 80.55 ± 1.11 | 70.65 ± 4.26 | 67.83 ± 0.75 |
| Inpainting | X | LUNA 16 | 95.12 ± 1.74 | 76.02 ± 0.55 | 84.08 ± 2.34 | 81.36 ± 4.83 | 61.38 ± 3.84 |
| Context Restoration | X | LUNA 16 | 94.90 ± 1.18 | 75.55 ± 0.82 | 82.15 ± 3.3 | 82.82 ± 2.35 | 59.05 ± 2.83 |
| Rotation | X | LUNA 16 | 94.42 ± 1.78 | 76.13 ± 0.61 | 83.40 ± 2.71 | 83.15 ± 1.41 | 60.53 ± 5.22 |
| Rubik's Cube | X | LUNA 16 | 96.24 ± 1.27 | 72.87 ± 0.16 | 80.49 ± 4.64 | 75.59 ± 0.20 | 62.75 ± 1.93 |
| Models Genesis | X | LUNA 16 | 98.07 ± 0.59 | 77.41 ± 0.40 | 87.2 ± 2.87 | 85.1 ± 2.15 | 67.96 ± 1.29 |
| VW classification | X | LUNA 16 | 97.49 ± 0.45 | 76.93 ± 0.87 | 84.25 ± 3.91 | 84.14 ± 1.78 | 64.02 ± 0.98 |
| VW restoration | X | LUNA 16 | 98.10 ± 0.19 | 77.70 ± 0.59 | 86.20 ± 3.21 | 84.57 ± 2.20 | 67.78 ± 0.57 |
| TransVW 512 | X | LUNA 16 | 98.46 ± 0.30 | 77.33 ± 0.52 | 87.07 ± 2.83 | 86.53 ± 1.30 | 68.82 ± 0.38 |

NCS 506 holds a Dice of 74.05% vs. 75.85% ± 0.83% (TransVW 512)
ECC 507 holds an AUC of 87.06% vs. 87.07% ± 2.83% (TransVW 512)
LCS 508 holds a Dice of 95.76% vs. 95.84% ± 0.07% (TransVW 512 using nnU-Net framework)
BMS 509 MR Flair images are only utilized for segmenting brain tumors, so the results are not submitted to BraTS-2018.

| Table 3 - 1300 | | | | | |
|---|---|---|---|---|---|
| Pre-training 1301 | Initialization 1302 | NCC (AUC%) 1303 | LCS (IoU%) 1304 | NCS (IoU%) 1305 | BMS (IoU%) 1306 |
| | Random 1309 | 94.25±5.07 | 74.60±4.57 | 74.05±1.97 | 59.87±4.04 |
| Supervised 1307 | NiftyNet 1310 | 94.14±4.57 | 83.23±1.05 | 52.98±2.05 | 60.78±1.60 |
| | MedicalNet 1311 | 95.80±0.51 | 83.32±0.85 | 75.68±0.32 | 66.09±1.35 |
| | Inflated 3D (I3D) 1312 | 98.26±0.27 | 70.65±4.26 | 71.31±0.37 | 67.83±0.75 |
| Self-supervised 1308 | Autoencoder | 88.43±10.25 | 78.16±2.07 | 75.10±0.91 | 56.36±5.32 |
| | In-painting | 91.46±2.97 | 81.36±4.83 | 75.86±0.26 | 61.38±3.84 |
| | Patch-shuffling | 91.93±2.32 | 82.82±2.35 | 75.74±0.51 | 52.95±6.92 |
| | Rubik's Cube | 95.56±1.57 | 76.07±0.20 | 70.37±1.13 | 62.75±1.93 |
| | Self-restoration | 98.07±0.59 | 78.78±3.11 | 77.41±0.40 | 67.96±1.29 |
| | Self-classification | 97.41±0.32 | 83.61±2.19 | 76.23±0.42 | 66.02±0.83 |
| | TransVW 3D | 98.47±0.22 | 85.60±1.94 | 77.24±0.68 | 68.80±0.30 |

Best Approaches 1320

No statistically significant difference at p =0.05
1321

FIG. 13

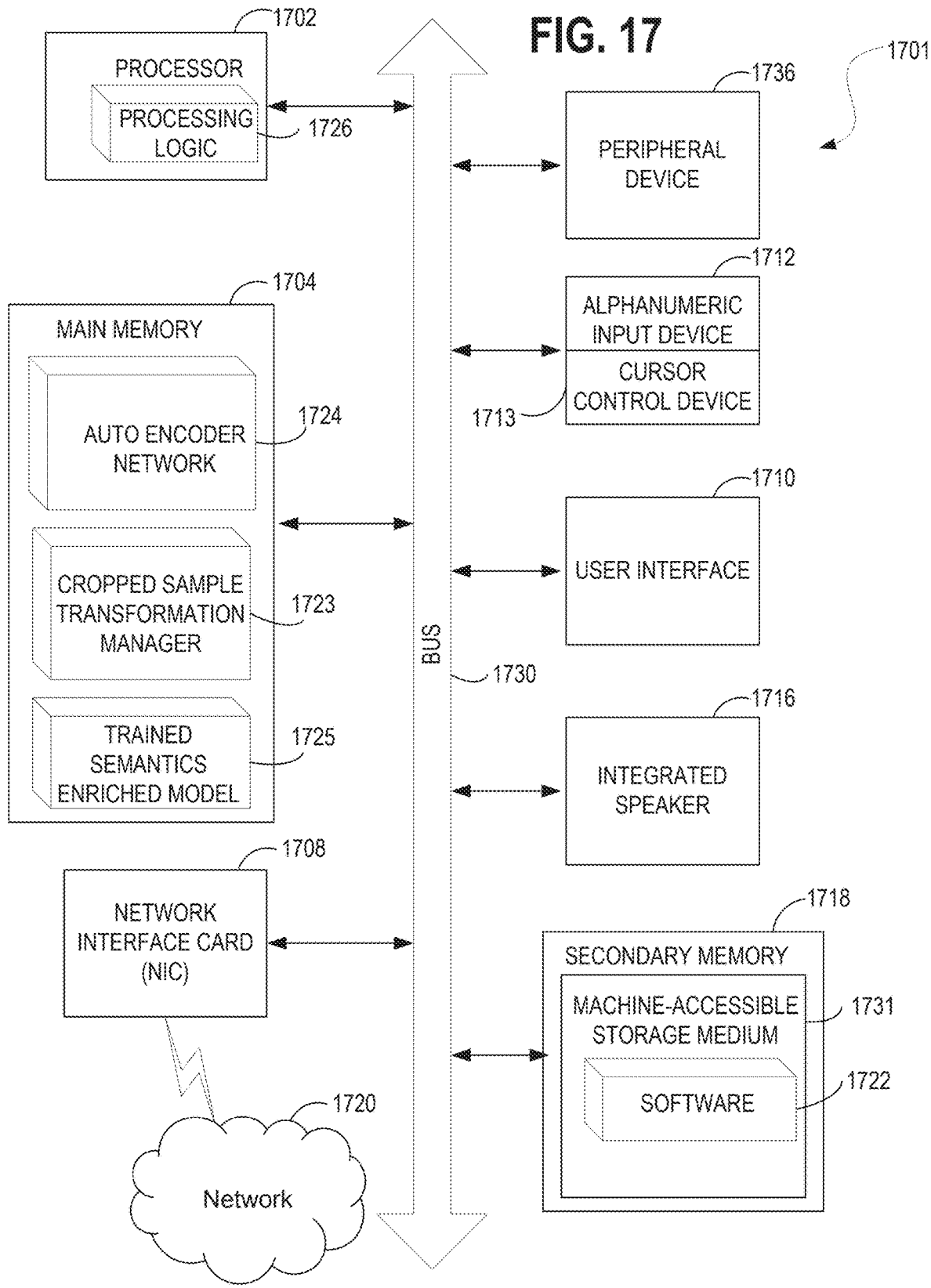

- Start
- Receiving a plurality of medical images for processing by the system; 1805
- Cropping a 2D patch or a 3D cube from each of the images. 1810
- Transforming each of the cropped 2D patches or 3D cubes. 1815
- Performing a self-discovery operation of anatomical patterns by building a set of the anatomical patterns from the transformed 2D patches or transformed 3D cubes. 1820
- Performing a self-classification operation of the anatomical patterns. 1825
- Performing a self-restoration operation of the anatomical patterns. 1830
- Outputting a semantics-enriched pre-trained AI model having a trained encoder-decoder structure with skip connections in between based on the performance of the self-discovery operation, the self-classification operation, and the self-restoration operation. 1835
- End

SYSTEMS, METHODS, AND APPARATUSES FOR IMPLEMENTING TRANSFERABLE VISUAL WORDS BY EXPLOITING THE SEMANTICS OF ANATOMICAL PATTERNS FOR SELF-SUPERVISED LEARNING

CLAIM OF PRIORITY

This U.S. Utility Continuation In Part (CIP) patent application is related to, and claims priority to, the Non-Provisional U.S. Utility patent application Ser. No. 17/246,032, filed Apr. 30, 2021, entitled "SYSTEMS, METHODS, AND APPARATUSES FOR THE USE OF TRANSFERABLE VISUAL WORDS FOR AI MODELS THROUGH SELF-SUPERVISED LEARNING IN THE ABSENCE OF MANUAL LABELING FOR THE PROCESSING OF MEDICAL IMAGING," and is further related to and claims priority to the U.S. provisional patent application No. 63/018,335, filed Apr. 30, 2020, entitled "SYSTEMS, METHODS, AND APPARATUSES FOR THE GENERATION OF SEMANTIC GENESIS MODELS THROUGH SELF-SUPERVISED LEARNING IN THE ABSENCE OF MANUAL LABELING FOR THE PROCESSING OF MEDICAL IMAGING," and is further related to, and claims priority to, the U.S. provisional patent application No. 63/110,265, filed Nov. 5, 2020, entitled "SYSTEMS, METHODS, AND APPARATUSES FOR THE USE OF TRANSFERABLE VISUAL WORDS FOR AI MODELS THROUGH SELF-SUPERVISED LEARNING IN THE ABSENCE OF MANUAL LABELING FOR THE PROCESSING OF MEDICAL IMAGING," and is further related to, and claims priority to, the U.S. provisional patent application No. 63/151,567, filed Feb. 19, 2021, entitled "SYSTEMS, METHODS, AND APPARATUSES FOR IMPLEMENTING TRANSFERABLE VISUAL WORDS BY EXPLOITING THE SEMANTICS OF ANATOMICAL PATTERNS FOR SELF-SUPERVISED LEARNING," the entire contents of each being incorporated herein by reference as though set forth in full.

GOVERNMENT RIGHTS AND GOVERNMENT AGENCY SUPPORT NOTICE

This invention was made with government support under 1548562 awarded by the National Science Foundation and R01 HL128785 awarded by the National Institutes of Health. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of medical imaging and analysis using convolutional neural networks for the classification and segmentation of medical images, and more particularly, to systems, methods, and apparatuses for implementing transferable visual words by exploiting the semantics of anatomical patterns for self-supervised learning, in which the trained AI models are then utilized for the processing of medical imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of processing medical images.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

Heretofore, self-supervised learning has been sparsely applied in the field of medical imaging. Nevertheless, there is a massive need to provide automated analysis to medical imaging with a high degree of accuracy so as to improve diagnosis capabilities, control medical costs, and to reduce workload burdens placed upon medical professionals.

Not only is annotating medical images tedious and time-consuming, but it also demands costly, specialty-oriented expertise, which is not easily accessible. To address this challenge, a new framework is newly introduced herein and described in greater detail below, which is configured to train deep models to learn semantically enriched visual representation by self-discovery, self-classification, and self-restoration of the anatomy underneath medical images, resulting in a semantics-enriched, general-purpose, pre-trained 3D model, named Transferable Visual Word (TransVW). In such a way, the resulting pre-trained 3D models (e.g., the TransVW models) are provided to subsequent users who may further configure the models for their specific implementation needs, such as performing an application specific target-task.

Medical images are naturally associated with rich semantics about the human anatomy, reflected in an abundance of recurring anatomical patterns, offering unique potential to foster deep semantic representation learning and yield semantically more powerful models for different medical applications. But how exactly such strong yet free semantics embedded in medical images can be harnessed for self-supervised learning remains largely unexplored.

Problematically, annotating medical imaging is tedious and time-consuming, and demands costly, specialty-oriented knowledge and skills, which are not easily accessible. Furthermore, any misdiagnosis from failure to recognize or correctly identify anatomical structures and abnormalities may result in potentially devastating impacts on patient morbidity and mortality.

Embodiments described herein therefore provide enhanced solutions to improve upon conventionally known image representation and learning techniques by leveraging machine learning to generate the Transferable Visual Word (TransVW) models via self-supervised learning on unlabeled medical images. Extensive experimentation on the seven distinct target tasks, covering both classification and segmentation in various medical modalities (i.e., CT, MRI, and X-ray), demonstrates that the resulting TransVW models significantly exceeds all of known 3D counterparts as well as the de-facto ImageNet-based transfer learning in 2D, attributable to the use of the novel self-supervised learning framework as described in greater detail below, which encourages deep models to learn compelling semantic representation from abundant anatomical patterns resulting from consistent anatomies embedded in medical images.

The present state of the art may therefore benefit from the systems, methods, and apparatuses for implementing transferable visual words by exploiting the semantics of anatomical patterns for self-supervised learning, as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 3 depicts Table 1 which describes the seven publicly-available medical imaging applications including 3D and 2D image classification and segmentation tasks, across diseases, organs, datasets, and modalities, which have been utilized for evaluation of the learned representation, in accordance with described embodiments;

FIG. 5 depicts Table 2 at element 500, which shows that Transferable Visual Word (TransVW) models outperform learning 3D models from scratch as well as three competing publicly available (fully) supervised pre-trained 3D models and five self-supervised learning approaches in five medical target tasks, in accordance with described embodiments;

FIG. 13 depicts Table 3 which shows fine-tuning from TransVW models outperforms learning 3D models from scratch as well as three competing publicly available (fully) supervised pre-trained 3D models and four self-supervised learning approaches in four medical target tasks, in accordance with described embodiments;

FIG. 17 illustrates a diagrammatic representation of a machine in the exemplary form of a computer system, in accordance with one embodiment, within which a set of instructions, for causing the machine/computer system to perform any one or more of the methodologies discussed herein, may be executed, in accordance with a particular embodiment; and FIG. 18 depicts a flow diagram illustrating a method for the generation of trained AI models generally and trained deep CNN (Convolutional Neural Networks) type models more specifically, through self-supervised learning in the absence of manual labeling, in which such models are then utilized for the processing of medical imaging, in accordance with disclosed embodiments.

DETAILED DESCRIPTION

Figure 1A:
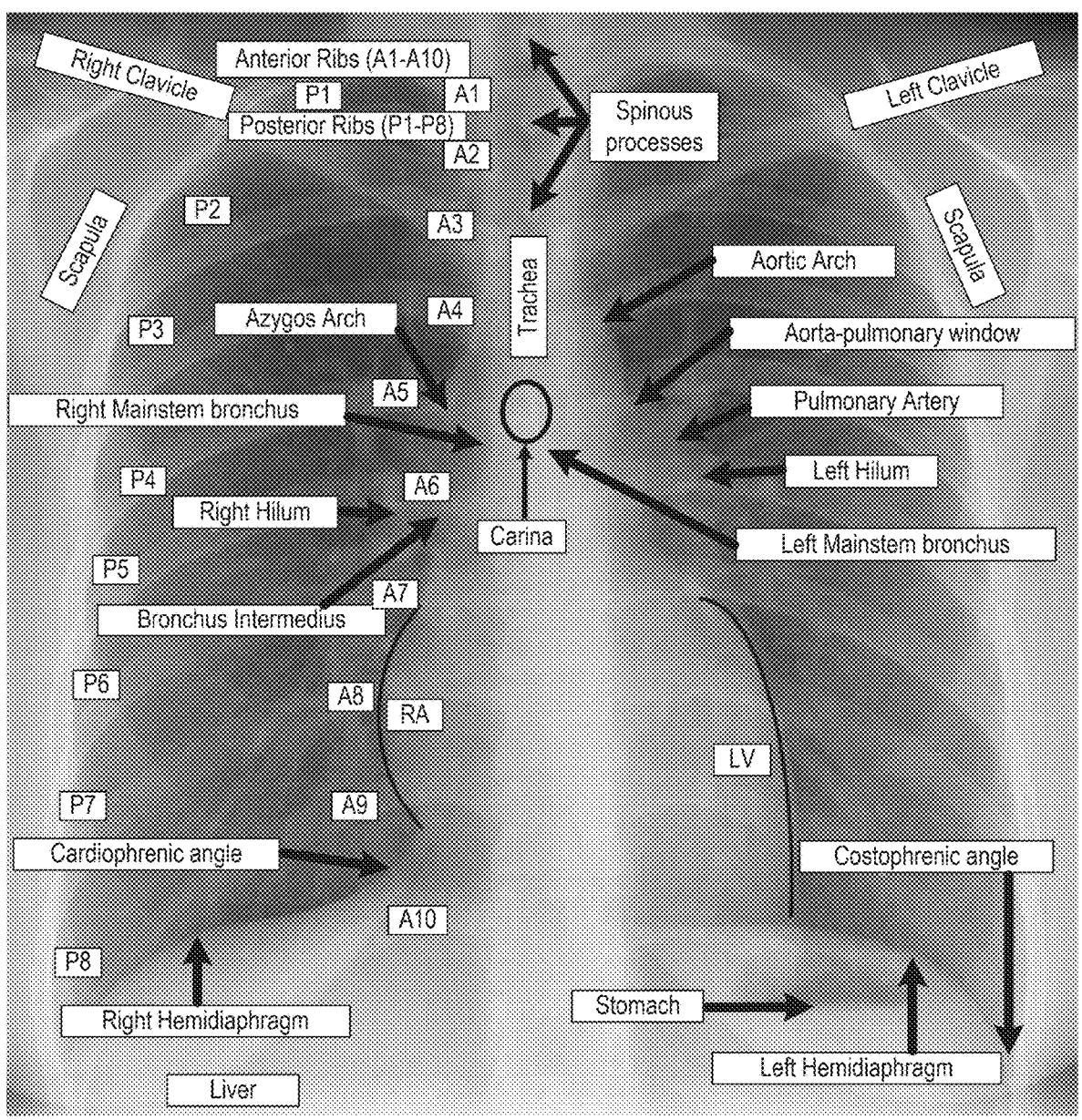
FIG. 1A presents the annotated anatomy in Chest X-ray 100, which is annotated to illustrate how the novel TransVW exploits the anatomical structures, referred to as anatomical visual words, for self-supervised learning, according to described embodiments.

Described herein are systems, methods, and apparatuses for implementing transferable visual words by exploiting the semantics of anatomical patterns for self-supervised learning, in which the trained deep models are then utilized in the context of medical imaging.

Specifically introduced herein is a new concept called "transferable visual words" (TransVW), aiming to achieve annotation efficiency for deep learning in medical image analysis. Medical imaging—focusing on particular parts of the body for defined clinical purposes— generates images of great similarity in anatomy across patients and yields sophisticated anatomical patterns across images, which are associated with rich semantics about human anatomy and which are natural visual words.

We show that these visual words can be automatically harvested according to anatomical consistency via self-discovery, and that the self-discovered visual words can serve as strong yet free supervision signals for deep models to learn semantics-enriched generic image representation via self-supervision (self-classification and self-restoration).

Our extensive experiments demonstrate the annotation efficiency of TransVW by offering higher performance and faster convergence with reduced annotation cost in several applications. The TransVW framework has several important advantages, including (1) TransVW is a fully autodidactic scheme, which exploits the semantics of visual words for self-supervised learning, requiring no expert annotation; (2) visual word learning is an add-on strategy, which complements existing self-supervised methods, boosting their performance; and (3) the learned image representation is semantics-enriched models, which have proven to be more robust and generalizable, saving annotation efforts for a variety of applications through transfer learning.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a specialized and special-purpose processor having been programmed with the instructions to perform the operations described herein. Alternatively, the operations may be performed by a combination of hardware and software. In such a way, the embodiments of the invention provide a technical solution to a technical problem.

Embodiments also relate to an apparatus for performing the operations disclosed herein. This apparatus may be specially constructed for the required purposes, or it may be a special purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

While the algorithms and displays presented herein are not inherently related to any particular computer or other apparatus, they are specially configured and implemented via customized and specialized computing hardware which is specifically adapted to more effectively execute the novel algorithms and displays which are described in greater detail below. Various customizable and special purpose systems may be utilized in conjunction with specially configured programs in accordance with the teachings herein, or it may prove convenient, in certain instances, to construct a more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

In addition to various hardware components depicted in the figures and described herein, embodiments further include various operations which are described below. The operations described in accordance with such embodiments may be performed by hardware components or may be embodied in machine-executable instructions, which may be used to cause a special-purpose processor programmed with the instructions to perform the operations. Alternatively, the operations may be performed by a combination of hardware and software, including software instructions that perform the operations described herein via memory and one or more processors of a computing platform.

1. Introduction:

A grand promise of computer vision is to learn general purpose image representation, seeking to automatically discover generalizable knowledge from data in either a supervised or unsupervised manner and transferring the discovered knowledge to a variety of applications for performance improvement and annotation efficiency.

In the literature, convolutional neural networks (CNNs) and bags of visual words (BoVW) are often presumed to be competing methods, but they actually offer complementary strengths. Training CNNs requires a large number of annotated images, but the learned features are transferable to many applications. Extracting visual words in BoVW, on the other hand, is unsupervised in nature, demanding no expert annotation, but the extracted visual words lack transferability. Therefore, described embodiments seek to beneficially integrate the transfer learning capability of CNNs with the unsupervised nature of BoVW in extracting visual words for image representation learning.

In the meantime, medical imaging protocols, typically designed for specific clinical purposes by focusing on particular parts of the body, generate images of great similarity in anatomy across patients and yield an abundance of sophisticated anatomical patterns across images. These anatomical patterns are naturally associated with rich semantic knowledge about human anatomy. Therefore, described embodiments additionally seek to exploit the deep semantics associated with anatomical patterns embedded in medical images to enrich image representation learning.

FIG. 1A presents the annotated anatomy in Chest X-ray 100, which is annotated to illustrate how the novel TransVW may be utilized by exploiting the anatomical structures for self-supervised learning; according to described embodiments.

FIGS. 1B, 1C, 1D, and 1E depict additional samples to further demonstrate the great similarity of anatomy in healthy (FIGS. 1B and 1C) and diseased (FIGS. 1D and 1E) Chest X-ray scans.

Figure 1B:
FIGS. 1B, 1C, 1D, and 1E depict additional samples to further demonstrate the great similarity of anatomy in healthy (FIGS. 1B and 1C) and diseased (FIGS. 1D and 1E) Chest X-ray scans, in accordance with described embodiments.
Figure 1C:
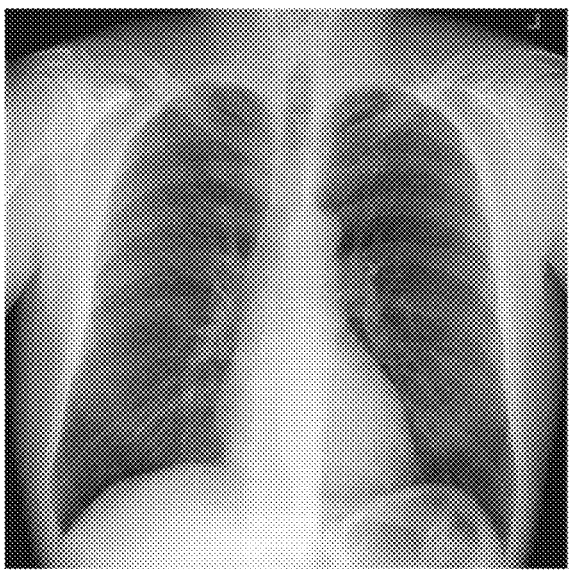
Figure 1D:
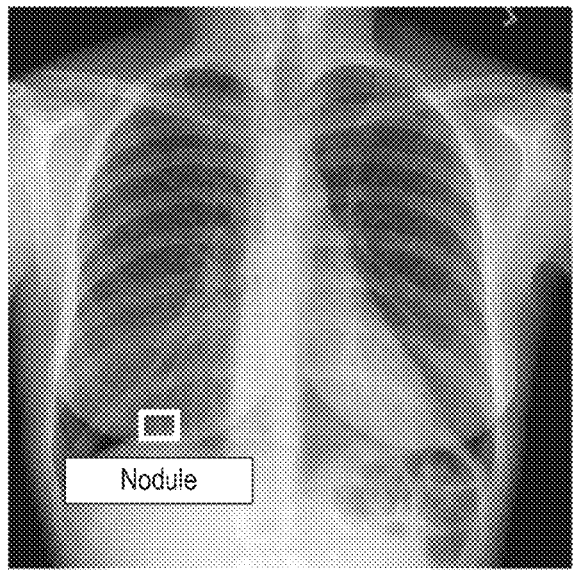
Figure 1E:
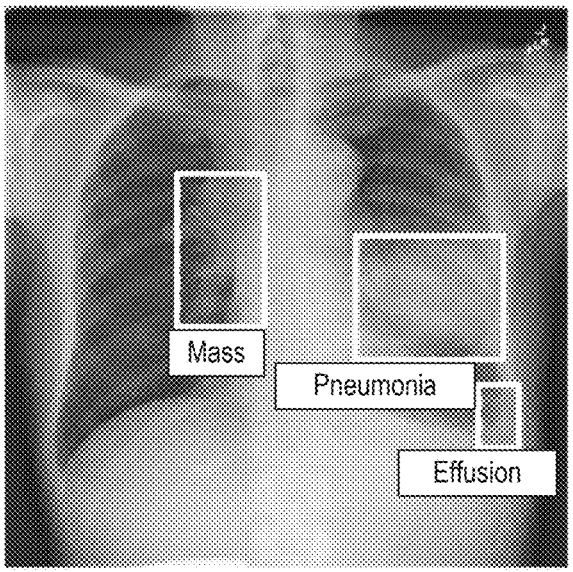

Without loss of generality, we illustrate our idea in 2D with chest X-rays. The great similarity of the lungs in anatomy, partially annotated in FIG. 1A, across patients yields complex yet consistent and recurring anatomical patterns across X-rays in healthy patients as depicted by FIGS. 1A, 1B, and 1C or diseased patients as depicted at FIGS. 1D and 1E, which we refer to as anatomical visual words. The proposed TransVW (transferable visual words) aims to learn generalizable image representation from the anatomical visual words without expert annotations, and transfer the learned deep models to create powerful application-specific target models. Notably, TransVW is general and applicable across organs, diseases, and modalities in both 2D and 3D.

According to described embodiments, these visual words are automatically extracted and thus serve as strong yet free supervision signals for CNNs to learn generalizable image representations via self-supervision.

Figure 2:
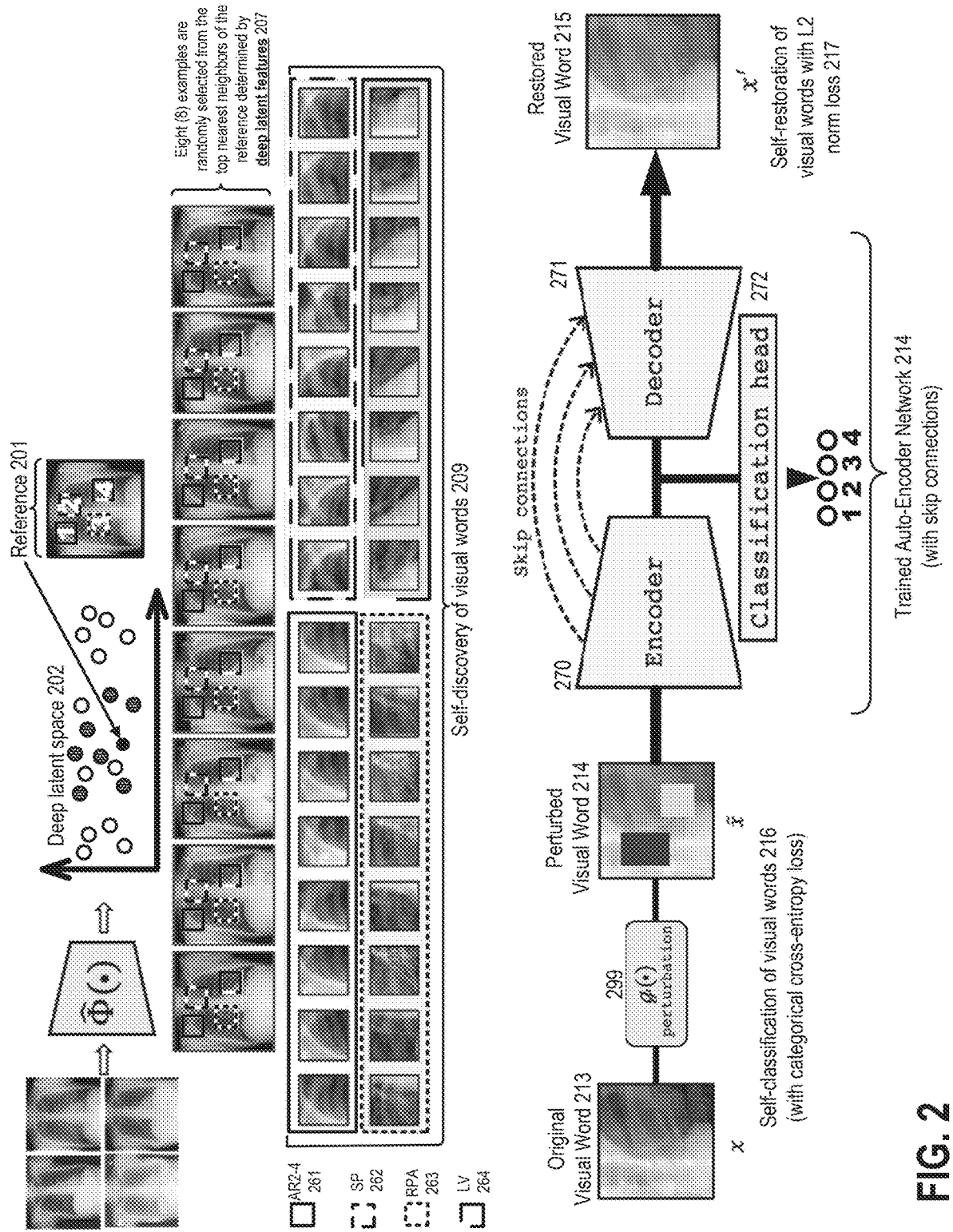
FIG. 2 depicts how the disclosed self-supervised learning framework TransVW is utilized for learning general-purpose image representation enriched with the semantics of anatomical visual words by way of (a) self-discovery of visual words, (b) self-classification of visual words, and (c) self-restoration of visual words, in accordance with described embodiments.
Figure 4A:
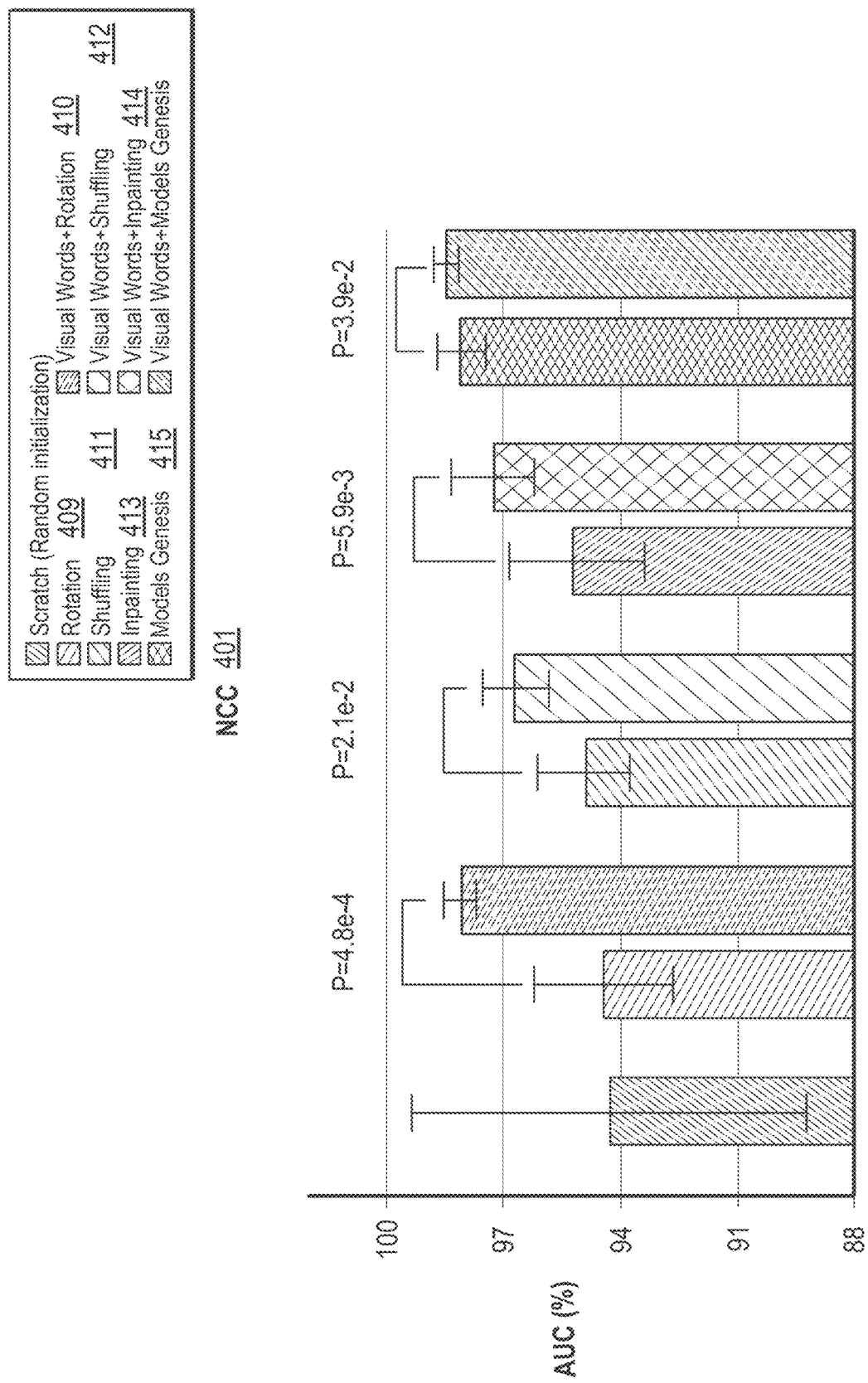
FIGS. 4A, 4B, 4C, 4D, and 4E chart results for both with and without the proposed semantics-enriched representations in the existing self-supervised learning approaches across five medical imaging applications, in accordance with described embodiments.
Figure 4B:
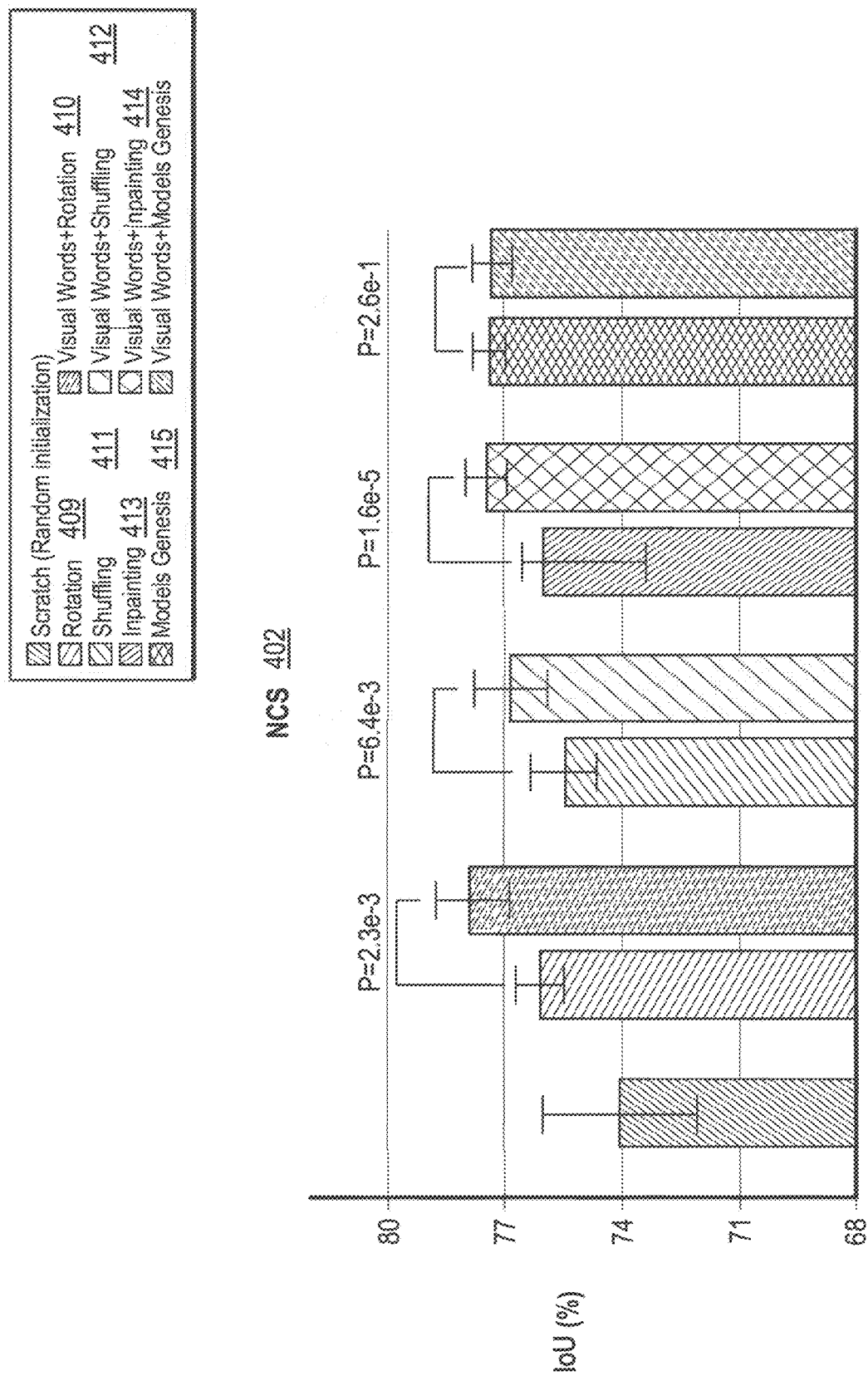
Figure 4C:
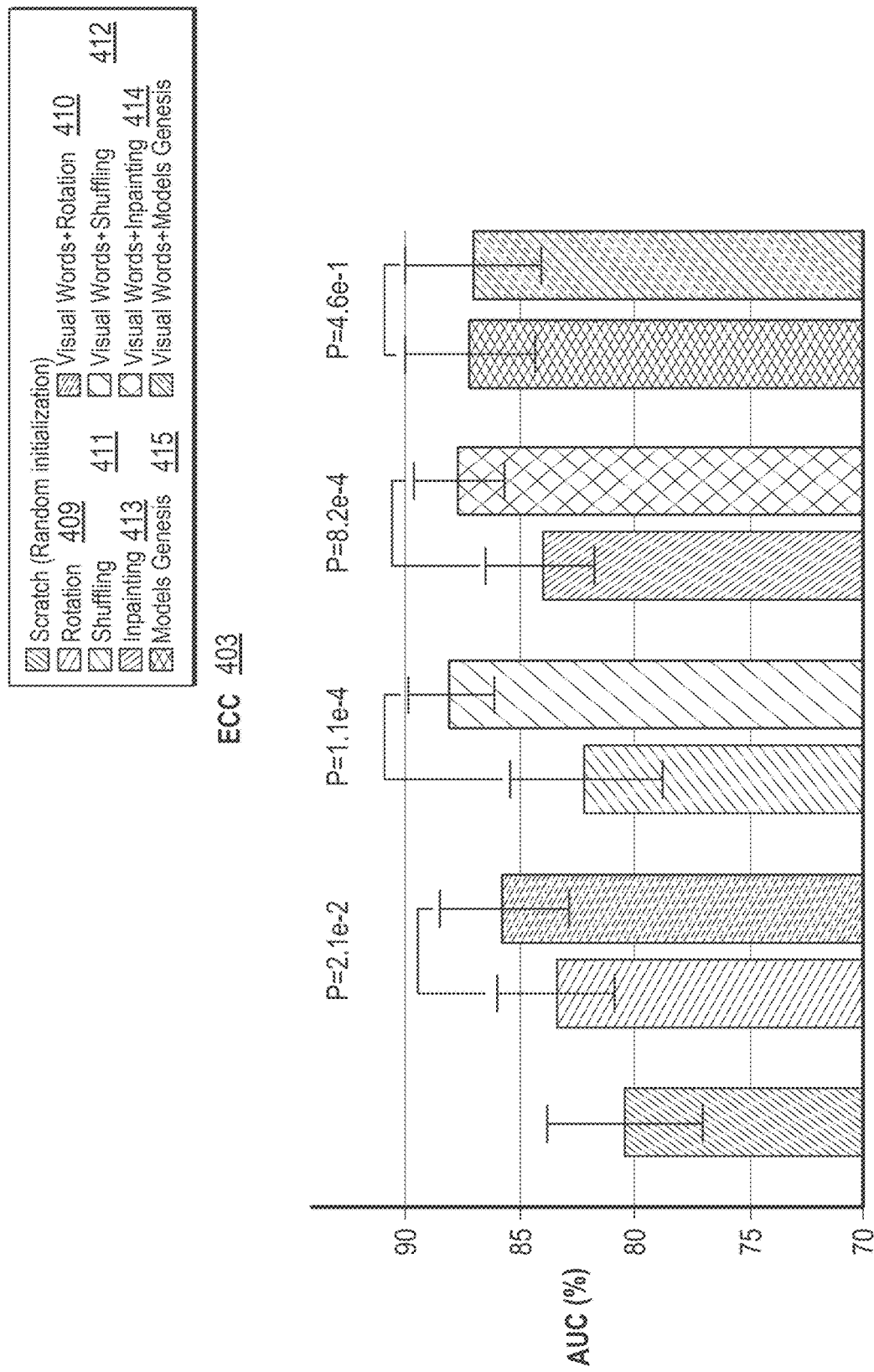
Figure 4D:
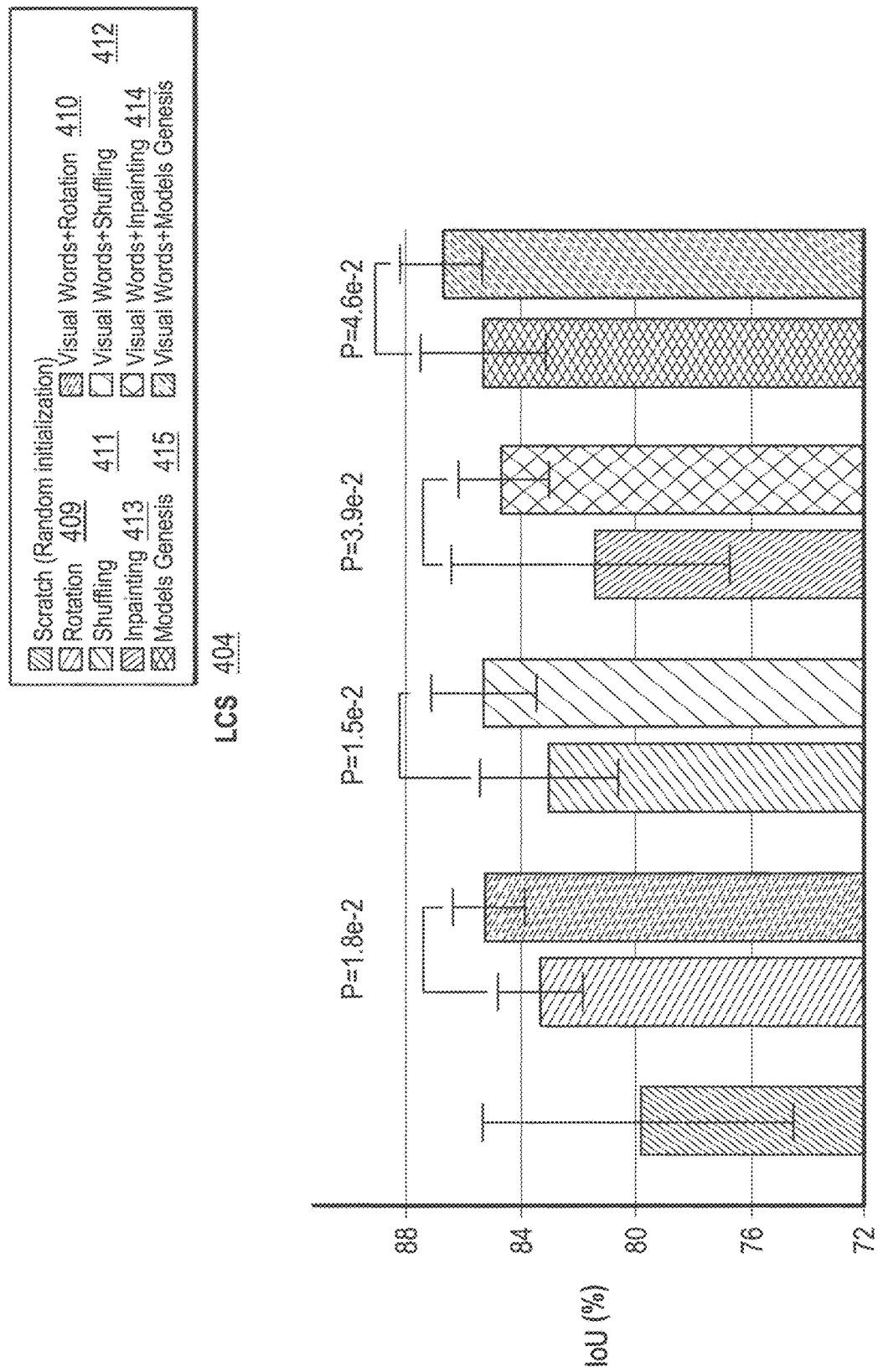
Figure 4E:
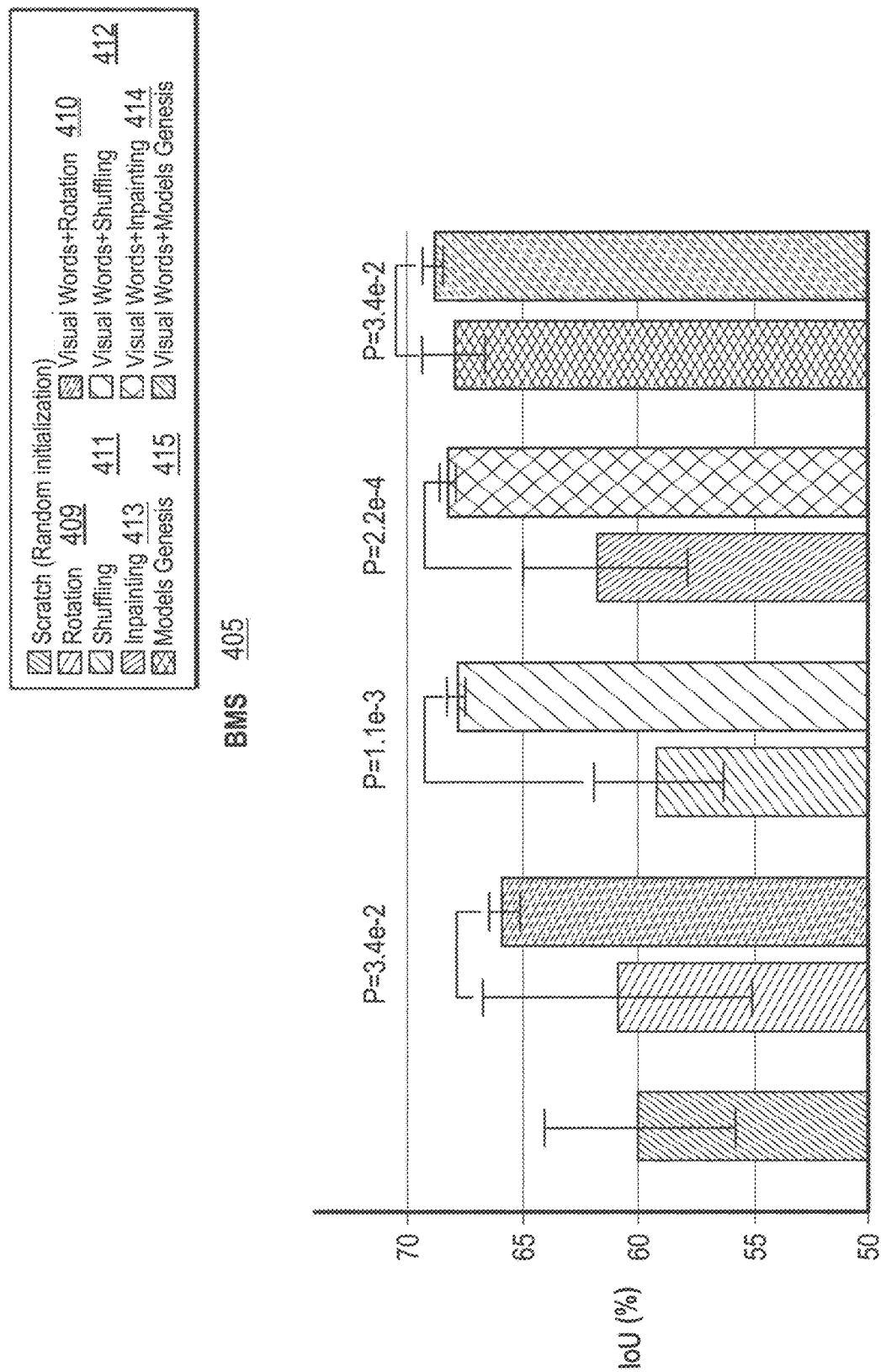
Figure 6A:
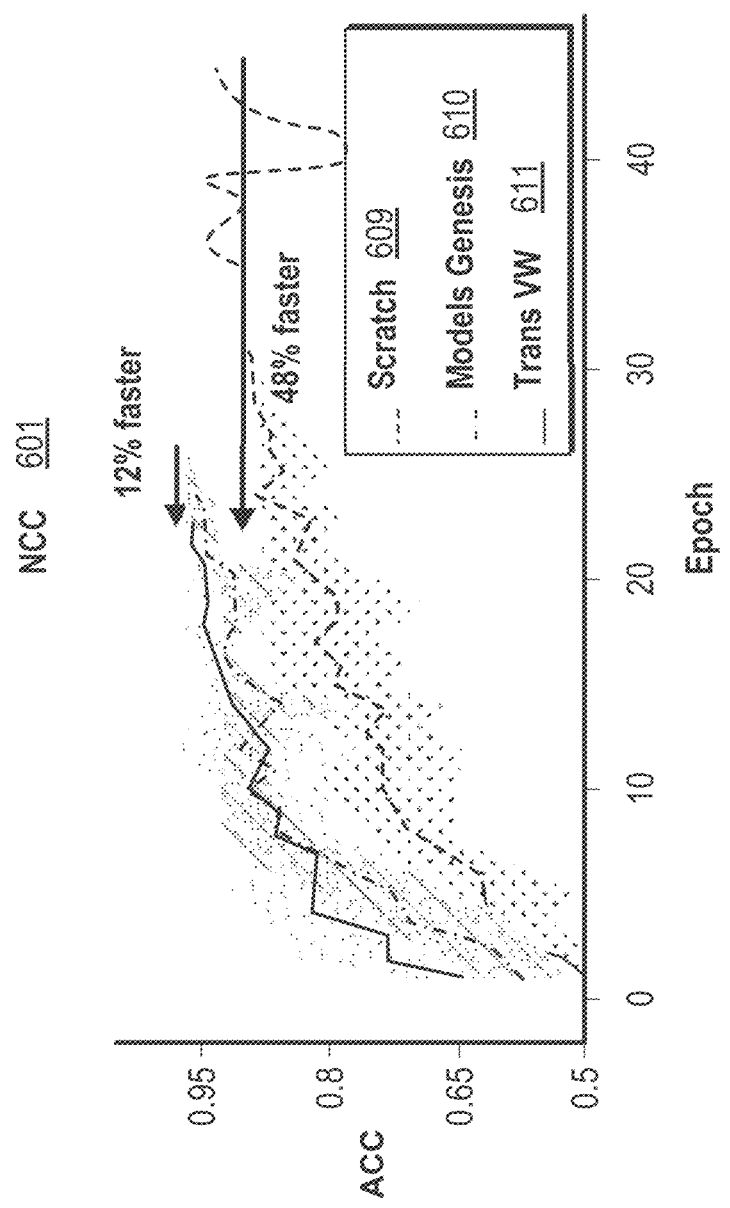
FIGS. 6A, 6B, 6C, 6D, and 6E present the learning curves for training from scratch, fine-tuning from Models Genesis, and fine-tuning from TransVW across five medical imaging applications, in accordance with described embodiments.
Figure 6B:
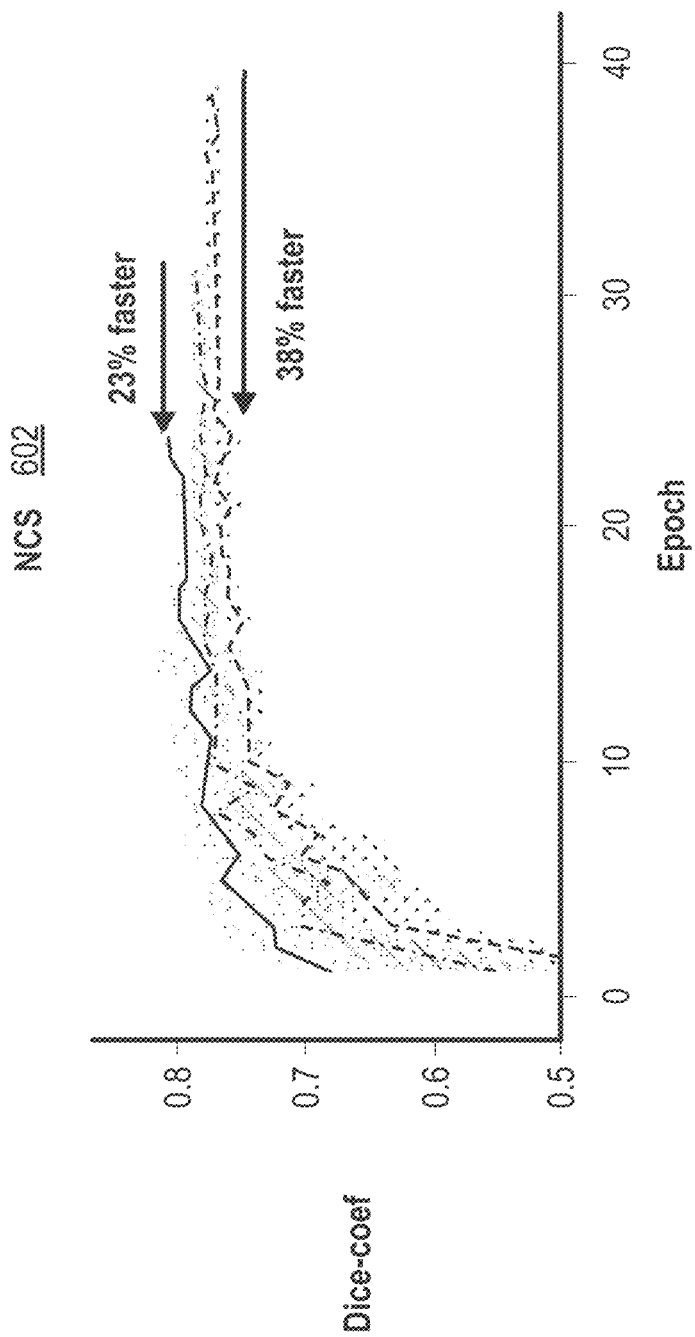
Figure 6C:
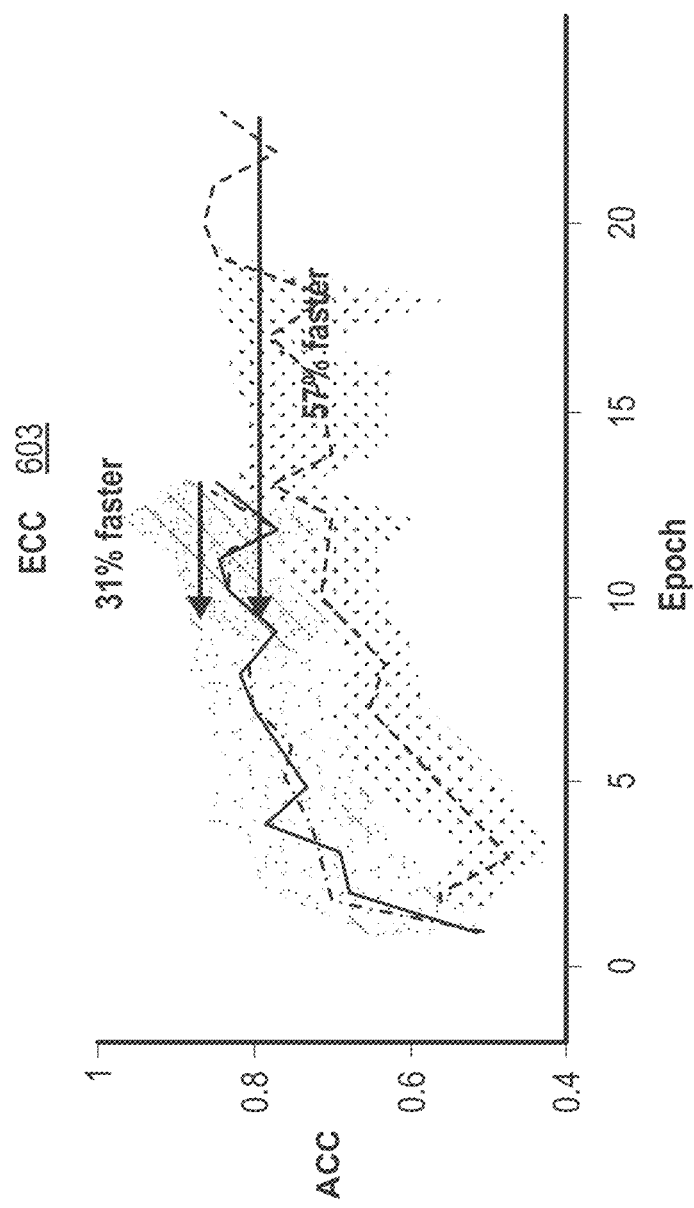
Figure 6D:
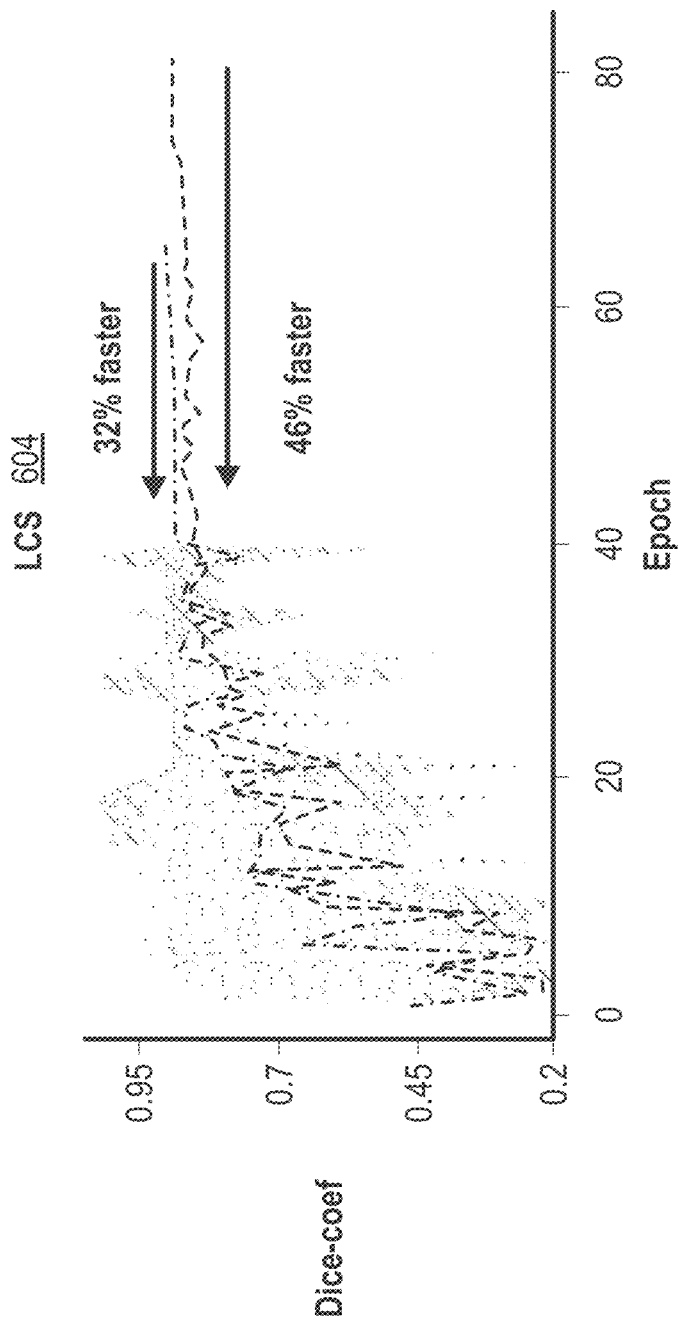
Figure 6E:
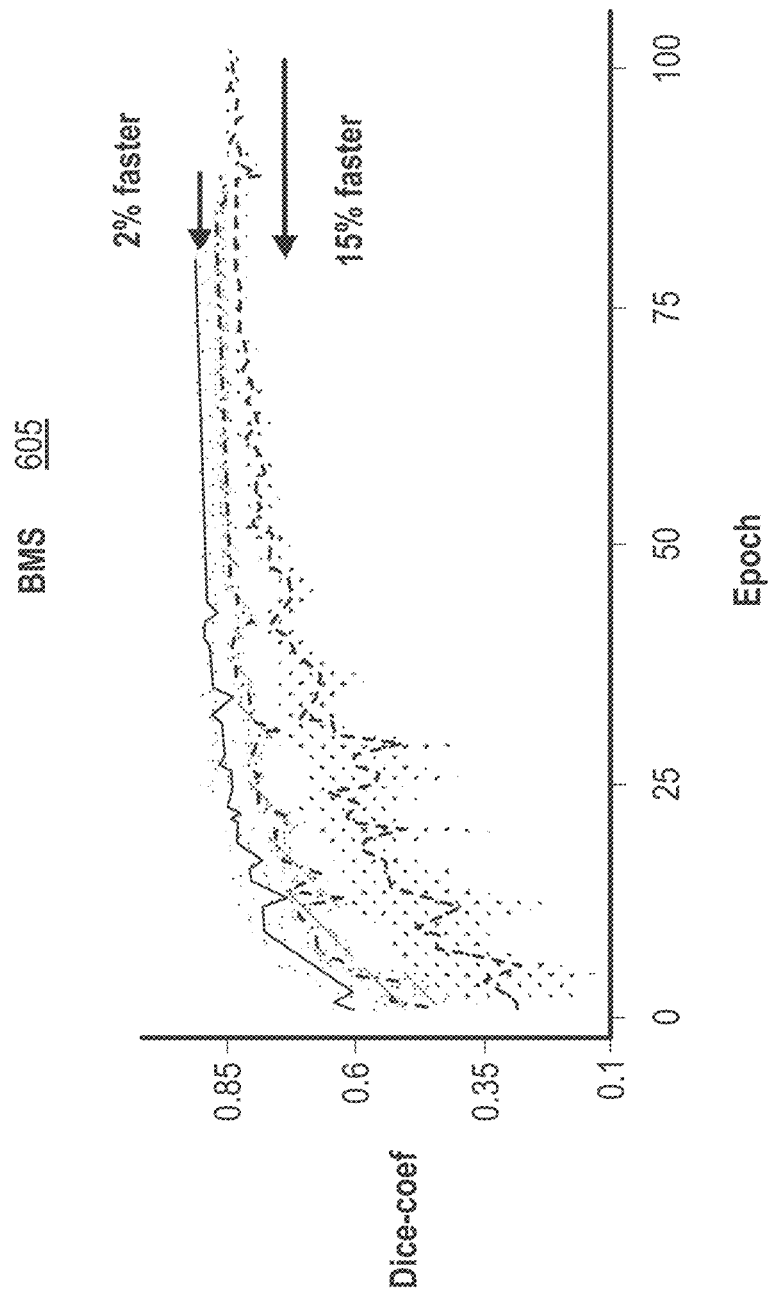
Figure 7A:
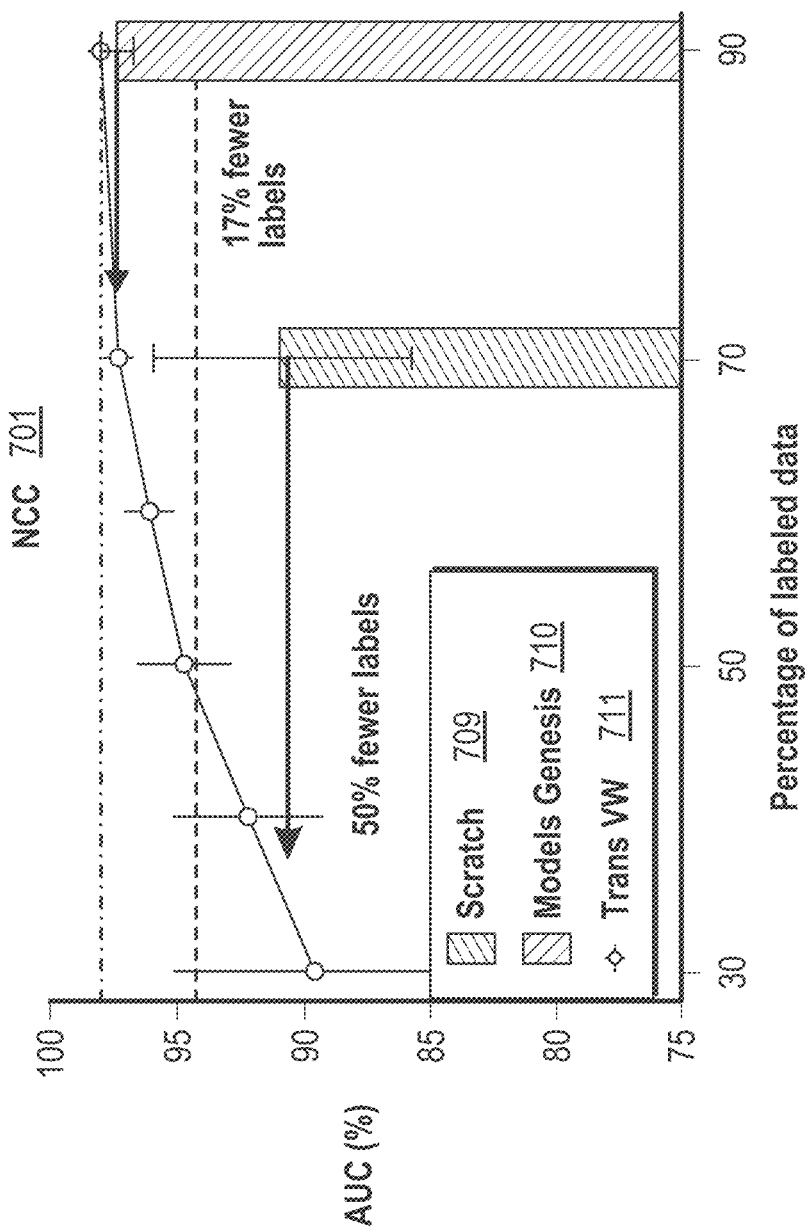
FIGS. 7A, 7B, 7C, 7D, and 7E illustrate the results of using the partial amount of labeled data during the training of five 3D target tasks, in accordance with described embodiments.
Figure 7B:
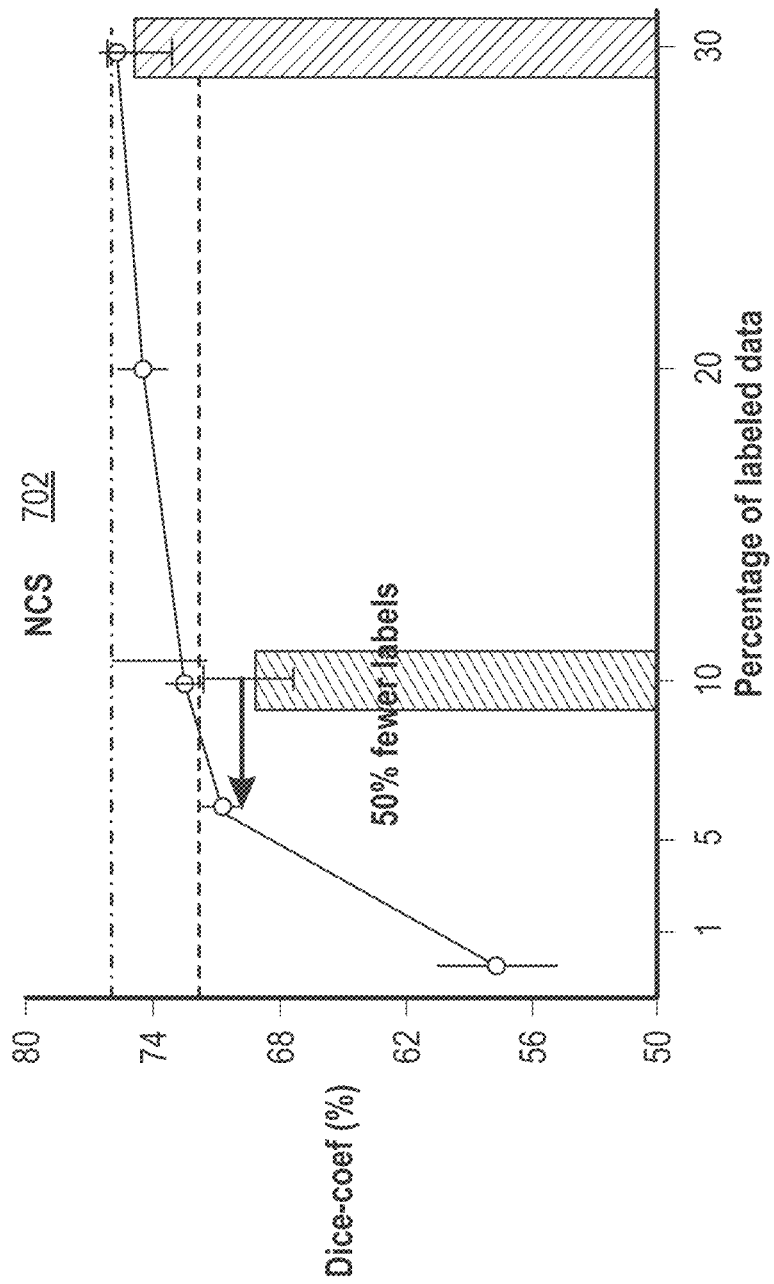
Figure 7C:
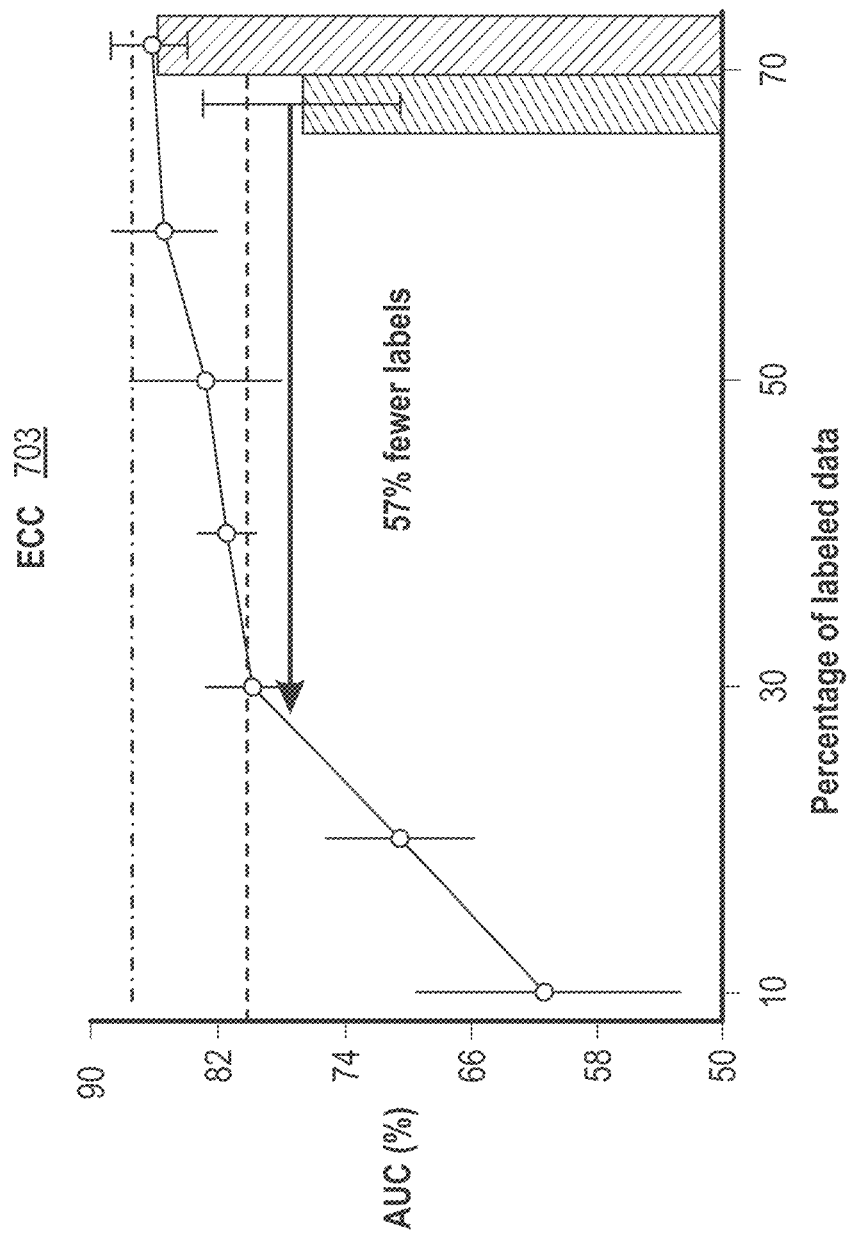
Figure 7D:
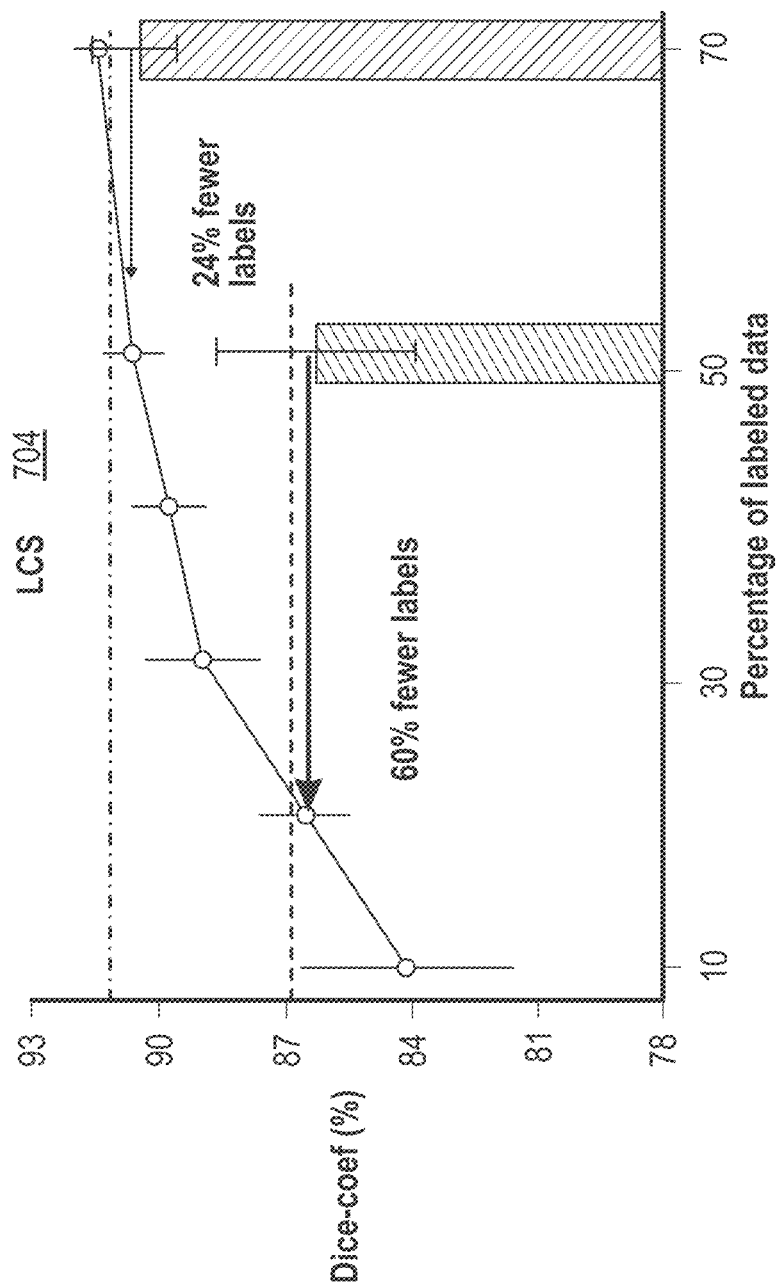
Figure 7E:
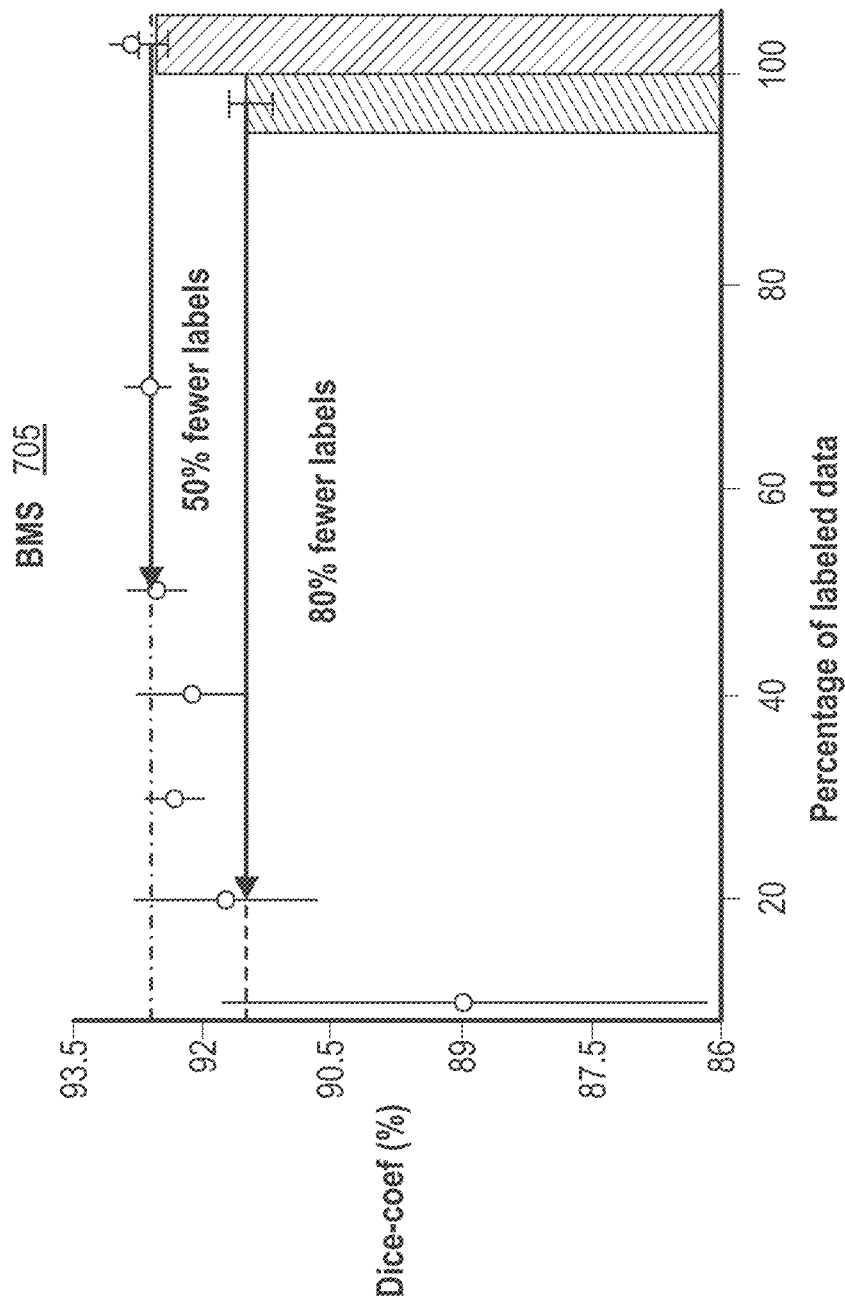

FIG. 2 depicts how the disclosed self-supervised learning framework TransVW is for learning general-purpose image representation enriched with the semantics of anatomical visual words by way of (a) self-discovery of visual words at element 209, (b) self-classification of visual words at element 216, and (c) self-restoration of visual words at element 217 for learning general-purpose image representations.

First, to discover anatomically consistent instances for each visual word across patients, we train a feature extractor $\Phi(\cdot)$ (e.g., auto-encoder) with unlabeled images, so that images of great resemblance can be automatically identified based on its deep latent features. Second, after selecting a random reference patient and using the feature extractor to find patients similar in appearance, to extract instances of a visual word, image patches are cropped at a random yet fixed coordinate across all selected patients and assigned a unique (pseudo) label to the extracted patches (instances). For simplicity and clarity, instances of four visual words are shown having been extracted at four different random coordinates to illustrate the similarity and consistency among the discovered instances of each visual word.

The self-discovery of visual words function at element 209 automatically curates a set of visual words associated with semantically meaningful labels, providing a free and rich source for training deep models to learn semantic representations. Finally, instances of the visual words are perturbed with $g(\cdot)$ and those perturbed visual words are then given as input to an encoder-decoder network with skip connections in between and a classification head at the end of the encoder.

The self-classification of visual words at element 216, and the self-restoration of visual words at element 217 empower the deep model to learn anatomical semantics from the visual words, resulting in image representation, which has proven to be more generalizable and transferable to a variety of target tasks.

Thus, a new concept "TransVW" is described, where the sophisticated anatomical patterns across medical images are natural "visual words" associated with deep semantics in human anatomy, such as those depicted at FIG. 1A. These anatomical visual words can be automatically harvested from unlabeled medical images and serve as strong yet free supervision signals for CNNs to learn semantics-enriched representation via self-supervision. The learned representation is generalizable and transferable because it is not biased to the idiosyncrasies of pre-training (pretext) tasks and datasets, thereby it can produce more powerful models to solve application-specific (target) tasks via transfer learning.

As shown here at FIG. 2, the TransVW framework consists of three components: firstly, the novel means for self-discovery of visual words at element 209, that automatically harvests anatomical visual words, exhibiting consistency (in pattern appearances and semantics) and diversity (in organ shapes, boundaries, and textures), directly from unlabeled medical images and assigns each of them with a unique label that bears the semantics associated with a particular part of the body. Secondly, the unique self-classification of visual words at element 216, that compels the model to learn semantics from anatomical consistency within visual words. And third, a scalable self-restoration of visual words at element 217 that encourages the model to encode anatomical diversity within visual words.

Extensive experiments demonstrate the annotation efficiency of TransVW in higher performance, faster convergence, and less annotation cost on the applications where there is a dearth of annotated images. Compared with existing publicly available models, pre-trained by either self-supervision or full-supervision, the disclosed TransVW offers several advantages, including: (1) TransVW is a fully autodidactic scheme, which exploits the semantics of visual words for self-supervised learning, requiring no expert annotation; (2) visual word learning is an add-on strategy, which complements existing self-supervised methods, boosting their performance; and (3) the learned image representation is semantics-enriched models, which have proven to be more robust and generalizable, saving annotation efforts for a variety of applications through transfer learning.

In summary, the following contributions are realized through practice of the disclosed embodiments: (1) An unsupervised clustering strategy, curating a dataset of anatomical visual words from unlabeled medical images. (2) An add-on learning scheme, enriching representations learned from existing self-supervised methods. (3) And an advanced self-supervised framework, elevating transfer learning performance, accelerating training speed, and reducing annotation efforts.

Transferable Visual Words:

TransVW learns transferable and generalizable image representation by leveraging the semantics associated with the anatomical patterns embedded in medical images such as those depicted at FIG. 1A. For clarity, as illustrated here at FIG. 2, a visual word is defined as a segment of consistent anatomy recurring across images and the instances of a visual word as the patches extracted across different but resembling images for this visual word. Naturally, all instances of a visual word exhibit great similarity in both appearance and semantics. Furthermore, to reflect the semantics of its corresponding anatomical parts, a unique (pseudo) label is automatically assigned to each visual word during the self-discovery process; consequently, all instances of a visual word share the same label bearing the same semantics in anatomy.

TransVW Learns Semantics-Enriched Representation:

TransVW enriches representation learning with the semantics of visual words, through the following three components.

1) Self-Discovery-Harvesting the Semantics of Anatomical Patterns to Form Visual Words:

The self-discovery component aims to automatically extract a set of C visual words from unlabeled medical images as shown here. To ensure a high degree of consistency in anatomy among the instances of each visual word, a set of K patients are first identified that display a great similarity in their overall image appearance. To do so, the whole of the patient scans in the training dataset are utilized to train a feature extractor $\Phi(\cdot)$, an auto-encoder network, to learn an identical mapping from a whole-patient scan to itself.

Once trained, its latent features can be used as an indicator of the similarity among patient scans. As a result, a set of K patient scans are formed by randomly anchoring a patient scan as the reference and appending its top K−1 nearest neighbors found throughout the entire training dataset based on the L2 distance in the latent feature space. Given the great resemblance among the selected K patient scans, the patches extracted at the same coordinate across these K scans are expected to exhibit a high degree of similarity in anatomical patterns. Therefore, for each visual word, K instances are extracted by cropping around a random but fixed coordinate across a set of selected K patients, and a unique pseudo label is then assigned to each of them. This process is then repeated C times, yielding a set of C visual words, each with K instances, extracted from C random coordinates. The extracted visual words are naturally associated with the semantics of the corresponding human body parts.

Visual words are associated with rich local semantics of the human body. As shown here, four visual words (261, 262, 263, and 264) are defined randomly in a reference patient (top-left most), where they carry local information of anterior ribs 2-4 at element 261, spinous processes at element 262, right pulmonary artery at element 263, and Left Ventricle (LV) at element 264.

In summary, the self-discovery automatically generates a dataset of visual words associated with semantic labels, as a free and rich source for training deep models to learn semantics-enriched representations from unlabeled medical images.

2) Self-Classification-Learning the Semantics of Anatomical Consistency from Visual Words:

Once a set of visual words are self-discovered, representation learning can be formulated as self-classification, a C-way multi-class classification that discriminates visual words based on their semantic (pseudo) labels. As illustrated here at the self-classification branch (element 216), there is an encoder 270 that projects visual words into a latent space 202, and a classification head 272 having a sequence of fully-connected layers, that predicts the pseudo label of visual words. It is trained by minimizing the standard categorical cross-entropy loss function (identified as equation 1):

$$L_{cls} = -\frac{1}{B}\sum_{b=1}^{B}\sum_{c=1}^{C} y_{bc} \log P_{bc}$$

where B denotes the batch size; C denotes the number of visual words classes; y and P represent the ground truth (one-hot pseudo label vector obtained from visual word IDs) and the network prediction, respectively.

Through training, the model is compelled to learn features that distinguish the anatomical dissimilarity among instances belonging to different visual words and that recognize the anatomical resemblance among instances belonging to the same visual words, resulting in image representations associated with the semantics of anatomical patterns underneath medical images. Therefore, self-classification is for learning image representation enriched with semantics that pull together all instances of each visual word, while pushing apart instances of different visual words.

3) Self-Restoration-Encoding the Semantics of Anatomical Diversity of Visual Words:

In self-discovery, the process intentionally selects patients, rather than patches, according to their resemblance at the whole patient level. Given that no scans of different patients are the same in appearance, behind their great similarity, the instances of a visual word are also expected to display subtle anatomical diversity in terms of organ shapes, boundaries, and texture. Such a balance between the consistency and diversity of anatomical patterns for each visual word is critical for deep models to learn robust image representation. To encode this anatomical diversity within visual words for image representation learning, the disclosed framework is augmented with self-restoration, training the model to restore the original visual words from the perturbed ones.

The self-restoration branch, as shown in FIG. 2, element 217, is an encoder-decoder with skip connections in between (refer to element 214). A perturbation operator $g(\cdot)$ 299 is applied on a visual word x 213 to get the perturbed visual word $\tilde{x}=g(x)$. The encoder takes the perturbed visual word $\tilde{x}$ as an input and generates a latent representation. The decoder 271 takes the latent representation from the encoder and decodes it to produce the original visual word, shown here as restored visual word 215. The perturbation operator $g(\cdot)$ 299 consists of non-linear, local-shuffling, out-painting, and in-painting transformations, as well as identity mapping (i.e., $x=g(x)$). Restoring visual word instances from their perturbations enables the model to learn image representation from multiple perspectives. The restoration branch is trained by minimizing the L2 distance between the original and reconstructed visual words according to equation 2:

$$L_{rec} = \frac{1}{B}\sum_{i=1}^{B}\|x_i - x'_i\|_2$$

where B denotes the batch size, x and x' represent the original visual word and the reconstructed prediction, respectively.

To enable end-to-end representation learning from multiple sources of information and yield more powerful models for a variety of medical tasks, in TransVW, self-classification and self-restoration are integrated together by sharing the encoder and jointly trained with one single objective function according to equation 3:

$$L=\lambda_{cls}L_{cls}+\lambda_{rec}L_{rec}$$

where $\lambda_{cls}$ and $\lambda_{rec}$ adjust the weights of classification and restoration losses, respectively.

This unique definition of $L_{cls}$ empowers the model to learn the common anatomical semantics across medical images from a strong discriminative signal-the semantic label of visual words. The definition of $L_{rec}$ equips the model to learn the anatomical finer details of visual words from multiple perspectives by restoring original visual words from varying image perturbations. Notably, practice of the disclosed embodiments enables not only discovering, classifying, and restoring visual words per se, but additionally presents a holistic pre-training scheme for learning semantics-enriched image representation, whose usefulness must be assessed objectively based on its generalizbility and transferability to various target tasks.

TransVW has Several Unique Properties, Including:

1) Autodidactic-exploiting semantics in unlabeled data for self supervision. Due to the lack of sufficiently large, curated, and labeled medical datasets, self-supervised learning holds a great promise for representation learning in medical imaging because it does not require manual annotation for pre-training. Unlike existing self-supervised methods for medical imaging, the disclosed TransVW framework explicitly employs the (pseudo) labels that bear the semantics associated with the sophisticated anatomical patterns embedded in the unlabeled images to learn more pronounced representation for medical applications. Particularly, TransVW benefits from a large, diverse set of anatomical visual words discovered by the described self-discovery process, coupled with a training scheme integrating both self-classification and self-restoration, to learn semantics-enriched representation from unlabeled medical images. With zero annotation cost, the TransVW framework not only outperforms other self-supervised methods but also surpasses publicly-available, fully-supervised pre-trained models, including I3D, NiftyNet, and MedicalNet.

2) Comprehensive-blending consistency with diversity for semantics richness. The disclosed self-discovery component secures both consistency and diversity within each visual word, thereby offering a lucrative source for pre-training deep models. More specifically, the self-discovery process computes similarity at the patient level and selects the top nearest neighbors (refer to element 207 at FIG. 2) of the reference patient (refer to element 201 at FIG. 2). Extracting visual word instances from these similar patients, based on random but fixed coordinates, strikes a balance between consistency and diversity of the anatomical pattern within each visual word. Consequently, the self-classification (element 216) exploits the semantic consistency by classifying visual words according to their pseudo labels, resulting in class-level feature separation among visual word classes. Furthermore, the self-restoration component (element 217) leverages the fine-grained anatomical information, such as the subtle diversity of intensity, shape, boundary, and texture, enabling instance-level feature separation among instances within each visual word. As a result, the TransVW framework disclosed herein projects visual words into more comprehensive feature space in both class-level and instance level by blending consistency with diversity.

3) Robust-preventing superficial solutions for deep representation. Self-supervised learning is notorious for learning shortcut solutions in tackling pretext tasks, leading to less generalizable image representations. However, the disclosed method, especially the self-classification component (element 216), is discouraged from learning superficial solutions since the self-discovery process imposed substantial diversity among instances of each visual word. Furthermore, two well-known techniques are adopted to further improve the diversity of visual words. Firstly, the described operations extract multi-scale instances for each visual word within a patient, in which each instance is randomly jittered by a few pixels. Consequently, having various scale instances in each class enforces self-classification to perform more semantic reasoning by preventing easy matching of simple features among the instances of the same class. Secondly, during pre-training, visual words are augmented with various image perturbations to increase the diversity of data. Altogether, the substantial diversity of visual words coupled with various image perturbations enforce the pretext task to capture semantic-bearing features, resulting in a compelling and robust representation obtained from anatomical visual words.

4) Versatile-complementing existing self-supervised methods for performance enhancement. TransVW boasts an innovative add-on capability, a versatile feature that is unavailable in other self-supervised learning methods. Unlike existing self-supervised methods that build supervision merely from the information within individual images of training data, the self-discovery and self-classification leverage the anatomical similarities present across different images (reflected in visual words) to learn common anatomical semantics. Consequently, incorporating visual word learning into existing self-supervised methods enforces them to encode semantic structures of visual words into their learned embedding space, resulting in more versatile representations. Therefore, the self-discovery and self-classification components together can serve as an add-on to boost existing self-supervised methods, as evidenced by the experimental results which follow below.

FIG. 3 depicts Table 1 element 300 which describes seven publicly-available medical imaging applications including 3D and 2D image classification and segmentation tasks, across diseases, organs, datasets, and modalities, which has been utilized for the evaluation of the learned representation, in accordance with described embodiments.

Target Tasks for Transfer Learning:

According to the described embodiments, operations transfer the learned representations by fine-tuning it for seven medical imaging applications including 3D and 2D image classification and segmentation tasks. So as to evaluate the generalization ability of the TransVW, a diverse set of applications were selected ranging from the tasks on the same dataset as pre-training to the tasks on the unseen organs, datasets, or modalities during pre-training. For each task, the checkmark "✓" denotes the properties that are in common between the pretext and target tasks.

Pre-training TransVW: TransVW models were pre-trained solely on unlabeled images. Nevertheless, to ensure no test-case leaks from pretext tasks to target tasks, any images that will be used for validation or test in target tasks are excluded from pre-training (refer to Table 1, element 300 at FIG. 3). Two pre-trained models were utilized: (1) TransVW Chest CT in 3D, which was pre-trained from scratch using 623 chest CT scans in LUNA 16 (the same as the publicly released Models Genesis), and (2) TransVW Chest X-rays in 2D, which was pre-trained on 76K chest Xray images in ChestX-ray 14 datasets. For the sake of experimentation, C=45 for TransVW Chest CT and C=100 for TransVW Chest X-rays (additional ablation studies are described below illustrating the impact of the number of visual words on performance). The experiment empirically set K=200 and K=1000 for TransVW Chest CT and TransVW Chest X-rays, respectively, to strike a balance between diversity and consistency of the visual words. For each instance of a visual word, multi-scale cubes/patches for 3D/2D images are cropped, and then all are resized to 64×64×32 and 224×224 for TransVW Chest CT and TransVW Chest X-rays, respectively (samples of the discovered visual words are described below).

Fine-Tuning TransVW:

The pre-trained TransVW may be used for a variety of target tasks through transfer learning. For instance, the pretrained encoder can be utilized for target classification tasks by appending a target task-specific classification head; moreover, the pretrained encoder and decoder can be utilized for target segmentation tasks by replacing the last layer with a 1×1×1 convolutional layer. The generalization and transferability of TransVW was then evaluated by fine-tuning all the parameters of target models on seven diverse target tasks, including image classification and segmentation tasks in both 2D and 3D.

As summarized in Table 1 (element 300 at FIG. 3) and detailed below, these target tasks offer the following two advantages: First, by covering a wide range of diseases, organs, and modalities, the experiments verify the add-on capability of TransVW on various 3D target tasks, covering a diverse range of diseases (e.g., nodule, embolism, tumor), organs (e.g., lung, liver, brain), and modalities (e.g., CT and MRI). It also enables verification of the generalizability of TransVW in not only the target tasks on the same dataset as pre-training (NCC and NCS), but also target tasks with a variety of domain shifts (ECC, LCS, and BMS) in terms of modality, scan regions, or dataset. These experiments are among the first to investigate cross-domain self-supervised learning in medical imaging. Secondly, the target tasks enjoy a sufficient amount of annotation which thus paves the way for conducting annotation reduction experiments to verify the annotation efficiency of TransVW.

Benchmarking TransVW:

For a thorough evaluation, in addition to the training from scratch (the lower-bound baseline), TransVW was compared with a whole range of transfer learning baselines, including both self-supervised and fully-supervised methods.

Self-Supervised Baselines:

TransVW was compared with Models Genesis, which is the state-of-the-art self-supervised learning method for 3D medical imaging, as well as Rubik's cube, the most recent multi-task self-supervised learning method for 3D medical imaging. Since most self-supervised learning methods are initially proposed in the context of 2D images, the three most representative examples were also extended into their 3D version for a fair comparison during the experiments.

Supervised Baselines:

For the experiment, publicly available fully-supervised pre-trained models for 3D transfer learning in medical imaging were also examined, including NiftyNet and MedicalNet. Moreover, Inflated 3D (I3D) was also fine-tuned in the 3D target tasks since it has been successfully utilized to initialize 3D models for lung nodule detection.

The experiments utilize 3D U-Net[2] for 3D applications, and U-Net[3] with ResNet-18 as the backbone for 2D applications. For the pretext task, the experiment modified those architectures by appending fully-connected layers to the end of the encoders for the classification head. In pretext tasks, the experiment set the weights of losses as $L_{rec}=1$ and $L_{cls}=0.01$. All the pretext tasks were trained using an Adam optimizer, with a learning rate of 0.001, where $\beta_1=0.9$ and $\beta_2=0.999$. Regular data augmentation techniques including random flipping, transposing, rotating, elastic transformation, and adding Gaussian noise were utilized in target tasks. The experiments used the early-stop technique on the validation set to prevent overfitting. The experiments ran each method ten times on each target task and report the average, standard deviation, and further provide statistical analyses based on independent two-sample t-test.

Results:

The cornerstones of the experimental results are shown here, demonstrating the significance of the proposed self-supervised learning framework. First, the two novel components, self-discovery and self-classification of visual words, were integrated into four popular self-supervised methods, suggesting that these two components can be adopted as an add-on to enhance the existing self-supervised methods. The TransVW framework was then compared with the current state-of-the-art approaches in a triplet of aspects: transfer learning performance, convergence speedup, and annotation cost reduction, concluding that TransVW is an annotation-efficient method for medical image analysis.

TransVW is an Add-on Scheme:

The self-discovery and self-classification components can readily serve as an add-on to enrich existing self-supervised learning approaches. In fact, by introducing these two components, the door is opened for the existing image-based self-supervision approaches to capture a more high-level and diverse visual representation that reduces the gap between pre-training and semantic transfer learning tasks.

Experimental Setup:

According to described embodiments and further to study the add-on capability of our self-discovery and self-classification components, they were incorporated into four representative self-supervised methods, including (1) Models Genesis, which restores the original image patches from the transformed ones; (2) In-painting, which predicts the missing parts of the input images; (3) Context restoration, which restores the original images from the distorted ones that are obtained by shuffling small patches within the images; and (4) Rotation, which predicts the rotation angles that are applied to the input images.

Since all the reconstruction-based self-supervised methods utilize encoder-decoder architecture with skip connections in between, certain embodiments appended additional fully-connected layers to the end of the encoder, thus enabling models to learn image representation simultaneously from classification and restoration tasks. For Rotation, the network only includes an encoder, followed by two classification heads to learn representations from rotation angle prediction as well as the visual words classification tasks. Note that the original self-supervised methods (including Rotation, In-painting, and Context restoration), were implemented in 2D, but were extended into 3D in support of the described embodiments.

FIGS. 4A, 4B, 4C, 4D, and 4E chart results for both with and without semantics-enriched representation in the self-supervised learning approaches, in accordance with described embodiments.

FIGS. 4A, 4B, 4C, 4D, and 4E depict how the proposed self-supervised learning scheme serves as an add-on, which can be added to enrich existing self-supervised learning methods. By introducing self-discovery and self-classification of visual words, four representative self-supervised learning advances are empowered, including In-painting 413, Context restoration (Shuffling) 411, Rotation 409, and Models Genesis 415, so as to capture more high-level and diverse representations, resulting in substantial ($p<0.05$) performance improvements on five 3D target tasks.

Observations:

The results as set forth in FIGS. 4A, 4B, 4C, 4D, and 4E, demonstrate that incorporating visual words with existing self-supervised methods consistently improves their performance across five 3D target tasks. Specifically, visual words significantly improve Rotation by 3%, 1.5%, 2%, 1.5%, and 5%; context restoration by 1.75%, 1%, 5%, 2%, and 8%; In-painting by 2%, 1.5%, 3%, 3%, and 6% in each of NCC 401, NCS 402, ECC 403, LCS 404, and BMS 405 applications, respectively (refer to elements 410, 411, 412, 413, and 414). Moreover, visual words significantly advance Models Genesis 415 by 1%, 1.5%, and 1% in NCC, LCS, and BMS, respectively.

How can TransVW Improve Representation Learning?

Most existing self-supervised learning methods, such as predicting contexts or discriminating image transformations, concentrate on learning the visual representation of each image individually, thereby, overlooking the notion of semantic similarities across different images. In contrast, appreciating the recurrent anatomical structure in medical images, the described self-discovery mechanism extracts meaningful visual words across different images and assigns unique semantic pseudo labels to them. By classifying the resultant visual words according to their pseudo labels, the self-classification is enforced to explicitly recognize these visual words across different images-grouping similar visual words together while separating dissimilar ones apart.

Consequently, integrating our two novel components into existing self-supervised methods empowers the model to not only learn the local context within a single image but also learn the semantic similarities of the consistent and recurring visual words across images. It is worth noting that self-discovery and self-classification should be considered a significant add-on in terms of methodology. As shown below via the chart results at FIGS. 4A, 4B, 4C, 4D, and 4E, simply adding these two components on top of four popular self-supervised methods can noticeably improve their fine-tuning performance.

TransVW is an Annotation-Efficient Method:

To ensure the method addresses the annotation scarcity challenge in medical imaging, the experiments first precisely defined the annotation-efficiency term. The experiments consider a method as annotation-efficient if (1) it achieves superior performance using the same amount of annotated training data, (2) it reduces the training time using the same amount of annotated data, or (3) it offers the same performance but requires less annotated training data. Based on this definition, the experiments adopt a rigorous three-pronged approach in evaluating the results, by considering not only the transfer learning performance but also the acceleration of the training process and label efficiency on a variety of target tasks, demonstrating that TransVW is an annotation-efficient method.

1) TransVW Provides Superior Transfer Learning Performance:

A generic pre-trained model transfers well to many different target tasks, indicated by considerable performance improvements. Thus, the experiments first evaluate the generalizability of TransVW in terms of improving the performance of various medical tasks across diseases, organs, and modalities.

Experimental Setup:

The experiments fine-tune TransVW on five 3D target tasks, as described in Table 1 (refer to FIG. 3), covering classification and segmentation. The experiments investigated the generalizability of TransVW not only in the target tasks with the pre-training dataset (NCC and NCS), but also in the target tasks with a variety of domain shifts (ECC, LCS, and BMS).

FIG. 5 depicts Table 2 at element 500, which shows that Transferable Visual Word (TransVW) 512 models outperform learning 3D models from scratch as well as three competing publicly available (fully) supervised pre-trained 3D models and five self-supervised learning approaches in five medical target tasks, in accordance with described embodiments.

As shown here, TransVW significantly outperforms training from scratch, and achieves the best or comparable performance in five 3D target applications over five self-supervised and three publicly available supervised pre-trained 3D models. The experiments evaluated the classification (i.e., NCC 505 and ECC 507) and segmentation (i.e., NCS 506, LCS 508, and BMS 509) target tasks 510 under AUC and IoU metrics, respectively. For each target task, the average performance and standard deviation across ten runs are shown. The experiments further performed independent two sample t-test between the best (bolded) vs. others and highlighted boxes in green 511 when they are not statistically significantly different at the $p=0.05$ level.

Observations:

The evaluations in Table 2 (refer to FIG. 5) suggest three major results.

Firstly, TransVW significantly outperforms training from scratch in all five target tasks under study by a large margin and also stabilizes the overall performance.

Secondly, TransVW surpasses all self-supervised counterparts in the five target tasks. Specifically, TransVW significantly outperforms Models Genesis, state-of-the-art self-supervised 3D models pre-trained using image restoration, in three applications, i.e., NCC, LCS, and BMS, and offers equivalent performance in NCS and ECC. Moreover, TransVW yields remarkable improvements over Rubik's cube, the most recent 3D multi-task self-supervised method, in all five applications. Particularly, Rubik's cube formulates a multi-task learning objective solely based on contextual cues within single images while TransVW benefits from semantic supervision of anatomical visual words, resulting in more enhanced representations.

Thirdly, TransVW achieves superior performance in comparison with publicly available fully-supervised pre-trained 3D models, i.e., NiftyNet, MedicalNet, and I3D, in all five target tasks. It is noteworthy that our TransVW does not solely depend on the architecture capacity to achieve the best performance since it has much fewer model parameters than its counterparts. Specifically, TransVW is trained on basic 3D U-Net with 23M parameters, while MedicalNet with ResNet-101 as the backbone carries 85.75M parameters, and I3D contains 25.35M parameters in the encoder. Although NiftyNet model is offered with 2.6M parameters, its performance is not as good as its supervised counterparts in any of the target tasks.

Although TransVW is pre-trained on chest CT scans, it is still beneficial for different organs, diseases, data sets, and even modalities. In particular, the pulmonary embolism false positive reduction (ECC) is on Contrast-Enhanced CT scans, which may appear differently from the normal CT scans that are used for pre-training; yet, according to Table 2 (refer to FIG. 5), TransVW obtains a 7% improvement over training 3D models from scratch in this task. Additionally, fine-tuning from TransVW provides a substantial gain in liver segmentation (LCS) accuracy despite the noticeable differences between pretext and target domains in terms of organs (lung vs. liver) and datasets (e.g., LUNA 2016 vs. LiTS 2017). The experiments further examine the transferability of TransVW in brain tumor segmentation on MRI Flair images (BMS). Referring again to Table 2 (e.g., at FIG. 5), despite the marked differences in organs, datasets, and even modalities between the pretext and BMS target task, it was observed through experimental a significant performance boost from fine-tuning TransVW in comparison with learning from scratch. Moreover, TransVW significantly outperforms Models Genesis in the most distant target domains from the pretext task, i.e., LCS, and BMS.

How can TransVW Improve the Performance of Cross-Domain Target Tasks?

Learning universal representations that can transfer effectively to a wide range of target tasks is one of the supreme goals of computer vision in medical imaging. The best-known existing examples of such representations are pre-trained models on ImageNet dataset. Although there are marked differences between natural and medical images, the image representations learned from ImageNet can be beneficial not only for natural imaging, but also for medical imaging. Therefore, rather than developing pre-trained models specifically for a particular dataset/organ, TransVW aims to develop generic pre-trained 3D models for medical image analysis that are not biased to idiosyncrasies of the pre-training task and dataset and generalize effectively across organs, datasets, and modalities.

As is well-known, CNNs trained on large scale visual data form feature hierarchies; lower layers of deep networks are in charge of general features while higher layers contain more specialized features for target domains. Due to generalizability of low and mid-level features, they can lead to significant benefits of transfer learning, even when there is a substantial domain gap between the pretext and target task. Therefore, while TransVW is pre-trained solely on chest CT scans, it still elevates the target task performance in different organs, datasets, and modalities since its low and mid-level features can be reused in the target tasks.

2) TransVW Accelerates the Training Process:

Although accelerating the training of deep neural networks is arguably an influential line of research, its importance is often under-appreciated in the medical imaging literature. Transfer learning provides a warm-up initialization that enables target models to converge faster and mitigates the vanishing and exploding gradient problems. In that respect, the experimental results support the argument that a good pre-trained model should yield better target task performance with less training time. Hence, the experiments further evaluate TransVW in terms of accelerating the training process of various medical tasks.

Experimental Setup:

The experiment compared the convergence speedups obtained by TransVW with training from scratch (the lower bound baseline) and Models Genesis (the state-of-the-art baseline) in the five 3D target tasks. For conducting fair comparisons in all experiments, all methods benefit from the same data augmentation and use the same network architecture while the experiment endeavored to optimize each model with the best-performing hyper-parameters.

FIGS. 6A, 6B, 6C, 6D, and 6E present the learning curves for training from scratch 609, fine-tuning from Models Genesis 610, and fine-tuning from TransVW 611 on five target tasks, in accordance with described embodiments.

The results presented at FIGS. 6A, 6B, 6C, 6D, and 6E, depict how fine-tuning from TransVW provides better optimization and accelerates the training process in comparison with training from scratch as well as state-of-the-art Models Genesis, as demonstrated by the learning curves for the five 3D target tasks. All models are evaluated on the validation set, and the average accuracy and dice-coefficient over ten runs are plotted for the classification and segmentation tasks, respectively.

Observations:

The results depicted here at FIGS. 6A, 6B, 6C, 6D, and 6E present the learning curves for training from scratch 609, fine-tuning from Models Genesis 610, and fine-tuning from TransVW 611. The results demonstrate that initializing 3D models from TransVW remarkably accelerates the training process of target models in comparison with not only learning from scratch but also Models Genesis in all five target tasks. These results imply that TransVW captures representations that are more aligned with the subsequent target tasks, leading to faster convergence of the target models.

Putting the transfer learning performance on five target tasks in Table 2 (e.g., at FIG. 5) and the training times in FIGS. 6A, 6B, 6C, 6D, and 6E together, TransVW demonstrates significantly better or equivalent performance with remarkably less training time in comparison to its 3D counterparts. Specifically, TransVW significantly outperforms Models Genesis in terms of both performance and saving training time in three out of five applications, i.e., NCC 601, LCS 604, and BMS 605, and achieves equivalent performance in NCS 602 and ECC 603 but in remarkably less time. Altogether, it is believed that TransVW can nevertheless serve as a primary source of transfer learning for 3D medical imaging applications to boost the performance and accelerate the training of target tasks.

3) TransVW Reduces the Annotation Cost:

Transfer learning yields more accurate models by reusing the previously learned knowledge in target tasks with limited annotations. This is because a good representation should not need many samples to learn about a concept. Thereby, experiments were conducted on partially labeled data to investigate transferability of TransVW in small data regimes.

Experimental Setup:

The experiment compared the transfer learning performance of TransVW using partially labeled data with training from scratch and fine-tuning from Models Genesis in five 3D target tasks. For clarity, the experiment determined the minimum required data for training from scratch and fine-tuning Models Genesis to meet the comparable performance (based on independent two-sample t-test) when training using the entire training data. Moreover, the experiment investigated the minimum required data for TransVW to meet the equivalent performance that training from scratch and fine-tuning Models Genesis can achieve.

FIGS. 7A, 7B, 7C, 7D, and 7E illustrate the results of using the partial amount of labeled data during the training of five 3D target tasks, in accordance with described embodiments.

The charts set forth at FIGS. 7A, 7B, 7C, 7D, and 7E show that fine-tuning TransVW 711 reduces the annotation cost by 50%, 50%, 57%, 60%, and 80% in NCC 701, NCS 702, ECC 703, LCS 704, and BMS 705 applications, respectively, when compared with training from scratch 709. Moreover, TransVW reduces the annotation efforts by 17%, 24%, and 50% in NCC, LCS, and BMS applications, respectively, compared with state-of-the-art Models Genesis 710. The horizontal gray and orange lines show the performance achieved by training from scratch and Models Genesis, respectively, when using the entire training data. The gray and orange bars indicate the minimum portion of training data that is required for training models from scratch and Models Genesis to achieve the comparable performance (based on the statistical analyses) with the corresponding models when training with the entire training data.

Observations:

As an illustrative example for the results of results of using the partial amount of labeled data during the training of five 3D target tasks, in lung nodule false positive reduction (NCC), the results demonstrate that using only 35% of training data, TransVW achieves equivalent performance to training from scratch using 70% of data. Therefore, around 50% of the annotation cost in NCC can be reduced by fine-tuning models from TransVW compared with training from scratch. In comparison with Models Genesis in the same application (NCC), TransVW with 75% of data achieves equal performance with Models Genesis using 90% of data. Therefore, about 17% of the annotation cost associated with fine-tuning from Models Genesis in NCC is recovered by fine-tuning from TransVW.

In general, transfer learning from TransVW reduces the annotation cost by 50%, 50%, 57%, 60%, and 80% in comparison with training from scratch in NCC, NCS, ECC, LCS, and BMS applications, respectively. In comparison with Models Genesis, TransVW reduces the annotation efforts by 17%, 24%, and 50% in NCC, LCS, and BMS applications, respectively, and both models performs equally in the NCS and ECC applications. These results suggest that TransVW achieves state-of-the-art or comparable performance over other self-supervised approaches while being more efficient, i.e., less annotated data is required for training high-performance target models.

Summary of the Experiments and Results:

The experiments and results demonstrate that TransVW provides more generic and transferable representations compared with self-supervised and supervised 3D competitors, confirmed by the evaluations on a triplet of transfer learning performance, optimization speedup, and annotation cost. To further illustrate the effectiveness of the disclosed framework, TransVW was further adopted into the nnU-Net, a state-of-the-art segmentation framework in medical imaging, and it was then evaluated on liver tumor segmentation task from the Medical Segmentation Decathlon. The results demonstrate that TransVW obtains improvements in segmentation accuracy over training from scratch and Models Genesis by 2.5% and 1%, respectively as further detailed below. These results are in line with previous results and reinforce the primary insight that TransVW provides an annotation-efficient solution for 3D medical imaging.

Ablation Experiments:

Ablation experiments were conducted to illustrate the contribution of different components to the performance of TransVW. A 2D model was then trained using chest X-ray images, called TransVW 2D, and it was compared with state-of-the-art 2D models. The 2D experiments consider three target tasks: thorax diseases classification (DXC), pneumothorax segmentation (PXS), and lung nodule false positive reduction (NCC). The experiments evaluate NCC in a 2D slice-based solution, where the 2D representation is obtained by extracting axial slices from the volumetric dataset.

Comparing Individual Self-Supervised Tasks:

The TransVW takes the advantages of two sources in representation learning: self-classification and self-restoration of visual words. Therefore, the experiments first directly compare the two isolated tasks and then investigate whether joint-task learning in TransVW produces more transferable features compared with isolated training schemes. In Table 2 (at FIG. 5), the last three rows show the transfer learning results of TransVW and each of the individual tasks in five 3D applications. According to the statistical analysis results, self-restoration and self-classification reveal no significant difference ($p\text{-value}>0.05$) in three target tasks, NCS, ECC, and LCS, and self-restoration achieves significantly better performance in NCC and BMS. Despite the success of self-restoration in encoding fine-grained anatomical information from individual visual words, it neglects the semantic relationships across different visual words. In contrast, the novel self-classification component described herein as a part of the TransVW framework explicitly encodes the semantic similarities that presents across visual words into the learned embedding space. Therefore, as evidenced by Table 2 (at FIG. 5), integrating self-classification and self-restoration into a single framework yields a more comprehensive representation that can guarantee the highest target task performance. In particular, TransVW outperforms each isolated task in four applications, i.e., NCC, ECC, LCC, and BMS, and provides comparable performance with self-restoration in NCS.

Evaluating 2D Applications:

The experiments evaluate the TransVW 2D with Models Genesis 2D (self-supervised) and ImageNet (fully-supervised) pre-trained models in two experimental settings: (1) linear evaluation on top of the fixed features from the pre-trained network, and (2) full fine-tuning of the pre-trained network for target tasks.

Figure 8A:
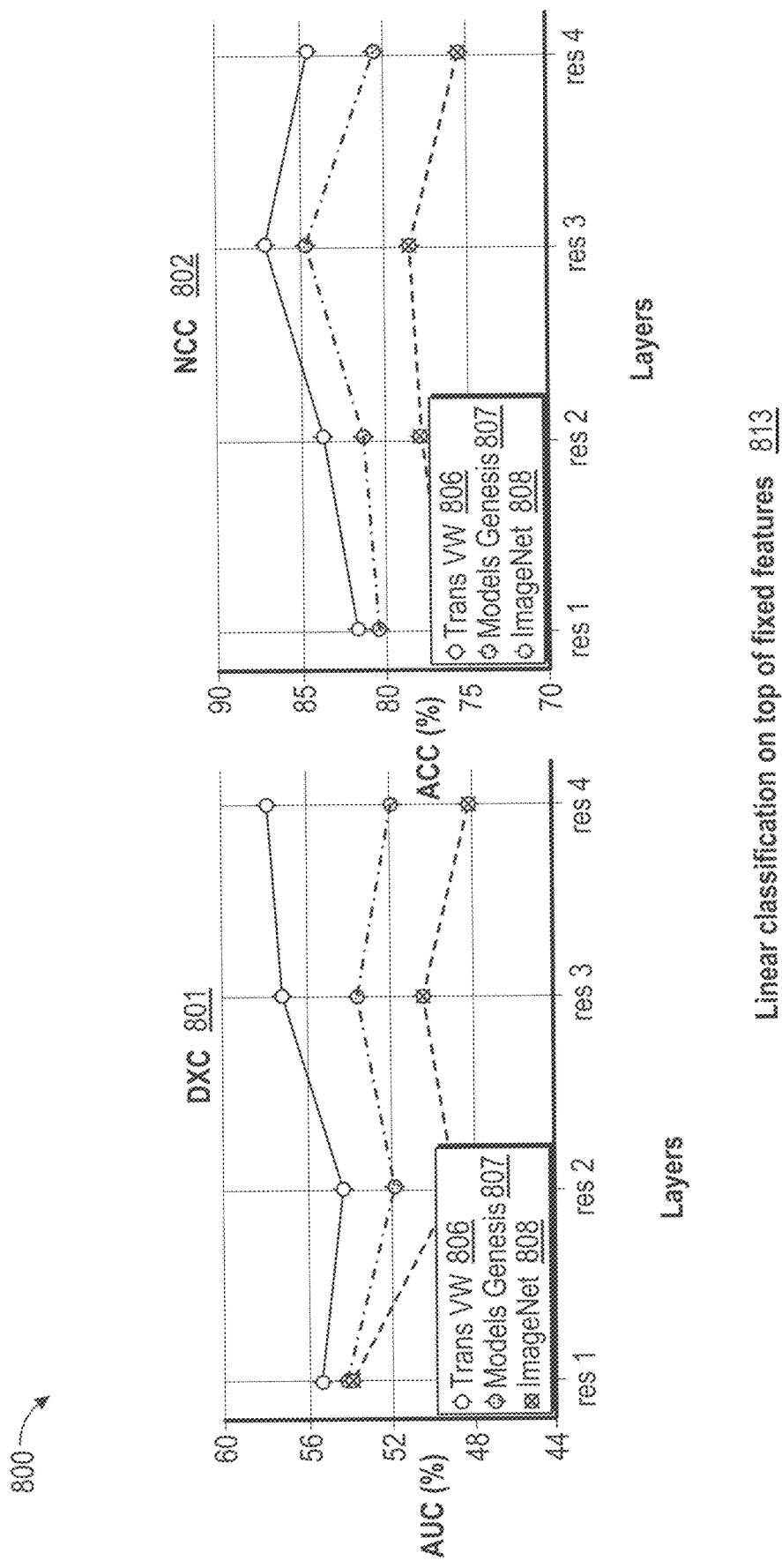
FIGS. 8A and 8B show a comparison of the learned representation of TransVW 2D with Models Genesis 2D (self-supervised) and ImageNet (fully supervised) by (a) training linear classifiers on top of fixed features, and (b) full fine-tuning of the models on 2D medical imaging applications, in accordance with described embodiments.
Figure 8B:
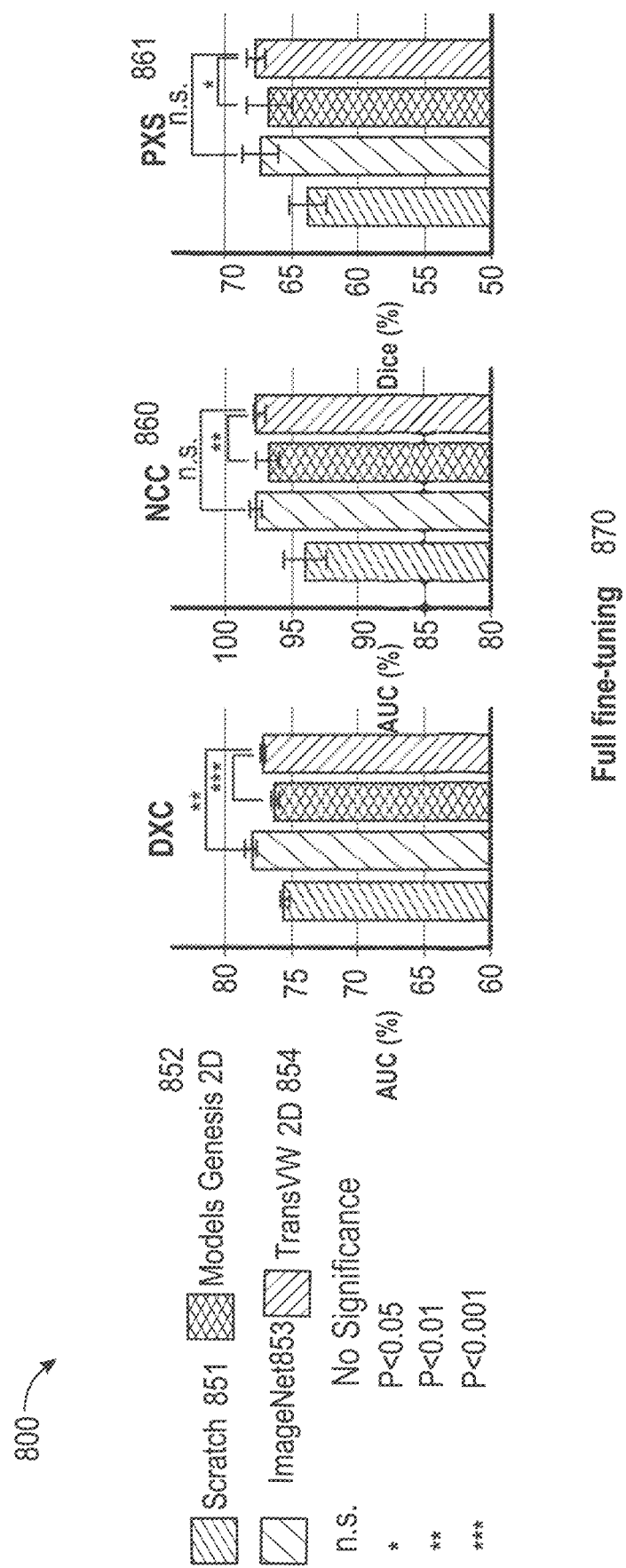
Figure 9A:
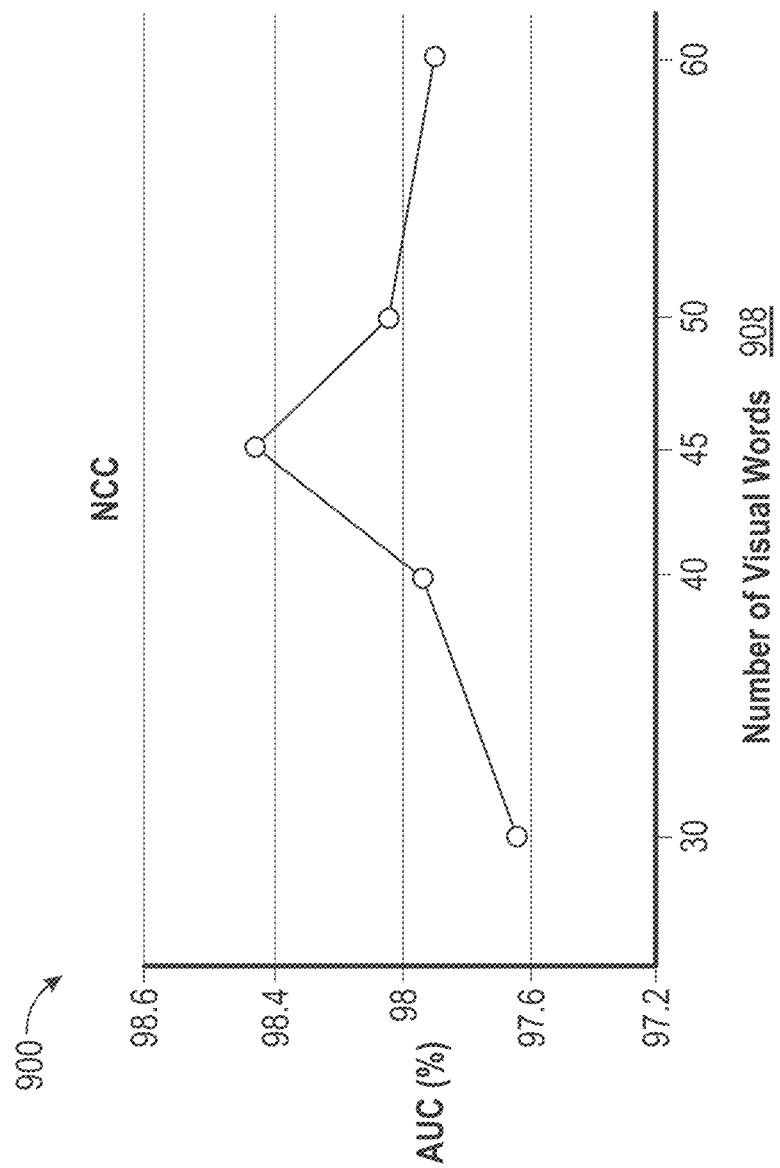
FIGS. 9A, 9B, 9C, 9D, and 9E show the results of an ablation study demonstrating the impact of the number of visual words classes on the target task performance on five 3D target tasks; the average performance over ten runs is reported for each model on each task, with the best performance achieved with C=45 in all applications.
Figure 9B:
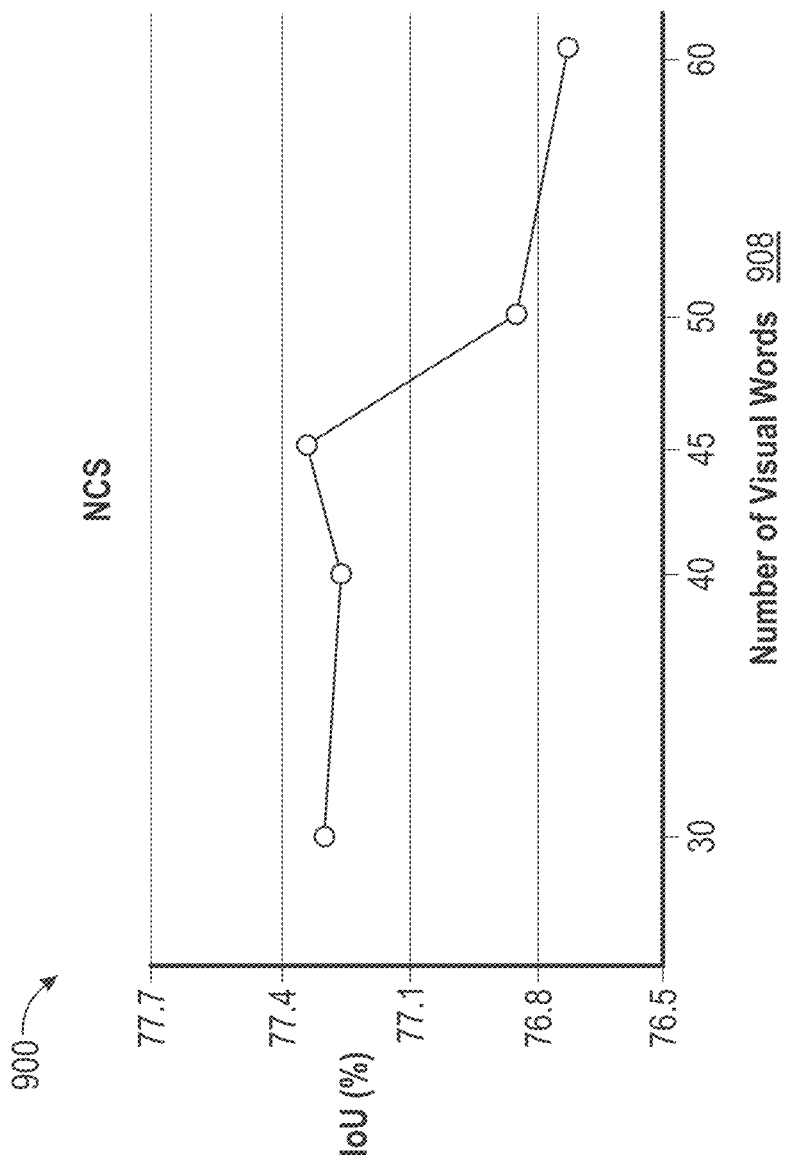
Figure 9C:
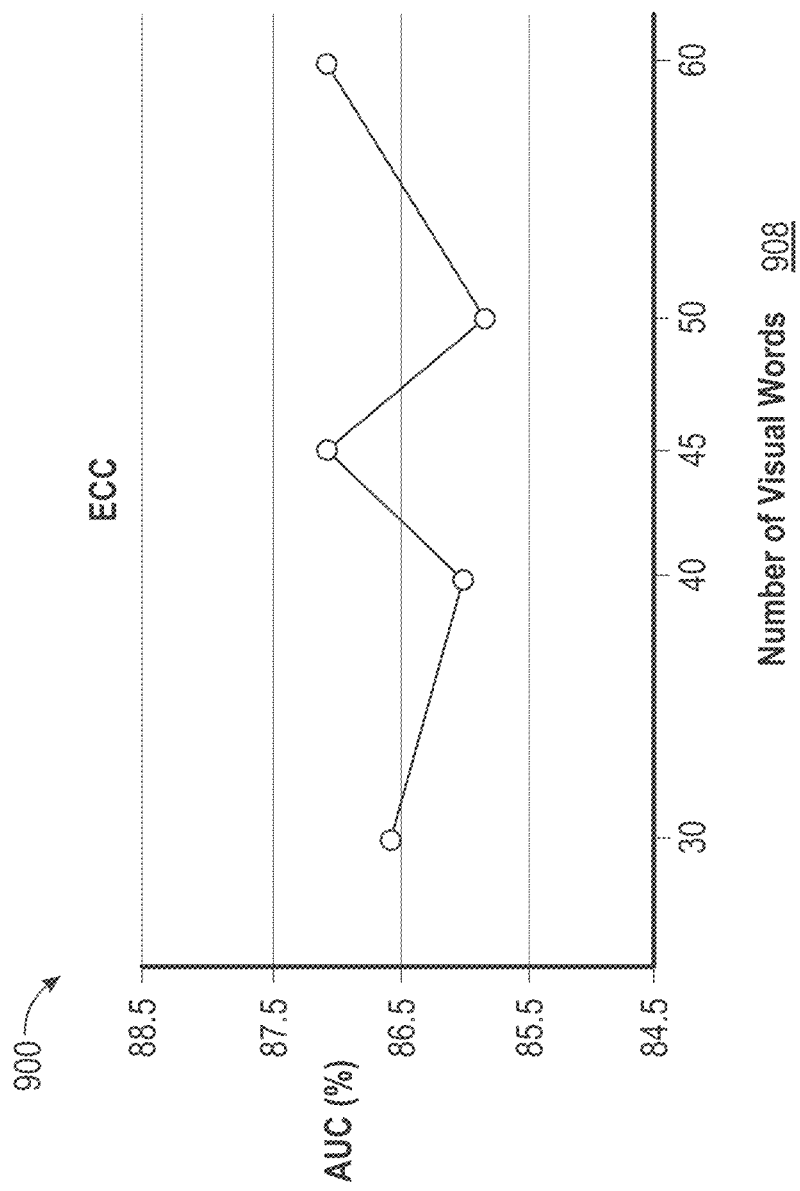
Figure 9D:
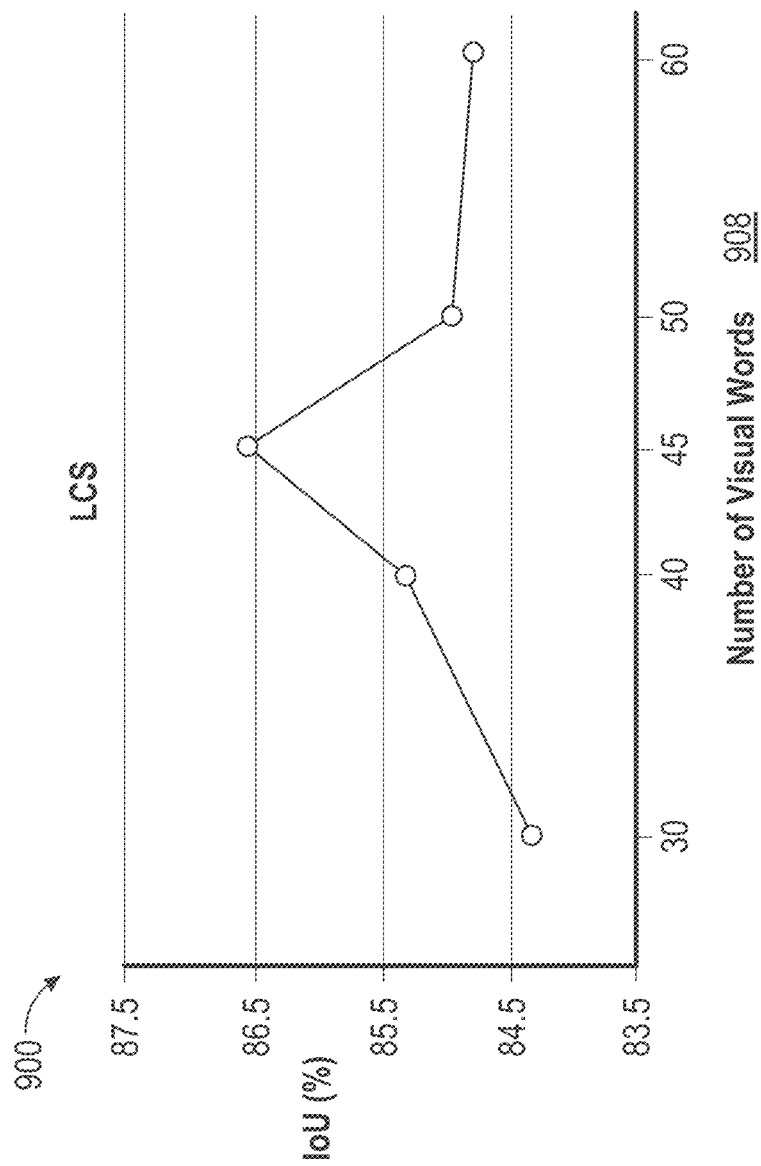
Figure 9E:
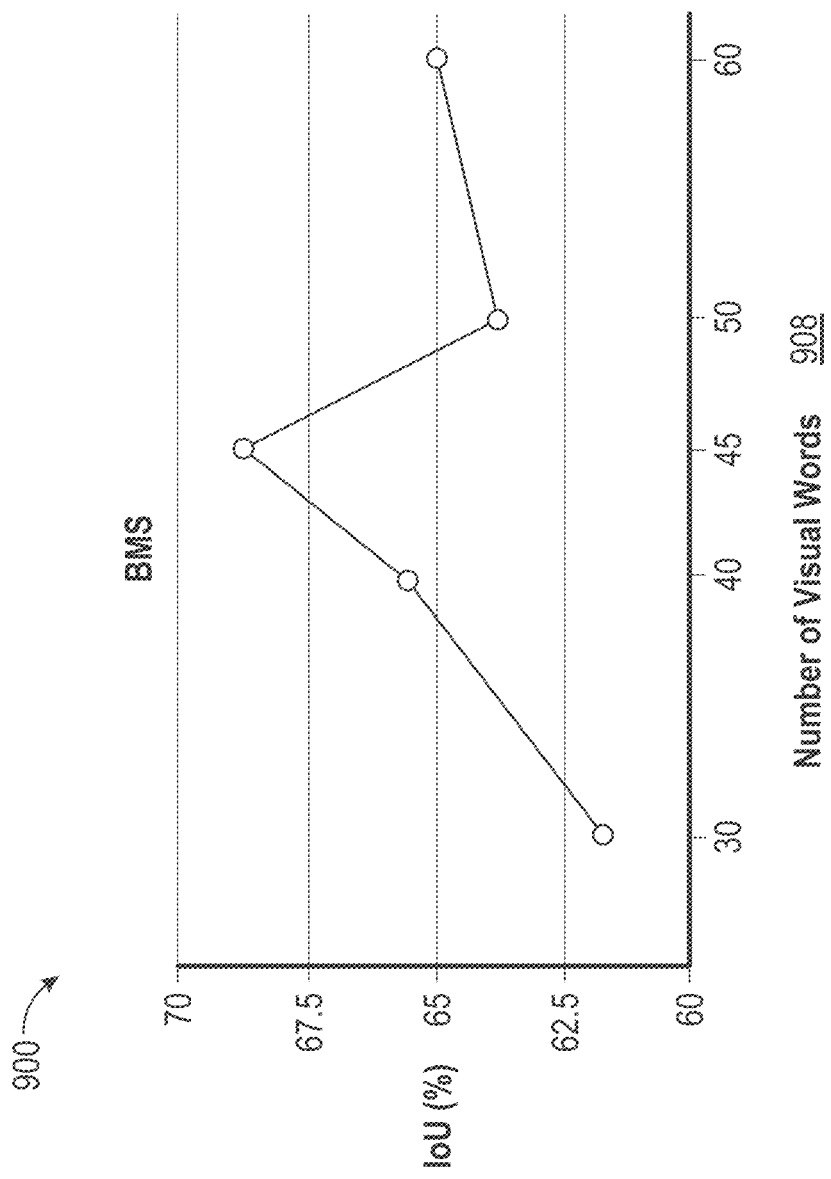

FIGS. 8A and 8B at 800 show a comparison of the learned representation of TransVW 2D 806 with Models Genesis 2D (self-supervised)807 and ImageNet (fully supervised) 808 by (a) training linear classifiers on top of fixed features 813, and (b) full fine-tuning 870 of the models on 2D applications, in accordance with described embodiments.

Linear Evaluation:

To evaluate the quality of the learned representations, the experiments follow the common practice in which trains linear classifiers on top of the fixed features obtained from various layers of the pre-trained networks. Specifically, for ResNet-18 backbone, the experiments extracted image features from the last layer of every residual stage (denoted as res1, res2, etc.), and then evaluated them in two classification target tasks (DXC 801 and NCC 802). Based on the results as set forth at FIG. 8A, TransVW 2D representations are transferred better across all the layers on both target tasks in comparison with Models Genesis 2D and ImageNet, demonstrating the generalizability of TransVW 2D representations. Specifically, in thorax diseases classification (DXC), which is in the same dataset as the pretext task, the best performing features are extracted from res4 in the last layer of the TransVW 2D network. This indicates that TransVW 2D encourages the models to squeeze out high-level representations, which are aligned with the target task, in the deeper layers of the network. Moreover, in lung nodule false positive reduction (NCC), which presents a domain shift compared with the pretext task, TransVW 2D remarkably reduces the performance gap between res3 and res4 features compared with Models Genesis 2D and ImageNet. This suggests that TransVW reduces the overfitting of res4 features to the pretext task and dataset, resulting in more generic features.

With respect to linear evaluations, we observed that: (a), TransVW representations are transferred better across all the layers on both DXC and NCC in comparison with Models Genesis 2D and ImageNet, demonstrating more generalizable features. And it was further observed that, based on the fine-tuning results: (b), TransVW 2D significantly surpasses training from scratch and Models Genesis 2D, and achieves equivalent performance with ImageNet in NCC and PXS.

Full Fine-Tuning:

The experiments evaluate the initialization provided by the TransVW 2D framework via fine-tuning it for three 2D target tasks, covering classification (DXC and NCC) and segmentation (PXS) in X-ray and CT. As evidenced by the statistical analysis set forth at FIG. 8B, TransVW 2D 854: (1) significantly surpasses training from scratch 851 and Models Genesis 2D 852 in all three applications, and (2) achieves equivalent performance with ImageNet 853 in NCC 860 and PXS 861, which is a significant achievement because to date, self-supervised approaches lag behind fully supervised training. Taken together, these results indicate that the TransVW 2D, which comes at zero annotation cost, generalizes well across tasks, datasets, and modalities.

Is there any Correspondence Between Linear Evaluation and Fine-Tuning Performance?

As shown at FIGS. 8A and 8B, ImageNet models underperform in linear evaluations with fixed features; however, full fine-tuning of ImageNet features yield higher (in DXC) or equal (in NCC and PXS) performance compared with TransVW 2D. Based on the results, it is surmised that although ImageNet models leverage large-scale annotated data during pre-training, due to the marked domain gap between medical and natural images, the fixed features of ImageNet models may not be aligned with medical applications. However, transfer learning from ImageNet models can still provide a good initialization point for the CNNs since its low and mid-level features can be reused in the target tasks. Thus, fine-tuning their features on a large-scale dataset such as ChestX-ray 14 could mitigate the discrepancy between natural and medical domains, yielding good target task performance.

Observations suggest that although linear evaluation is informative for utilizing fixed features, it may not have a strong correlation to the fine-tuning performance.

Incorporating TransVW with nnU-Net Framework:

The nnU-Net framework has shown state-of-the-art performance in various segmentation tasks in medical imaging; specifically, it won first place in the 2018 Decathlon challenge. To further demonstrate the transferability and effectiveness of our pre-trained model, experiments adopted TransVW to the nnU-Net framework and evaluated it on liver tumor segmentation task from the Medical Segmentation Decathlon challenge. In order to do so, experiments pre-trained TransVW on liver architecture from nnU-Net and then fine-tuned it with the provided training data from the challenge without using external data. Based on experimental results in this task, the following was observed: Firstly, TransVW yields a 1% boost to the Dice score upon fine-tuning on the test set compared with the nnU-Net model trained from scratch. At the time of manuscript submission, fine-tuning TransVW beats nnU-Net trained from scratch according to the official scores on the live leaderboard (e.g., 0.77 vs. 0.76). Secondly, TransVW obtains improvements over training from scratch and Models Genesis by 2.5% and 1%, respectively, to the Dice scores. Since the labels for the test images are not publicly available, the evaluation was conducted by five-fold cross-validation on the training dataset. To conduct fair comparisons, all methods benefit from the same data augmentation and use the same network architecture (nnU-Net architecture for liver), while the experiments were optimized for each model with the best-performing hyper-parameters. Following this evaluation protocol, learning from scratch, Models Genesis, and TransVW were shown to achieve a Dice score of $63.52\% \pm 0.28\%$, $65.03\% \pm 0.70\%$, and $66.06\% \pm 0.98\%$, respectively. Thirdly, TransVW has proven to be a strong contender for first place in the live leaderboard of the challenge, in which the Dice score achieved by TransVW as well as the top-ranking model which was 0.77. Note that the leaderboard only reports up to two significant digits.

Overall, these results reinforce the main insight that TransVW can serve as a primary source of transfer learning for 3D medical imaging applications to boost performance, accelerate training, and reduce annotation costs, representing its clinical significance.

Related Works and Complementary Works:

Bag-of-Visual-Words (BoVW):

The BoVW model represents images by local invariant features that are condensed into a single vector representation. BoVW and its extensions have been widely used in various tasks. A major drawback of BoVW is that the extracted visual words cannot be transferred and fine-tuned for new tasks and datasets like CNN models. To address this challenge, recently, a few works have integrated BoVW in the training pipeline of CNNs. Among them, a proposed methodology in which a pretext task based on the BoVW pipeline, which first discretizes images to a set of spatially dense visual words using a pre-trained network, and then trains a second network to predict the BoVW histogram of the images. While this approach displays impressive results for natural images, the extracted visual words may not be intuitive and explainable from a medical perspective since they are automatically determined in feature space. Moreover, using K-means clustering in creating the visual vocabulary may lead to imbalanced clusters of visual words (known as cluster degeneracy). The described methodology using the TransVW framework as set forth herein differs from previous works insomuch that it (1) operates by automatically discovering visual words that carry explainable semantic information from medical perspective, (2) operates by bypassing the clustering, reducing the training time and leading to the balanced classes of visual words, and (3) implements a novel pretext rather than predicting the BoVW histogram.

Self-Supervised Learning:

Self-supervised learning methods aim to learn general representations from unlabeled data. In this paradigm, a neural network is trained on a manually designed (pretext) task for which ground-truth is available for free. The learned representations can be later fine-tuned on numerous target tasks with limited annotated data. A broad variety of self-supervised methods have been proposed for pre-training CNNs in natural images domain, solving jigsaw puzzles, predicting image rotations, in-painting of missing parts, clustering images and then predicting the cluster assignments, and removing noise from noisy images. However, self-supervised learning is a relatively new trend in medical imaging. Recent methods, including colorization of colonoscopy images, anatomical positions prediction within cardiac MR images, context restoration, and Rubik's cube recovery, which were developed individually for specific target tasks, have a limited generalization ability over multiple tasks. The disclosed TransVW framework distinguishes itself from all other existing works by explicitly employing the strong yet free semantic supervision signals of visual words, leading to a generic pre-trained model effective for various target tasks. Recently, there was a proposed methodology using four effective image transformations for learning generic autodidactic models through a restoration-based task for 3D medical imaging. While the disclosed methodology derives the transformations from Models Genesis, it nevertheless shows three significant advancements. First, Models Genesis has only one self-restoration component, while the disclosed methodology introduces two more novel components: self-discovery and self-classification, which are sole factors in the performance gain. Second, the disclosed methodology learns semantic representation from the consistent and recurring visual words discovered during the self-discovery phase, but Models Genesis learns representation from random sub-volumes with no semantics, since no semantics can be discovered from random sub-volumes. Finally, the disclosed methodology serves as an add-on for boosting other self-supervised methods while Models Genesis do not offer such advantage.

The inventors have also proposed to utilize consistent anatomical patterns for training semantics-enriched pre-trained models. The disclosed methodology as set forth herein presents several extensions, including: (1) A new concept is introduced: transferable visual words, where the recurrent anatomical structures in medical images are anatomical visual words, which can be automatically discovered from unlabeled medical images, serving as strong yet free supervision signals for training deep models; (2) The disclosed methodology extensively investigates the add-on capability of our self-discovery and self-classification, demonstrating that they can boost existing self-supervised learning methods; (3) The disclosed methodology expands the 3D target tasks by adding pulmonary embolism false positive reduction, indicating that the TransVW generalizes effectively across organs, datasets, and modalities; (4) The disclosed methodology extends Rotation into its 3D version as an additional baseline; (5) The disclosed methodology adopts a rigorous three-pronged approach in evaluating the transferability of the disclosed techniques, including transfer learning performance, convergence speedups, and annotation efficiency, highlighting that TransVW is an annotation-efficient solution for 3D medical imaging. As part of this endeavor the disclosed methodology illustrates that transfer learning from TransVW provides better optimization and accelerates the training process and dramatically reduces annotation efforts. (6) The disclosed methodology conducted linear evaluations on top of the fixed features, showing that TransVW 2D provides more generic representations by reducing the overfitting to the pretext task; and (7) The disclosed methodology conducted ablation studies on five 3D target tasks to search for an effective number of visual word classes.

A key contribution to the disclosed methodology was designing a self-supervised learning framework that not only allows deep models to learn common visual representation from image data directly, but also leverages the semantics associated with the recurrent anatomical patterns across medical images, resulting in generic semantics-enriched image representations. The extensive experiments demonstrate the annotation-efficiency of TransVW by offering higher performance and faster convergence with reduced annotation cost in comparison with publicly available 3D models pre-trained by not only self-supervision but also full supervision. More importantly, TransVW can be used as an add-on scheme to substantially improve other self-supervised methods. These outstanding results are attributed to the compelling deep semantics derived from recurrent visual words resulted from consistent anatomies naturally embedded in medical images.

Target Tasks and Datasets:

The experiments have evaluated TransVW in seven distinct target tasks, including classification and segmentation in CT, MRI, and Xray modalities, detailed as follows:

Lung Nodule False Positive Reduction (NCC):

LUNA16 dataset provides 888 low-dose lung CT scans with a slice thickness of less than 2.5 mm, divided into a training set (445 cases), a validation set (178 cases), and a test set (265 cases). The dataset offers the annotations for a set of 5M candidate locations for the false positive reduction task, wherein true positives are labeled as "1" and false positives are labeled as "0". Area Under the Curve (AUC) score on classifying true positives and false positives is utilized as the evaluation metric.

Lung Nodule Segmentation (NCS):

The experiments have evaluated TransVW for lung nodule segmentation using Lung Image Database Consortium image collection (LIDC-IDRI) dataset. This dataset provides 1,018 thoracic CT scans with marked-up annotated lung nodules created by seven academic centers and eight medical imaging companies. The dataset is split into training (510), validation (100), and test (408) sets. The experiments have re-sampled the 3D volumes to 1-1-1 spacing and then extracted a 64×64×32 crop around each nodule. These 3D crops are used for model training and evaluation. Intersection over Union (IoU) and dice coefficient scores are utilized to evaluate the lung nodule segmentation performance.

Pulmonary Embolism False Positive Reduction (ECC):

A database consisting of 121 computed tomography pulmonary angiography (CTPA) scans with a total of 326 emboli were collected and divided at the patient-level into a training set with 434 true positive and 3,406 false positive PE candidates, and a test set with 253 true positive PE candidates and 2,162 false positive PE candidates. The dataset is pre-processed and the classification of true positives and false positives was evaluated by candidate-level AUC.

Liver Segmentation (LCS):

The experiments utilized the dataset provided by MICCAI 2017 LiTS Challenge for evaluating TransVW on liver segmentation task. This dataset consists of 130 CT scans, with the segmentation annotations for liver and lesion. In the experiments, the dataset was split into training (100 patients), validation (15 patients), and test (15 patients) sets, and the experiments considered liver as positive class and others as negative class. Segmentation performance is evaluated by Intersection over Union (IoU) and Dice coefficient scores.

Brain Tumor Segmentation (BMS):

The experiments examined TransVW for brain tumor segmentation task on MRI Hair images provided by Brain tumor segmentation (BraTS) 2018 dataset. This dataset provides 285 patients (210 HGG and 75 LOG), each with four different MR volumes including native T1-weighted (TI). post-contrast T1-weighted (T1Gd). T2-weighted (T2), and T2 fluid attenuated inversion recovery (FLAIR). Segmentation annotations are provided for background (label 0), GD-enhancing tumor (label 4). the peritumoral edema (label 2), and the necrotic and non-enhancing tumor core (label 1). The experiments split the data to 190 patients for training and 95 patients for testing. The experiments considered background as negatives class and tumor sub-regions as positive class, and evaluated segmentation performance using Intersection over Union (IoU) and Dice coefficient scores.

Thorax Diseases Classification (DXC):

ChestX-ray 14 is a hospital-scale chest X-ray dataset, which consists of 112K frontal-view X-ray images taken from 30K patients where 51K images have at least one of the 14 thorax diseases. ChestX-ray 14 provides an patient-wise split for training (86K images) and test (15K images) sets with 14 disease labels (each image can have multi-labels). The experiments report the mean AUC score over 14 diseases for the multi-label chest X-ray classification task.

Pneumothorax Segmentation (PXS):

The Society for Imaging Informatics in Medicine (SIIM) and American College of Radiology provided the SIIM-ACR Pneumothorax Segmentation dataset consisting of 10K chest X-ray images and the segmentation masks for Pneumothorax disease. The experiments divided the dataset into training (8K), validation (1K), and testing (2K), and evaluated the segmentation performance using Dice coefficient score.

FIGS. 9A, 9B, 9C, 9D, and 9E at 900 show the results of an ablation study demonstrating the impact of the number of visual words classes 908 on the target task performance on five 3D target tasks; the average performance over ten runs is reported for each model on each task, with the best performance achieved with C=45 in all applications;

Impact of Number of Visual Words Classes:

As set forth at FIGS. 9A, 9B, 9C, 9D, and 9E, the results shown illustrate the impact of number of visual words classes (C) on the performance of target tasks, extensive ablation studies were conducted on the number of classes. The performance of TransVW on all five 3D target tasks under different settings. Results report the average performance over ten runs for each model on each application. The best performance was achieved at C=45 in all applications. It is suggested that for achieving the best transfer learning performance, it is necessary to strike a balance between diversity and overlap of the visual words.

Figure 10A:
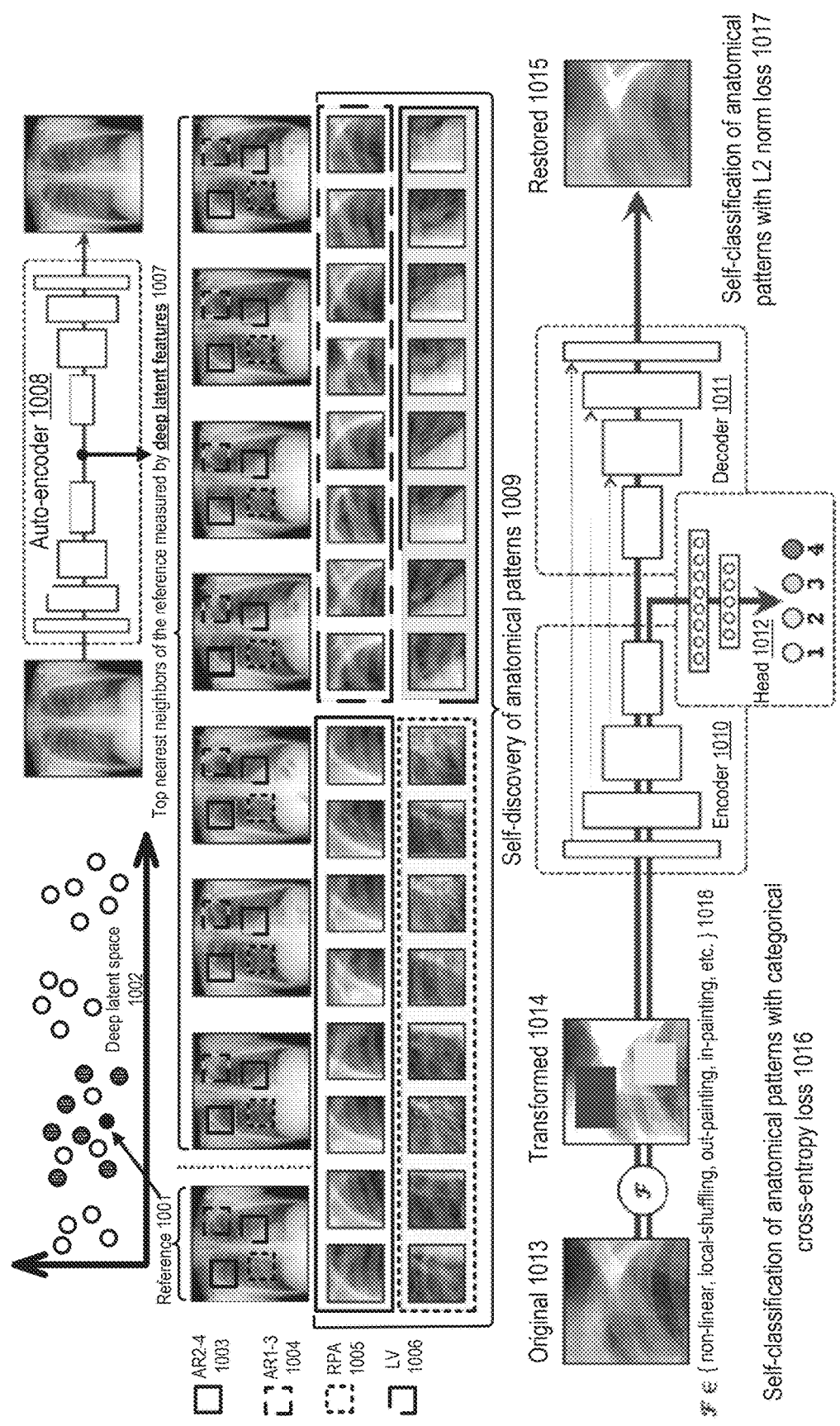
FIG. 10A depicts the proposed TransVW self-supervised learning framework consisting of three sub-parts including (a) self-discovery of anatomical patterns, (b) self-classification of anatomical patterns with categorical cross-entropy loss, and (c) self-restoration of anatomical patterns with L2 norm loss, in accordance with described embodiments.

FIG. 10A depicts the proposed self-supervised learning framework consisting of three sub-parts including (a) self-discovery of anatomical patterns at element 1009, (b) self-classification of anatomical patterns with categorical cross-entropy loss at element 1016, and (c) self-restoration of anatomical patterns as depicted at element 1017.

Application of the three sub-parts, (a) self-discovery at element 1009, (b) self-classification at element 1016, and (c) self-restoration at element 1017, results in the semantics-enriched pre-trained models, also referred to as Transferable Visual Word (TransVW) models, providing a trained encoder-decoder structure 1014 with skip connections in between and a classification head 1012 at the end of the encoder 1010, preceding the decoder 1011 portion of the trained encoder-decoder structure 1014.

For example, given a random reference patient (element 1001), similar patients are found within the deep latent space 1002 and identified based on deep latent features. Further processing crops anatomical patterns from random yet fixed coordinates, and assigns the pseudo labels to the cropped anatomical patterns according to their coordinates. For instance, the top nearest neighbors of the reference patient are measured by way of their deep latent features obtained from the auto-encoder 1008 (refer to element 1007 corresponding to boxed images in the middle row to the right of the reference patient's boxed image at element 1001).

For simplicity and clarity, there are depicted here four coordinates in X-ray images as an example, specifically coordinate AR2-4 at element 1003, coordinate AR1-3 at element 1004, coordinate RPA at element 1005, and coordinate LV at element 1006. However, a different quantity of coordinates is permissible and expected. The input to the model as shown here is a transformed anatomical pattern crop 1014, and the model is trained to classify the pseudo label and to recover the original crop 1013, depicted here as the "restored" crop at element 1015. In such a way, the model aims to acquire semantics-enriched representation, producing more powerful application-specific target models.

In the context of medical imaging specifically, protocols must be followed for defined clinical purposes, so as to appropriately generate images of similar anatomies across patients and yielding recurrent anatomical patterns across images.

These recurring patterns are associated with rich semantic knowledge about the human body, thus offering great potential to foster deep semantic representation learning and produce more powerful models for various medical applications.

However, prior known techniques have yet to successfully exploit the deep semantics associated with recurrent anatomical patterns embedded in medical images to enrich representation learning.

Thus, a novel self-supervised learning method is described herein which overcomes shortcomings in the prior known techniques, with the novel self-supervised learning method enabling the capture of semantics-enriched representation from unlabeled medical image data, resulting in a set of powerful pre-trained models.

In comparison with Models Genesis, the previous state-of-the-art self-supervised learning for medical imaging, the novel TransVW techniques described herein include and leverage two entirely unique components: self-discovery (element 1009) and self-classification (element 1016) of the anatomy underneath medical images.

Through the use and implementation of the classification branch supported by a small computational overhead, the resulting pre-trained TransVW models significantly enrich representation learning with semantics embedded in the abundant anatomical patterns, boosting target tasks performance dramatically.

Extensive experimental results, described below, demonstrate that learning semantics enriches the existing self-supervised learning approaches (refer to FIG. 12 below) and additionally demonstrates that TransVW not only offers performance superior to its self-supervised learning counterparts, but it also exceeds fully supervised pre-trained 3D models, as is detailed below at Table 2 (refer to FIGS. 5 and 13). Further still, experimental results demonstrate that TransVW consistently tops any 2D approaches (refer to FIG. 14 below).

These performance improvements are attributable to the semantics derived from the consistent and recurrent anatomical patterns. Not only can the consistent and recurrent anatomical patterns be automatically discovered from medical images, but they further serve as strong yet free supervision signals for deep models to learn more semantically enriched representation automatically via self-supervision.

By explicitly employing the strong yet free semantic supervision signals, TransVW distinguishes itself from all existing works, including techniques for de-noising images by a stack of de-noising auto-encoders, techniques for colorization of colonoscopy images, techniques for context restoration, techniques for solving a Rubik's cube, and techniques for predicting anatomical positions within Magnetic Resonance (MR) images.

While prior known techniques may learn common representation from unlabeled data, the semantics associated with the anatomical patterns embedded in such medical images has not yet been successfully exploited by any prior known technique.

TransVW:

Further detailed within FIG. 10A is the proposed self-supervised learning framework, which enables training the TransVW models from scratch on unlabeled medical images, thus wholly negating the need for costly and expensive and time-consuming curation of such medical images. At a high level, TransVW operates via an encoder-decoder structure 1014 with skip connections in between and a classification head 1012 at the end of the encoder 1010.

The objective for the model is to learn different sets of semantics-enriched representation from multiple perspectives. In doing so, the described framework consists of the three above referenced sub-components components, specifically, the self-discovery sub-component at element 1009 which provides self-discovery of anatomical patterns from similar patients, the self-classification sub-component at element 1016 which provides self-classification of the patterns, and the self-restoration sub-component at element 1017 which operates to perform self-restoration of the transformed patterns so as to render the "restored" image crop depicted at element 1015.

According to particular embodiments, once the self-discovered anatomical pattern set is built, the classification and restoration branches are jointly trained together in the model.

Self-Discovery of Anatomical Patterns:

According to another embodiment, processing begins by building a set of anatomical patterns from medical images, as illustrated at FIG. 10A, via the self-discovery sub-component at element 1009. An auto-encoder network is first trained with training data to extract deep features of each patient scan, which learns an identical mapping from scan to itself. Once trained, a latent representation vector from the auto-encoder may be used as an indicator of each patient.

In such an embodiment, one patient is randomly anchored as a reference 1001 and further processing then searches for the nearest neighbors (refer to element 1007) to the randomly anchored patient through the entire dataset by computing an L2 distance of the latent representation vectors, resulting in a set of similar patients.

Due to the consistent and recurring anatomies across these patients, that is, each coordinate contains a unique anatomical pattern, it is thus feasible to extract similar anatomical patterns according to the coordinates.

In such a way, patches for 2D images and cubes for 3D images are cropped from C number of random but fixed coordinates across a potentially small set of discovered patients, which share similar appearance.

Further processing next computes similarity at the patient-level rather than the pattern-level to promote balance between the diversity and consistency of anatomical patterns. Further processing then assigns pseudo labels to cropped patches/cubes based on their coordinates, resulting in a new dataset, in which each case is associated with one of the C classes.

These self-discovered anatomical patterns are associated with rich semantics of the corresponding human body parts.

For example, four pseudo labels are depicted at FIG. 10A as noted above, each of which are defined randomly in the reference patient (top-left most at element 1001), but as seen, each carries local information, shown here as (element 1003) anterior ribs 2 through 4, (element 1004) anterior ribs 1 through 3, (element 1005) right pulmonary artery, and (element 1006) Left Ventricle (LV).

Figure 10B:
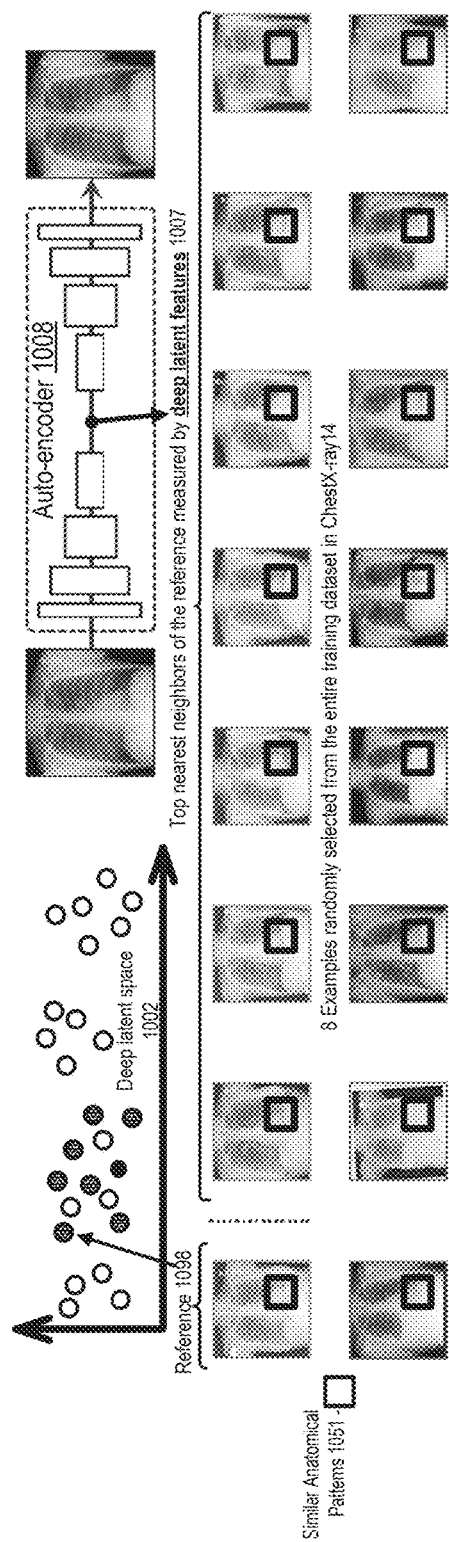
FIGS. 10B and 10C depict additional examples of applying the proposed self-discovery process to discover similar anatomical patterns, in accordance with described embodiments.

Visualizing the Self-Discovery Process:

To build a more comprehensive understanding of the proposed self-discovery scheme, experiments randomly anchor two patients as references and visualize the self-discovery process as depicted here at FIGS. 10A and 10B.

Figure 10C:
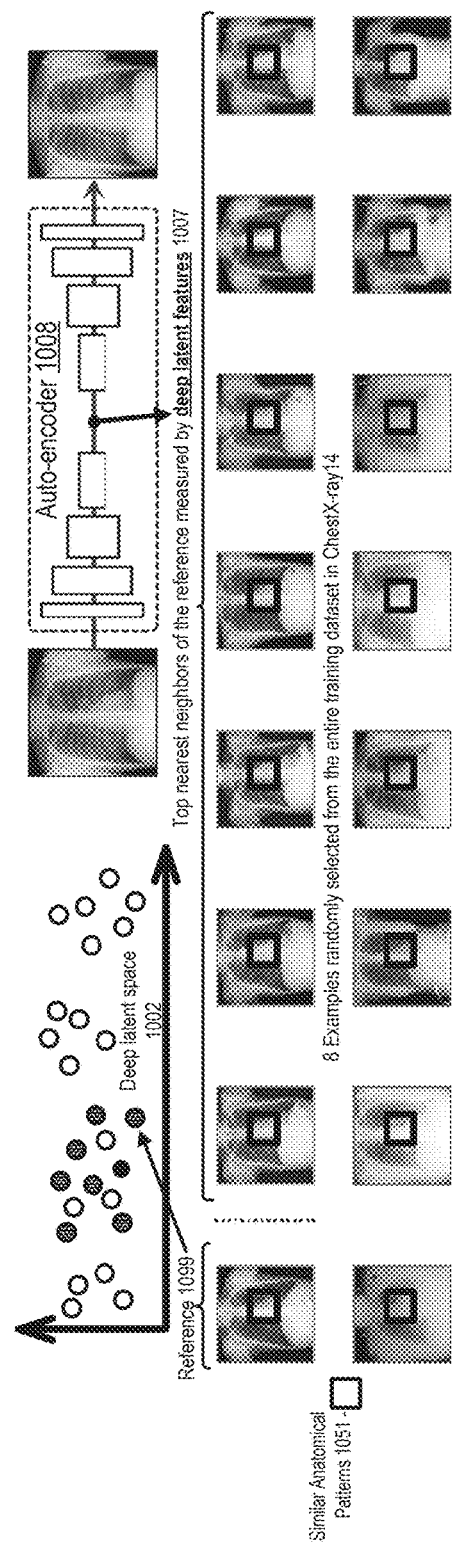

FIGS. 10B and 10C depict additional examples of applying the self-discovery process to discover similar anatomical patterns.

By repeating the above self-discovery process, an enormous quantity of anatomical patterns associated with their pseudo labels are automatically generated for use with subsequent representation learning in the following stages.

The self-discovery process aims to automatically discover similar anatomical patterns 1051 across patients, as illustrated by way of the inset black framed boxes within the patient images at each of FIGS. 10B and 10C. Patches extracted at the same coordinate across patients may be very different. For instance, the inset black framed boxes at FIG. 10B are readily distinguishable from the inset black framed boxes of the patients at FIG. 10C and moreover, are located in different areas of the chest x-ray images provided. These differences in the images are overcome by first computing similarity at the patient level using the deep latent features from an auto-encoder and then selecting the top nearest neighbors of the reference patient. For instance, refer to the top row of FIG. 10B in which the top nearest neighbors for the reference image 1098 are measured by deep latent features 1007 and correspondingly, refer to the top row of FIG. 10C in which the top nearest neighbors for the reference image 1099 are measured by deep latent features 1007.

Extracting anatomical patterns from these similar patients (refer to similar anatomical patterns 1051 at each of FIGS. 10B and 10C strikes a balance between consistency and diversity in pattern appearance for each anatomical pattern.

Self-Classification of Anatomical Patterns:

After self-discovery of a set of anatomical patterns, the representation learning is formulated as a simple C-way multi-class classification task. The goal of this task is to encourage models to learn from the recurrent anatomical patterns across patient images, fostering a deep semantically enriched representation.

As is further depicted by FIG. 10A at the self-classification sub-component depicted at element 1016, the classification branch encodes the original 1013 input anatomical pattern into a latent space, followed by a sequence of fully-connected (fc) layers, and predicts the pseudo label associated with the pattern.

A categorical cross-entropy loss function is adopted classify the anatomical patterns, as follows:

$$\mathcal{L}_{cls} = -\frac{1}{N}\sum_{b=1}^{N}\sum_{c=1}^{C} y_{bc} \log \mathcal{P}_{bc},$$

where N denotes the batch size; C denotes the number of classes; Y and P represent the ground truth (one-hot pseudo label vector) and the prediction, respectively.

Figure 10D:
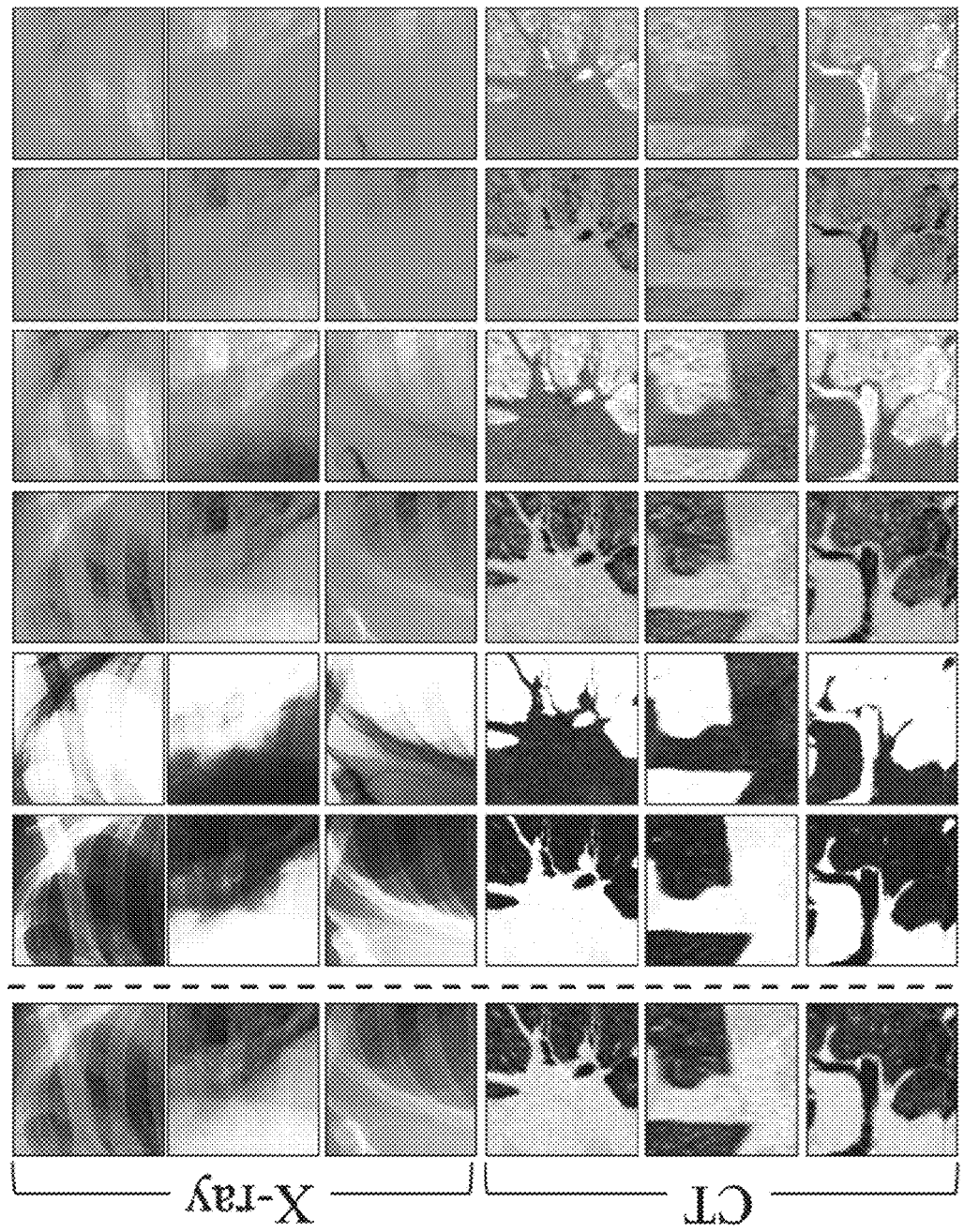
FIGS. 10D, 10E, 10F, and 10G depict exemplary image transformations by which to perturb an original input image, in accordance with described embodiments.
Figure 10E:
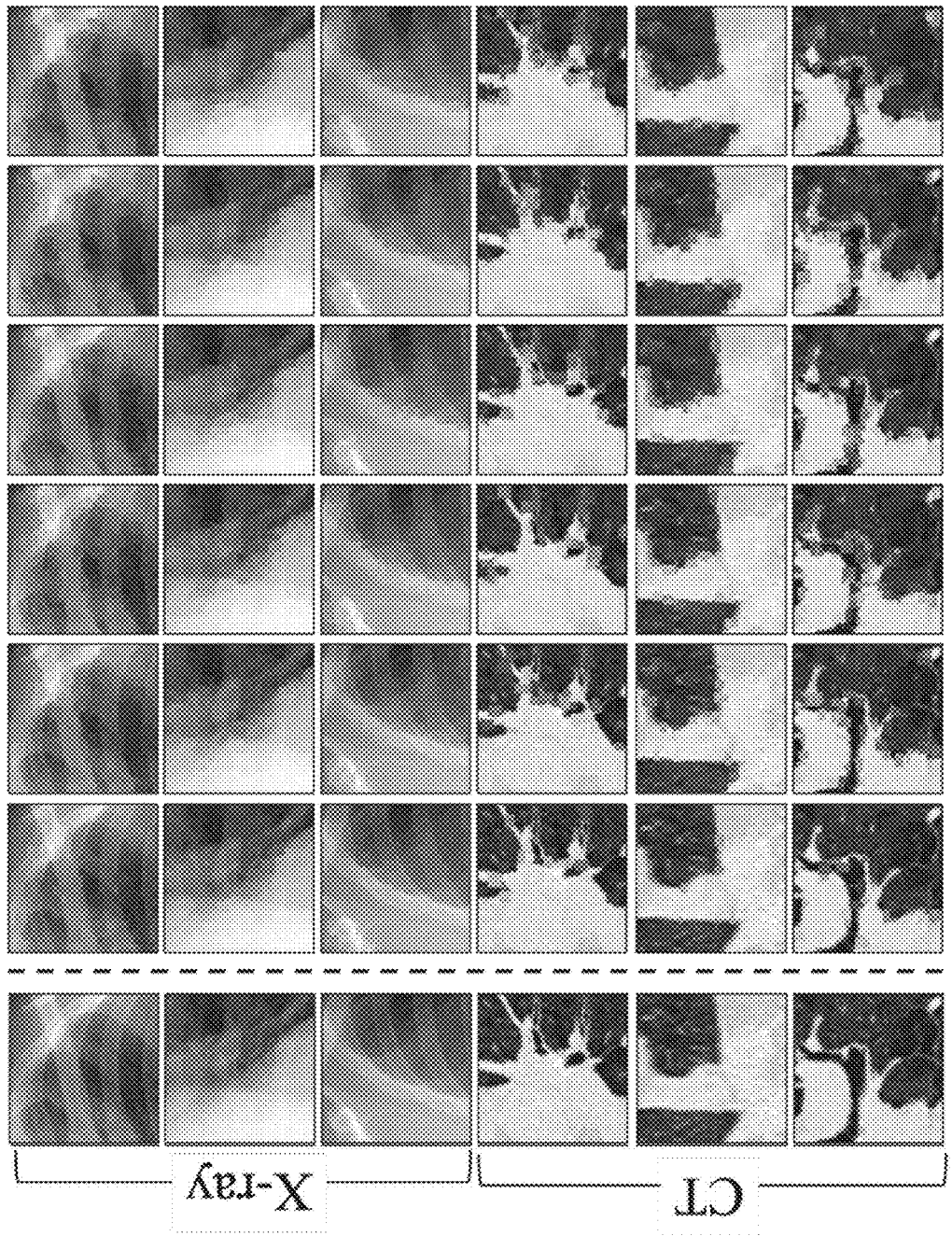
Figure 10F:
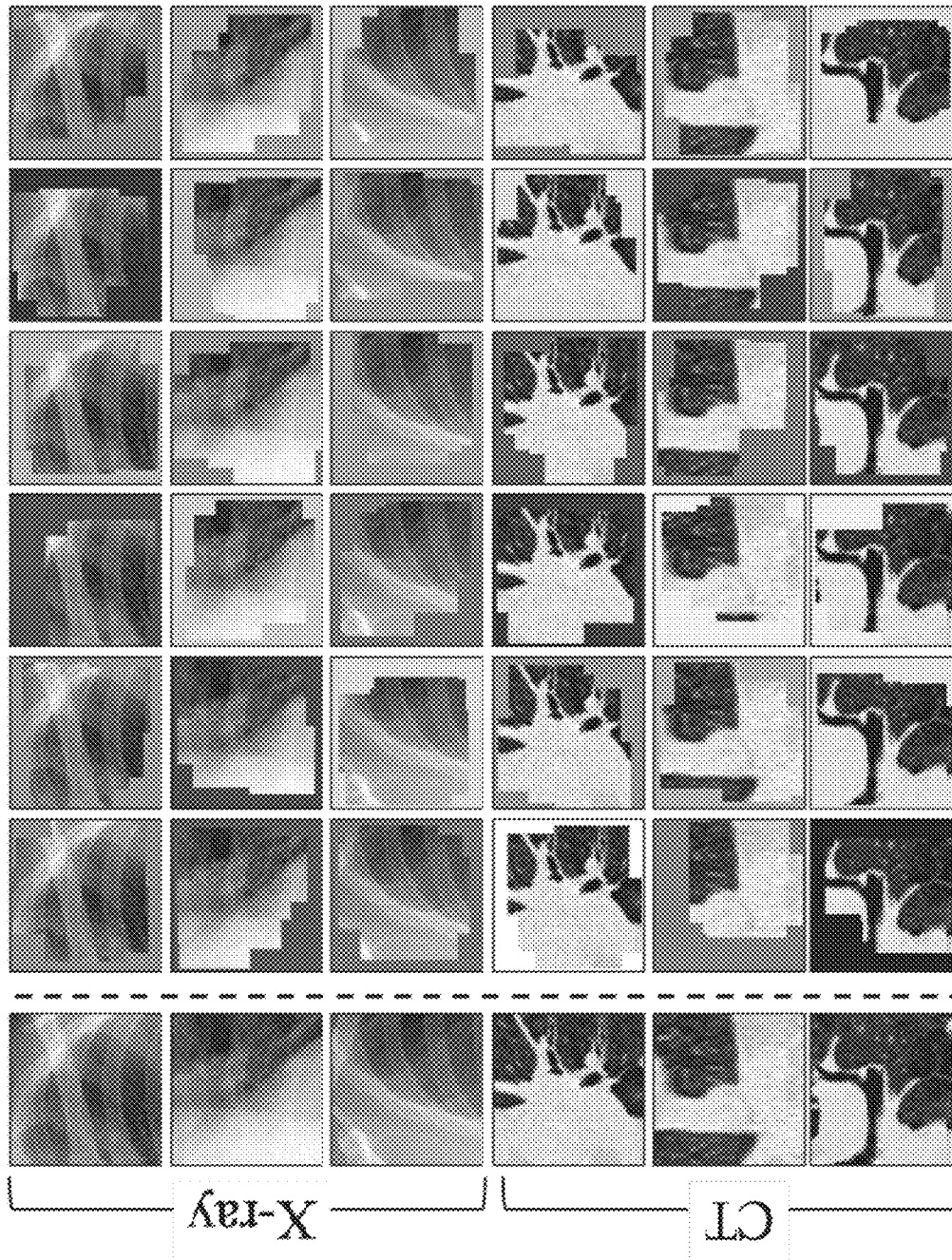
Figure 10G:

FIGS. 10D, 10E, 10F, and 10G depict exemplary transformations by which to transform an original input image, in accordance with described embodiments. In particular, FIG. 10D depicts an exemplary non-linear transformation 1081 as applied to both X-ray and CT input images. FIG. 10E depicts an exemplary local pixel shuffling transformation 1082 as applied to both X-ray and CT input images. FIG. 10F depicts an exemplary out-painting transformation 1083 as applied to both X-ray and CT input images. Lastly, FIG. 10G depicts an exemplary in-painting transformation 1084 as applied to both X-ray and CT input images.

Self-Restoration of Anatomical Patterns:

The objective of self-restoration is for the model to learn different sets of visual representation by recovering original anatomical patterns from the transformed ones. According to an exemplary embodiment, four transformations are adopted, specifically, non-linear 1081, local-shuffling 1082, out-painting 1083, and in-painting 1084, as depicted by element 1018 at FIG. 10A and as further presented at elements 1081-1084 of FIGS. 10D, 10E, 10F, and 10G, respectively.

As is further depicted by FIG. 10A at the self-classification sub-component depicted at element 1017, the restoration branch encodes the input transformed anatomical pattern into a latent space and decodes back to the original resolution, with an aim to recover the original anatomical pattern 1013 from the transformed one 1014, resulting in the restored pattern 1015. So as to permit the TransVW models to restore 1015 the transformed anatomical patterns 1014, processing computes an L2 distance between the original pattern 1013 and the reconstructed pattern via the following loss function:

$$\mathcal{L}_{rec} = \frac{1}{N}\sum_{i=1}^{N} \|\chi_i - \chi'_i\|_2,$$

where N denotes the batch size, X and X' represent the ground truth (original anatomical pattern 1013) and the reconstructed prediction, respectively.

According to exemplary embodiments, during training, a multi-task loss function is defined on each transformed anatomical pattern as $L = \lambda_{cls}L_{cls} + \lambda_{rec}L_{rec}$, where $\lambda_{cls}$ and $\lambda_{rec}$ regulate the weights of classification and reconstruction losses, respectively.

The definition of $L_{cls}$ allows the model to learn more semantically enriched representation while the definition of $L_{rec}$ encourages the model to learn from multiple perspectives by restoring original images 1013 from varying image deformations 1014. Once trained, the encoder alone can be fine-tuned for target classification tasks; while the encoder and decoder together can be fine-tuned for target segmentation tasks to fully utilize the advantages of the pre-trained models on the target tasks.

Experimental Pre-Training of the TransVW Models:

Experiments conducted utilize the TransVW 3D and 2D models which are self-supervised pre-trained from 623 CT scans in LUNA-2016 dataset and 75,708 X-ray images from the ChestX-ray 14 dataset.

While the TransVW model is trained from only unlabeled images, test images in those datasets are not utilized so as to avoid test-image leaks between proxy and target tasks.

In the self-discovery process, the top K most similar cases (see FIG. 10A, element 1007) are selected for the reference patient 1001, according to the deep features computed from the pre-trained auto-encoder (refer again to the visualizations set forth at FIGS. 10A, 10B, and 10C). So as to attain an appropriate balance between diversity and consistency of the anatomical patterns, K was empirically set to 200/1000 for 3D/2D pre-training based on the dataset size and C was set to 44/100 for 3D/2D images for the purposes of the experiment, so that the anatomical patterns can largely cover the entire image while avoiding too much overlap with each other.

For each random coordinate (elements 1003, 1004, 1005, and 1006), multi-resolution cubes/patches were extracted and then the extracted cubes/patches were all resized to 64×64×32 for 3D images and resized to 224×224 for 2D images.

Further processing assigned C pseudo labels to the cubes/patches based on their coordinates. To pre-train TransVW 3D/2D models, original cubes/patches and their pseudo labels were used as ground truths of the restoration and classification branches, respectively.

Figure 11:
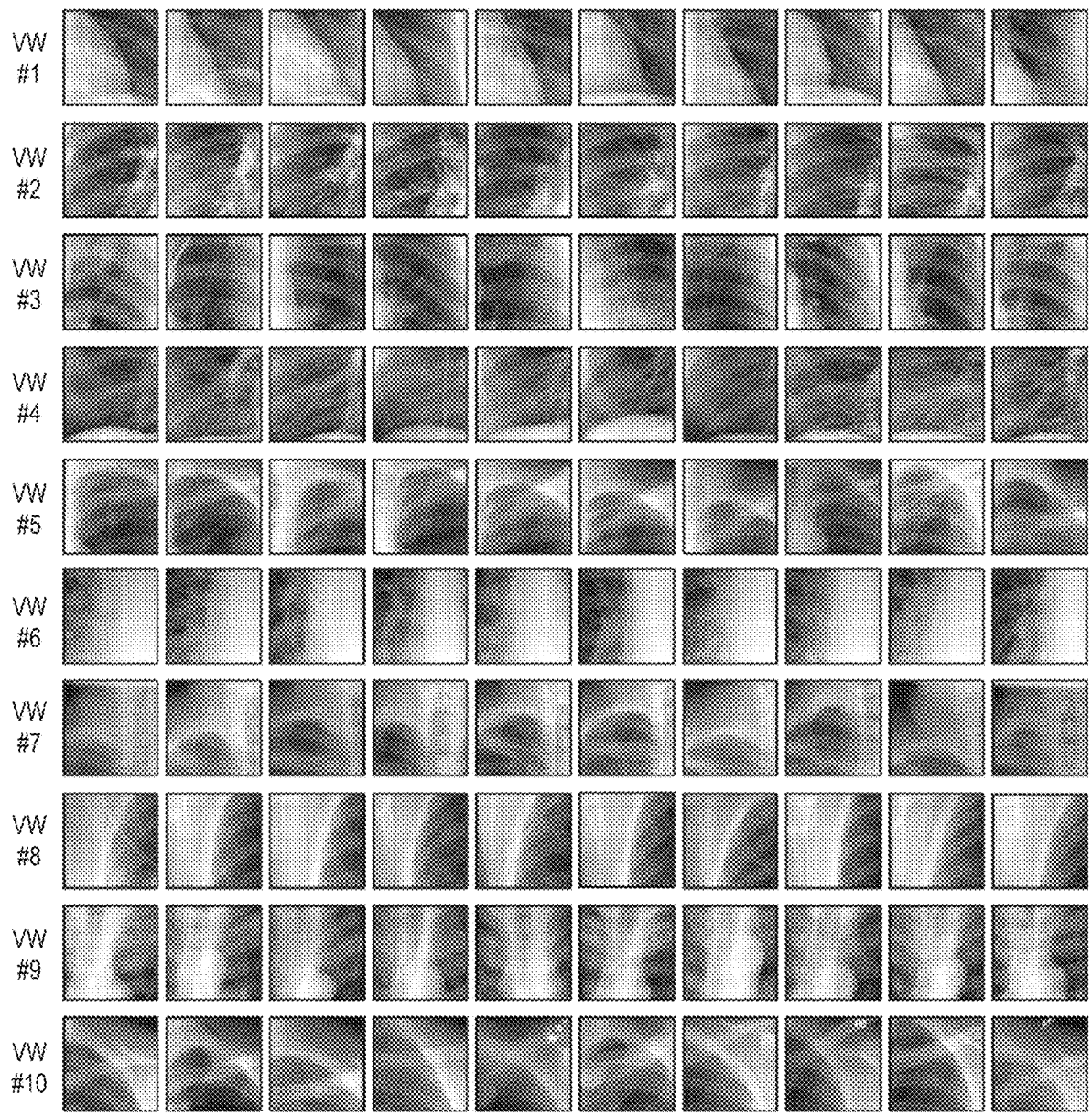
FIG. 11 depicts a visualization of samples of visual words in X-ray images; each row presents ten instances of a distinct visual word that are extracted from ten examples randomly selected from 1,000 nearest neighbors to a random reference image, to which IDs 1-10 were assigned, in accordance with described embodiments.

FIG. 11 depicts a visualization of visual words in X-ray images; each row presents ten instances of a distinct visual word that are extracted from ten examples randomly selected from 1,000 nearest neighbors to a random reference image, to which IDs 1-10 were assigned.

Visual Words Visualization:

A self-discovery scheme was devised to automatically extract visual words directly from unlabeled medical images, resulting in a well-balanced and diversified dataset associated with semantically meaningful labels.

For example, as is depicted here at FIG. 11, instances of ten visual words are presented, in which each visual word covers a specific anatomical pattern which is recurrent across all images, to which IDs 1-10 were thus assigned.

Figure 12:
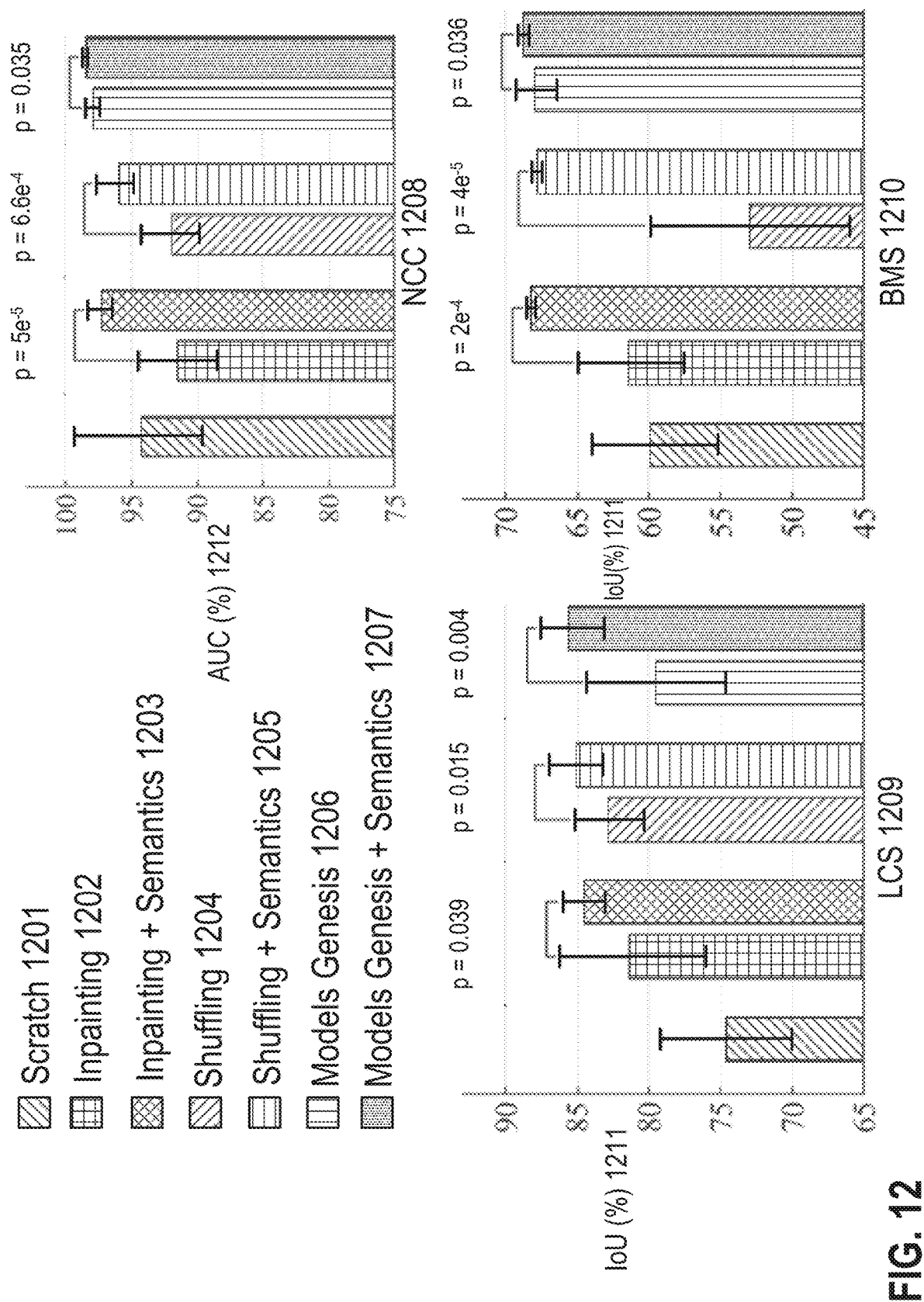
FIG. 12 charts results for both with and without semantics-enriched representation in the self-supervised learning approaches, in accordance with described embodiments.

FIG. 12 charts results for both with and without the proposed semantics-enriched representation in the self-supervised learning approaches.

Specifically depicted are the performance results for each of scratch 1201, in-painting 1202, in-painting+semantics 1203, shuffling 1204, shuffling+semantics 1205 Models Genesis 1206, and Models Genesis+semantics 1207, for each of NCC 1208 (as measured against AUC (%) 1212), LCS 1209 (as measured against IoU (%) 1211) and BMS 1210 (as measured against IoU (%) 1211).

These results contrast a substantial performance difference (with $p<0.05$) on target classification and segmentation tasks. By introducing self-discovery and self-classification, semantics were enhanced in each of the three most recent self-supervised learning advances, specifically, image in-painting 1202, patch-shuffling 1204, and Models Genesis 1206.

Learning Semantics Enriches Existing Self-Supervised Learning Approaches:

The proposed self-supervised learning scheme should be considered as an add-on, which can be added to and boost existing self-supervised learning methods. As shown above at FIG. 12, the results indicate that by incorporating the anatomical patterns with representation learning, the semantics-enriched models consistently outperform each and every existing self-supervised learning method. Specifically, the semantics-enriched representation learning achieves performance gains by 5%, 3%, and 1% in NCC (see element 1208) over scratch 1201, when compared with the original in-painting 1202, patch-shuffling 1204, and Models Genesis 1206, respectively; and the performance improved by 3%, 2%, and 6% in LCS (see element 1209) and 6%, 14%, and 1% in BMS (see element 1210).

From the results shown here, it is conclusively demonstrated that the described self-supervised learning scheme, by autonomously discovering and classifying anatomical patterns, learns a unique and complementary visual representation in comparison with that of an image restoration task. Through this combination, the models are made to learn from multiple perspectives, especially from the consistent and recurring anatomical structure, resulting in more powerful image representation.

FIG. 13 depicts Table 3 at element 1300 which shows fine-tuning from TransVW models outperforms learning 3D models from scratch as well as three competing publicly available (fully) supervised pre-trained 3D models and four self-supervised learning approaches in four medical target tasks, in accordance with described embodiments.

As is shown here, for every target task, the mean and standard deviation (mean±s.d.) are reported across ten trials. Independent two sample t-tests were further performed between the best approaches 1320 (emphasized via bold text) vs. others. The results shown within the highlighted gray boxes show no statistically significantly difference 1321 at the p=0.05 level. Results are grouped based on whether pre-training 1301 was performed by either supervised 1307 or self-supervised 1308 learning approaches, with the second column depicting the type of initialization 1302 performed, be it random 1309 or specific to an available pre-trained model.

TransVW 3D Outperforms Publicly Available Pre-Trained Models:

A direct comparison was made of the TransVW 3D model (element 1319) with the competitive publicly available pre-trained models, as applied to four distinct 3D target medical applications. Statistical analysis of the results detailed above at Table 3 (refer to FIG. 13), suggests three major conclusions.

Firstly, compared to learning 3D models from scratch, fine-tuning from TransVW offers performance gains by at least 3%, while also yielding more stable performances in all four applications.

Secondly, fine-tuning models from TransVW achieves significantly higher performances than those fine-tuned from other self-supervised 1308 approaches, in all four distinct 3D medical applications, including NCC (element 1303), LCS (element 1304), NCS (element 1305), and BMS (element 1306). In particular, TransVW surpasses Models Genesis, the state-of-the-art 3D pre-trained models created by image restoration based self-supervised learning in three applications and offers equivalent performance in NCS (element 1305).

Finally, even though TransVW learns representation without using any human annotation, it was nevertheless examined and compared to 3D models pre-trained from full supervision (element 1307), such as MedicalNet (element 1311), NiftyNet (element 1310), and Inflated 3D or "I3D" (element 1312). TransVW outperformed supervised 1307 pre-trained models in all four target tasks.

These experimental results evidence that in contrast to other baselines, which show fluctuation in different applications, TransVW is consistently capable of generalizing well in all tasks even when the domain distance between source and target datasets is large (e.g., LCS 1304 and BMS 1306 tasks). Unlike prior known techniques, TransVW explicitly benefits from the deep semantic features enriched by self-discovering and self-classifying anatomical patterns embedded in medical images, and thus contrasts with any other existing 3D models pre-trained by either self-supervision or full supervision.

Figure 14:
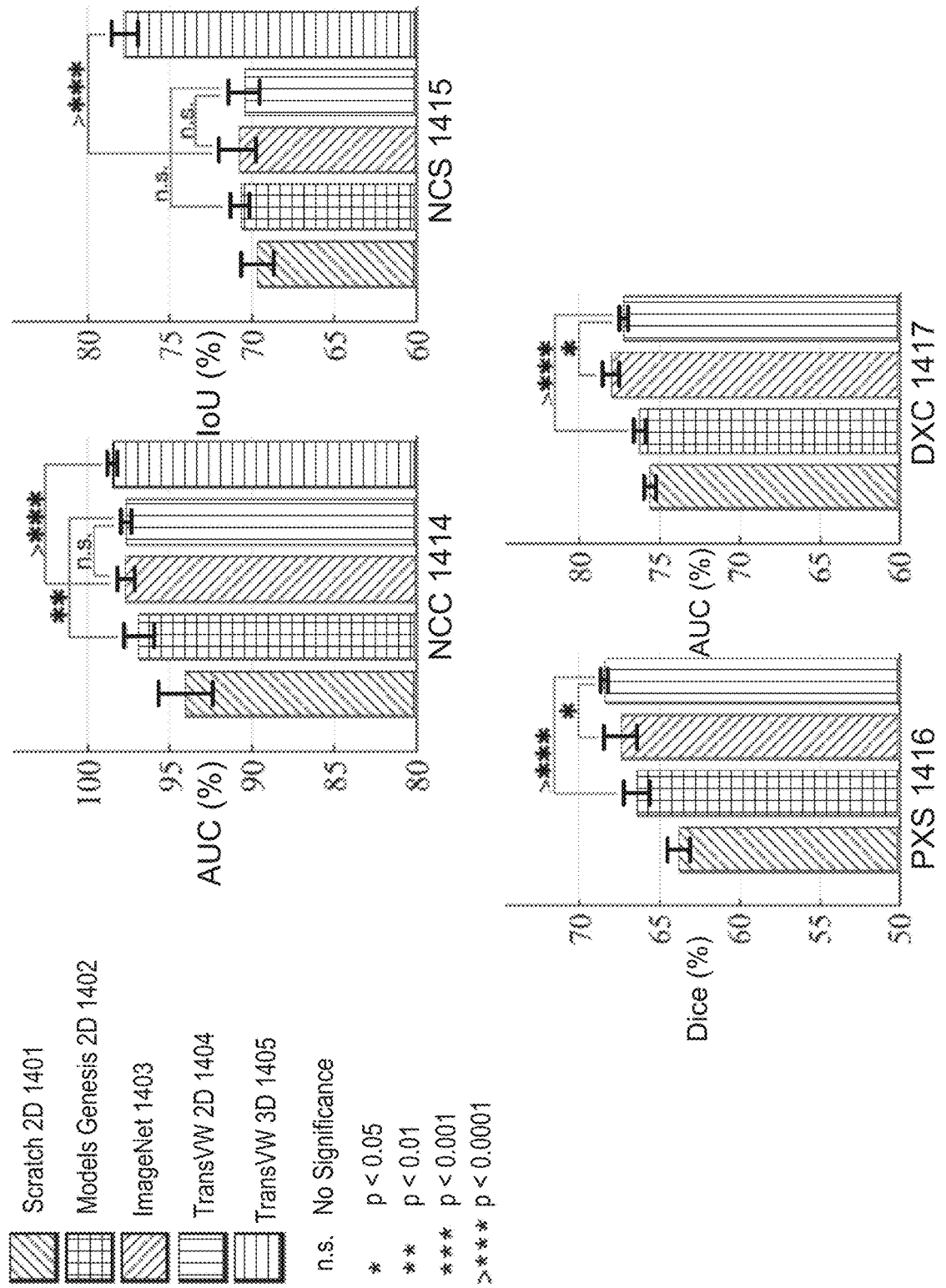
FIG. 14 shows that target tasks solved in 3D medical modality (NCC and NCS), empowered by TransVW 3D model, significantly outperformed any 2D slice-based approaches, including the state-of-the-art ImageNet models, in accordance with described embodiments.

FIG. 14 shows that target tasks solved in 3D medical modality (NCC 1414 and NCS 1415), empowered by a TransVW 3D model, significantly outperformed any 2D slice-based approaches, including the state-of-the-art ImageNet 1403 models. For target tasks in 2D modality (PXS 1416 and DXC 1417), TransVW 2D 1404 outperforms Models Genesis 2D 1402 and yielded higher performance than ImageNet 1403 in PXS 1416.

TransVW 3D Consistently Tops any 2D Approaches:

Despite the remarkable transferability of ImageNet models in multiple medical applications, 2D ImageNet models 1403 offer little benefit to 3D medical imaging tasks in the most prominent medical modalities (e.g., CT and MRI). To fit this paradigm, 3D imaging tasks have to be reformulated and solved in 2D, and in the process, lose rich 3D anatomical information and inevitably compromise performance.

As evidenced by the results shown here for NCC 1414 and NCS 1415, TransVW 3D 1405 outperforms all 2D solutions, including ImageNet 1403 models as well as downgraded TransVW 2D 1404 and Models Genesis 2D 1402, demonstrating that 3D problems in medical imaging demand 3D solutions. Moreover, as an ablation study TransVW 2D 1404 was examined with Models Genesis 2D 1402 (self-supervised) and ImageNet models 1403 (fully supervised) for four target tasks, covering classification and segmentation in CT and X-ray.

As shown here, TransVW 2D significantly surpasses training from scratch 1401 and Models Genesis 2D 1402 in all four and three applications, respectively and outperforms ImageNet model in PXS and achieves the performance equivalent to ImageNet in NCC and NCS, which is a significant achievement because all prior known self-supervised approaches lag behind fully supervised training.

Self-Classification and Self-Restoration Lead to Complementary Representation:

TransVW benefits over prior known techniques from at least two sources, specifically pattern classification and pattern restoration. Therefore, an ablation study was further conducted to investigate the effect of each isolated training scheme. Referring again to the results at Table 3 (see FIG. 13) discussed above, the combined training scheme (TransVW 3D) consistently and significantly offers performance higher and more stable compared to each of the isolated training schemes (self-restoration and self-classification) in NCC, LCS, and BMS.

Moreover, self-restoration and self-classification reveal better performances in four target applications, on an alternating basis. These complementary results are attributed to the different visual representations that they have captured from each isolated pre-training scheme, leading to different behaviors in different target applications.

The complementary representations, in turn, confirm the importance of the unification of self-classification and self-restoration in the disclosed TransVW and its significance for medical imaging.

By designing a self-supervised learning framework that not only allows deep models to learn common visual representation from image data directly, but also leverages semantics-enriched representation from the consistent and recurrent anatomical patterns, one of a broad set of unique properties that medical imaging has to offer may be realized through practice of the disclosed embodiments. The extensive results described herein demonstrate that TransVW is superior to publicly available 3D models pre-trained by either self-supervision or even full supervision, as well as ImageNet-based transfer learning in 2D, with the outstanding results attained being attributable to the compelling deep semantics learned from abundant anatomical patterns which result from the consistent anatomies naturally embedded in medical images.

Prior known pre-trained model techniques require massive, high-quality annotated datasets. However, seldom are there perfectly-sized and systematically-labeled datasets available by which to pre-train a deep model in medical imaging, given that both data and annotations are expensive to acquire and complicated to produce. Practice of the disclosed embodiments overcome the above limitations via self-supervised learning, which allows models to learn image representation from abundant unlabeled medical image data with zero human annotation effort.

Figure 15:
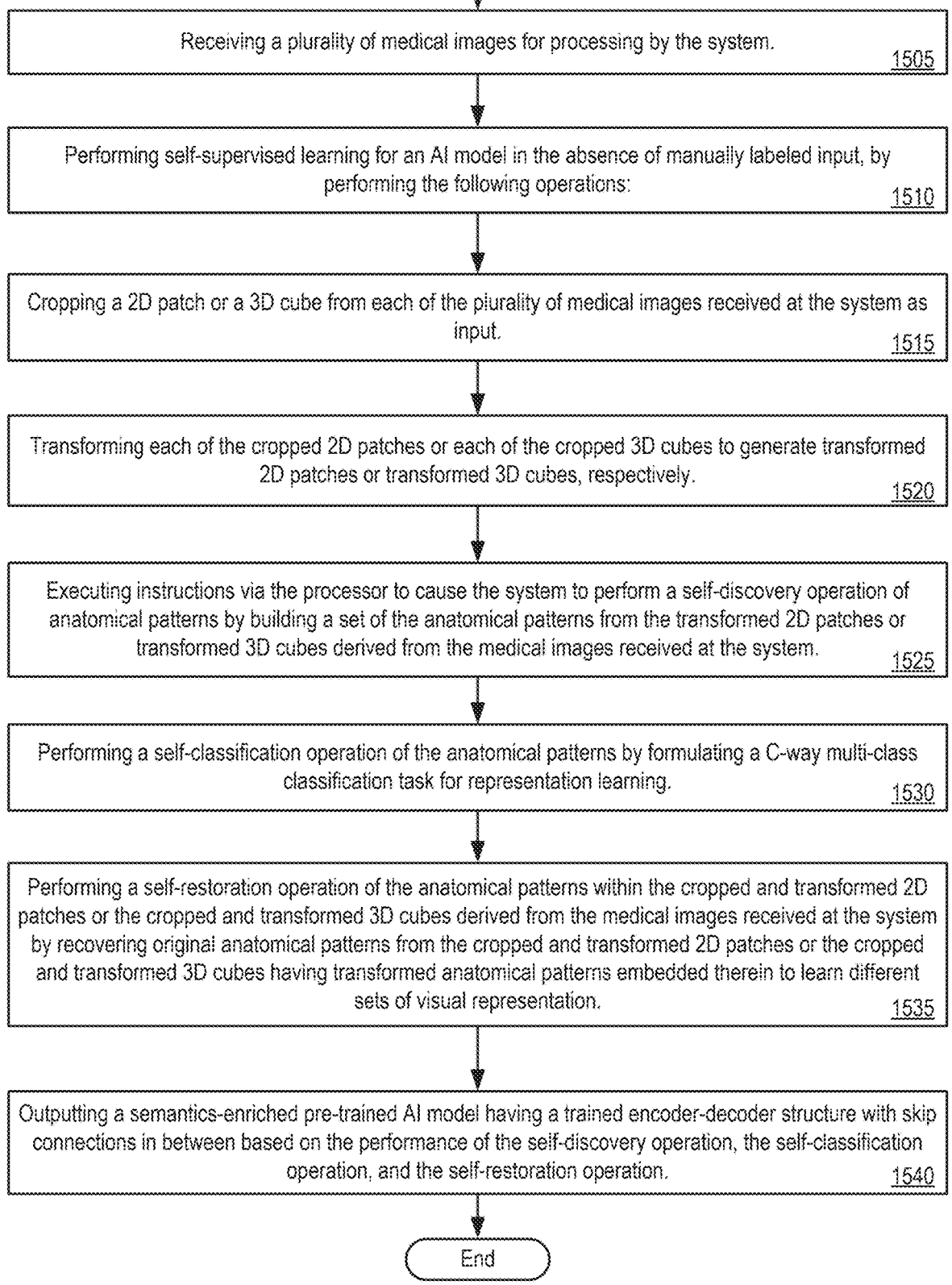
FIG. 15 depicts a flow diagram illustrating a method for the generation of TransVW models through self-supervised learning in the absence of manual labeling, in which the trained TransVW models are then utilized for the processing of medical imaging, in accordance with disclosed embodiments.

FIG. 15 depicts a flow diagram illustrating a method 1500 for the generation of TransVW models through self-supervised learning in the absence of manual labeling, in which the trained TransVW models are then utilized for the processing of medical imaging, in accordance with disclosed embodiments. Method 1500 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 1601 (see FIG. 16) and the machine 1701 (see FIG. 17) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1500 depicted at FIG. 15, there is a method performed by a system specially configured for the generation of TransVW models through self-supervised learning in the absence of manual labeling, in which the trained TransVW models are then utilized for the processing of medical imaging. Such a system may be configured with at least a processor and a memory to execute specialized instructions which cause the system to perform the following operations:

At block 1505, processing logic of such a system receives a plurality of medical images for processing by the system.

At block 1510, processing logic performs self-supervised learning for an AI model in the absence of manually labeled input, by performing the following operations:

At block 1515, processing logic crops a 2D patch or a 3D cube from each of the plurality of medical images received at the system as input.

At block 1520, processing logic transforms each of the cropped 2D patches or each of the cropped 3D cubes to generate transformed 2D patches or transformed 3D cubes, respectively.

At block 1525, processing logic executes instructions via the processor to cause the system to perform a self-discovery operation of anatomical patterns by building a set of the anatomical patterns from the transformed 2D patches or transformed 3D cubes derived from the medical images received at the system.

At block 1530, processing logic performs a self-classification operation of the anatomical patterns by formulating a C-way multi-class classification task for representation learning.

At block 1535, processing logic performs a self-restoration operation of the anatomical patterns within the cropped and transformed 2D patches or the cropped and transformed 3D cubes derived from the medical images received at the system by recovering original anatomical patterns from the cropped and transformed 2D patches or the cropped and transformed 3D cubes having transformed anatomical patterns embedded therein to learn different sets of visual representation.

At block 1540, processing logic outputs a semantics-enriched pre-trained AI model having a trained encoder-decoder structure with skip connections in between based on the performance of the self-discovery operation, the self-classification operation, and the self-restoration operation.

According to another embodiment of method 1500, performing the self-restoration operation comprises recovering the original anatomical patterns from the transformed anatomical patterns to generate recovered anatomical patterns which correspond to the 2D patches or the 3D cubes cropped from the similar patient scans received at the system as input prior to the 2D patches or the 3D cubes having undergone the transformation processing.

According to another embodiment of method 1500, transforming the cropped 2D patches or the cropped 3D cubes to generate transformed 2D patches or transformed 3D cubes comprises applying one or more of the following transformations: a non-linear transformation; a local-shuffling transformation; an out-painting transformation; and an in-painting transformation.

According to another embodiment of method 1500, executing the instructions via the processor to cause the system to perform the self-discovery operation of anatomical patterns, further includes: automatically generating as output, a set of visual words associated with semantically meaningful labels; and perturbing the set of visual words via a perturbation operator $g(\cdot)$ to generate a set of perturbed visual words which are provided as input to an encoder-decoder network having skip connections in between and a classification head at the end of the encoder via which the system is to perform the self-classification operation.

According to such an embodiment, the perturbation operator $g(\cdot)$ is applied to each visual word x to output a perturbed visual word $\tilde{x}=g(x)$; and the encoder is to receive each perturbed visual word $\tilde{x}$ as an input and responsively generate a latent representation corresponding to each visual word $\tilde{x}$.

According to another embodiment, method 1500 further includes: extracting similar anatomical patterns from the consistent and recurring anatomies across patients represented within the received medical images according to the coordinates, each defining a unique anatomical pattern.

According to another embodiment, method 1500 further includes: cropping the patches for 2D images and cropping the cubes for 3D images from C number of random but fixed coordinates across a set of discovered patients sharing similar appearance.

According to another embodiment, method 1500 further includes: computing similarity of the scans at the patient-level to promote a balance between the diversity and consistency of anatomical patterns.

According to another embodiment, method 1500 further includes: assigning pseudo labels to the patches for 2D images and the cropped cubes for 3D images based on their coordinates, resulting in a new dataset, in which each crop is associated with one of the C classes.

According to another embodiment of method 1500, each of the assigned pseudo labels carry local information defining anatomical features selected from the group of exemplary anatomical features comprising: anterior ribs 2 through 4; anterior ribs 1 through 3; right pulmonary artery; and Left Ventricle (LV). Other anatomical features may be utilized beyond the examples that are listed here.

According to another embodiment of method 1500, the system comprises an auto-encoder network which is first trained with training data to extract deep features of each patient scan to learn an identical mapping from scan to itself.

According to another embodiment of method 1500, once the auto-encoder network is trained, the latent representation vectors, which are extracted using the auto-encoder, are utilized as an indicator of each patient.

According to another embodiment, method 1500 further includes: iteratively repeating the self-discovery operation of anatomical patterns to automatically generate anatomical patterns associated with their pseudo labels for use with a subsequent representation learning operation.

According to another embodiment of method 1500, the C-way multi-class classification task causes the trained model to learn from the recurrent anatomical patterns across the plurality of medical images received at the system characterized by a deep semantically enriched representation.

According to another embodiment of method 1500, the system comprises an encoder-decoder network; wherein a classification branch of the encoder-decoder network encodes the input anatomical pattern into a latent space followed by a sequence of fully-connected (fc) layers; and wherein the classification branch predicts the pseudo label associated with the pattern.

According to another embodiment of method 1500, the classification branch classifies the anatomical patterns by applying a categorical cross-entropy loss function.

According to another embodiment of method 1500, the system comprises an encoder-decoder network; wherein a restoration branch of the encoder-decoder network encodes the transformed anatomical pattern from the transformed 2D patches or transformed 3D cubes into a latent space; and wherein the restoration branch decodes the transformed 2D patches or transformed 3D cubes back to an original resolution from the latent space to recover each the original anatomical pattern from a corresponding transformed anatomical pattern.

According to another embodiment of method 1500, the restoration branch restores the transformed anatomical patterns by computing an L2 distance between the original pattern and a reconstructed pattern via a loss function comparing the reconstructed pattern with a ground truth pattern corresponding to an original anatomical pattern represented within the medical images received by the system prior to transformation.

According to another embodiment of method 1500, the training comprises applying a multi-task loss function defined on each transformed anatomical pattern as $L=\lambda_{cls}L_{cls}+\lambda_{rec}L_{re}$ where $\lambda_{cls}$ and $\lambda_{rec}$ regulate the weights of classification and reconstruction losses, respectively.

According to another embodiment of method 1500, the system comprises an encoder-decoder network; and wherein the method further comprises fine-tuning the trained encoder-decoder network for target segmentation tasks.

According to another embodiment of method 1500, the system comprises an encoder-decoder network. According to such an embodiment, the method further includes fine-tuning the trained encoder-decoder network for target classification and segmentation tasks.

According to a particular embodiment, there is a non-transitory computer-readable storage medium having instructions stored thereupon that, when executed by a system having at least a processor and a memory therein, the instructions cause the system to perform operations including: cropping 2D patches or cropping 3D cubes from similar patient scans received at the system as input; transforming each anatomical pattern represented within the cropped 2D patches or the cropped 3D cubes to generate transformed 2D anatomical patterns or transformed 3D anatomical patterns; performing a self-classification operation of the transformed anatomical patterns by formulating a C-way multi-class classification task for representation learning; performing a self-restoration operation by recovering original anatomical patterns from the transformed 2D patches or transformed 3D cubes having transformed anatomical patterns embedded therein to learn different sets of visual representation; and providing a semantics-enriched pre-trained model having a trained encoder-decoder structure with skip connections in between based on the performance of the self-discovery operation, the self-classification operation, and the self-restoration operation.

Figure 16:
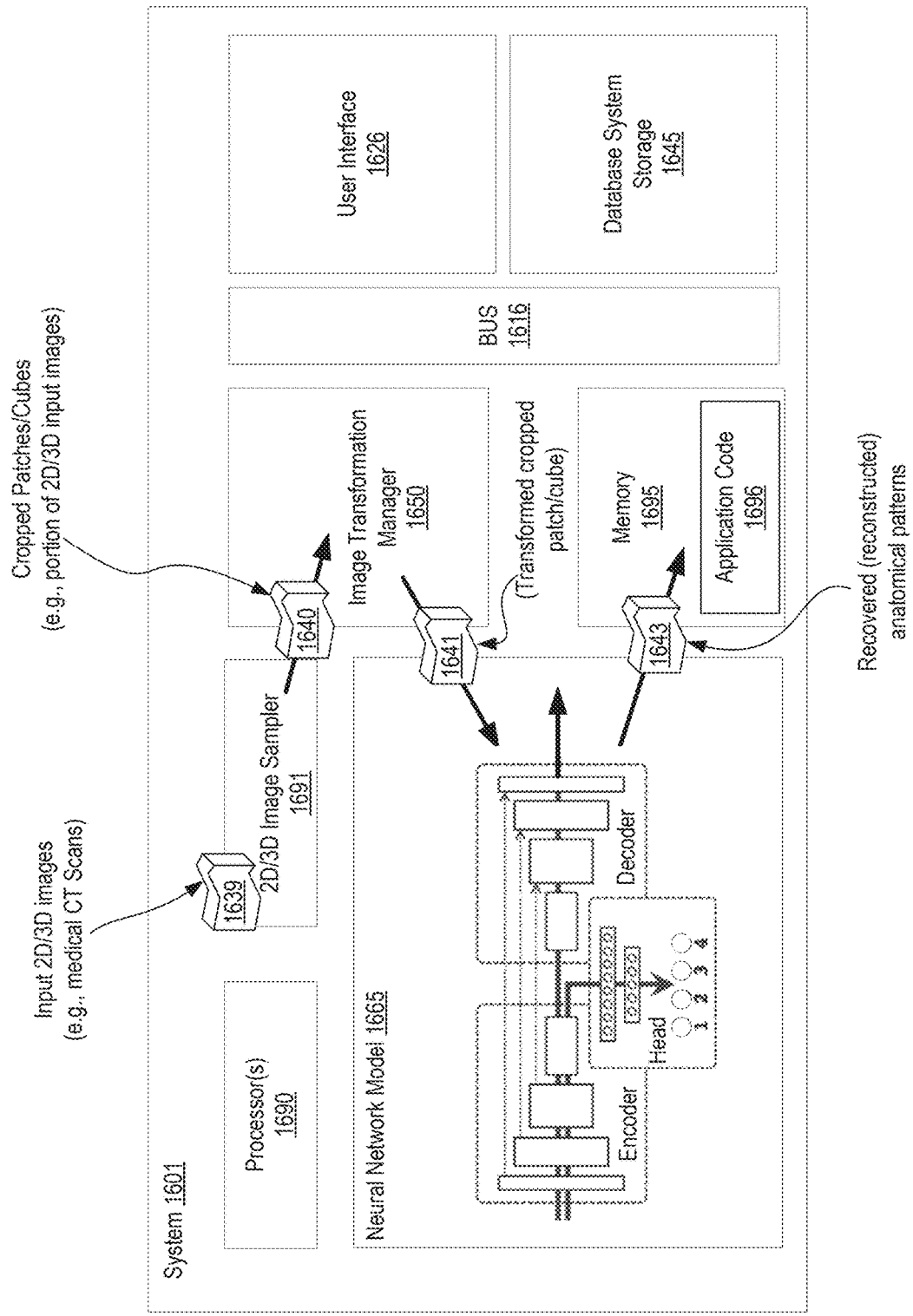
FIG. 16 shows a diagrammatic representation of a system within which embodiments may operate, be installed, integrated, or configured, in accordance with described embodiments.

FIG. 16 shows a diagrammatic representation of a system 1601 within which embodiments may operate, be installed, integrated, or configured. In accordance with one embodiment, there is a system 1601 having at least a processor 1690 and a memory 1695 therein to execute implementing application code 1696. Such a system 1601 may communicatively interface with and cooperatively execute with the benefit of remote systems, such as a user device sending instructions and data, a user device to receive as an output from the system 1601 a semantics-enriched pre-trained model having a trained encoder-decoder structure with skip connections in between based on the performance of the self-discovery operation, a self-classification operation, and a self-restoration operation as performed by the system 1601, or systems within a networked or within a client-server environment, etc.

According to the depicted embodiment, the system 1601, includes the processor 1690 and the memory 1695 to execute instructions at the system 1601. The system 1601 as depicted here is specifically customized and configured to generate TransVW models through self-supervised learning in the absence of manual labeling, in which the trained TransVW models are then utilized for the processing of medical imaging, in accordance with disclosed embodiments.

According to a particular embodiment, system 1601 is further configured to execute instructions via the processor for cropping a 2D patch or a 3D cube 1640 from each of a plurality of medical images 1639 received at the system 1601 as input. The system 1601 is further configured to execute instructions via the processor for performing a self-discovery operation (e.g., via the neural network model 1665), in which the self-discovery operation crops 2D patches or crops 3D cubes (for instance, via an image transformation manager 1650) from similar patient scans received at the system as input. The system 1601 is further configured to execute instructions via the processor for transforming each anatomical pattern represented within the cropped 2D patches or the cropped 3D cubes 1641 to generate transformed 2D anatomical patterns or transformed 3D anatomical patterns. The system 1601 is further configured to execute instructions via the processor for performing a self-classification operation of the transformed anatomical patterns by formulating a C-way multi-class classification task for representation learning. The system 1601 is further configured to perform a self-restoration operation by recovering original anatomical patterns from the transformed 2D patches or transformed 3D cubes having transformed anatomical patterns embedded therein to learn different sets of visual representation. The system 1601 is further configured to provide a semantics-enriched pre-trained model having a trained encoder-decoder structure with skip connections in between based on the performance of the self-discovery operation, the self-classification operation, and the self-restoration operation.

The model output manager may further transmit output back to a user device or other requestor, for example, via the user interface 1626, or such information may alternatively be stored within the database system storage 1645 of the system 1601.

According to another embodiment of the system 1601, a user interface 1626 communicably interfaces with a user client device remote from the system and communicatively interfaces with the system via a public Internet.

Bus 1616 interfaces the various components of the system 1601 amongst each other, with any other peripheral(s) of the system 1601, and with external components such as external network elements, other machines, client devices, cloud computing services, etc. Communications may further include communicating with external devices via a network interface over a LAN, WAN, or the public Internet.

FIG. 17 illustrates a diagrammatic representation of a machine 1701 in the exemplary form of a computer system, in accordance with one embodiment, within which a set of instructions, for causing the machine/computer system to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1701 includes a processor 1702, a main memory 1704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1718 (e.g., a persistent storage device including hard disk drives and a persistent database and/or a multi-tenant database implementation), which communicate with each other via a bus 1730. Main memory 1704 includes an encoder-decoder network 1724 (e.g., such as an encoder-decoder implemented via a neural network model) for performing self-learning operations on transformed 3D cropped samples provided via the cropped sample transformation manager 1723, so as to pre-train an encoder-decoder network within a semantics enriched model 1725 for use with processing medical imaging in support of the methodologies and techniques described herein. Main memory 1704 and its sub-elements are further operable in conjunction with processing logic 1726 and processor 1702 to perform the methodologies discussed herein.

Processor 1702 represents one or more specialized and specifically configured processing devices such as a microprocessor, central processing unit, or the like. More particularly, the processor 1702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1702 may also be one or more special-purpose processing devices such as an application-specific integrated circuit (ASIC), a field programmable gate array (FPGA), a digital signal processor (DSP), network processor, or the like. Processor 1702 is configured to execute the processing logic 1726 for performing the operations and functionality which is discussed herein.

The computer system 1701 may further include a network interface card 1708. The computer system 1701 also may include a user interface 1710 (such as a video display unit, a liquid crystal display, etc.), an alphanumeric input device 1712 (e.g., a keyboard), a cursor control device 1713 (e.g., a mouse), and a signal generation device 1716 (e.g., an integrated speaker). The computer system 1701 may further include peripheral device 1736 (e.g., wireless or wired communication devices, memory devices, storage devices, audio processing devices, video processing devices, etc.).

The secondary memory 1718 may include a non-transitory machine-readable storage medium or a non-transitory computer readable storage medium or a non-transitory machine-accessible storage medium 1731 on which is stored one or more sets of instructions (e.g., software 1722) embodying any one or more of the methodologies or functions described herein. The software 1722 may also reside, completely or at least partially, within the main memory 1704 and/or within the processor 1702 during execution thereof by the computer system 1701, the main memory 1704 and the processor 1702 also constituting machine-readable storage media. The software 1722 may further be transmitted or received over a network 1720 via the network interface card 1708.

FIG. 18 depicts a flow diagram illustrating a method 1800 for the generation of trained AI models generally and trained deep CNN (Convolutional Neural Networks) type models more specifically, through self-supervised learning in the absence of manual labeling, in which such models are then utilized for the processing of medical imaging, in accordance with disclosed embodiments.

With reference to the method 1800 depicted at FIG. 18, there is a method performed by a system specially configured for the generation of TransVW models through self-supervised learning in the absence of manual labeling, in which the trained TransVW models are then utilized for the processing of medical imaging. Such a system may be configured with at least a processor and a memory to execute specialized instructions which cause the system to perform the following operations:

At block 1805, processing logic receives a plurality of medical images for processing by the system.

At block 1810, processing logic crops a 2D patch or a 3D cube from each of the images.

At block 1815, processing logic transforms each of the cropped 2D patches or 3D cubes.

At block 1820, processing logic performs a self-discovery operation of anatomical patterns by building a set of the anatomical patterns from the transformed 2D patches or transformed 3D cubes.

At block 1825, processing logic performs a self-classification operation of the anatomical patterns.

At block 1830, processing logic performs a self-restoration operation of the anatomical patterns.

At block 1835, processing logic outputs a semantics-enriched pre-trained AI model having a trained encoder-decoder structure with skip connections in between based on the performance of the self-discovery operation, the self-classification operation, and the self-restoration operation.

According to another embodiment of method 1800, performing the self-discovery operation of visual words further comprises the system having therein an auto-encoder network which is first trained with training data, which learns an identical mapping from scan to itself, to extract deep features of each patient scan.

According to another embodiment of method 1800, the auto-encoder network, once trained, is utilized as a feature extractor, wherein the latent representation vector from the trained auto-encoder network is used as an indicator of each patient.

According to another embodiment of method 1800, performing the self-discovery operation of visual words further comprises: randomly anchoring one patient as a reference; and searching for the nearest neighbors to the randomly anchored patient through the entire dataset of received medical images by computing an L2 distance of the latent representation vectors to determine a set of semantically similar patients.

According to another embodiment, method 1800 further includes: extracting visual words from the consistent and recurring anatomies across patients represented within the received medical images according to the coordinates, each defining a unique visual word.

According to another embodiment, method 1800 further includes: cropping the instances of a visual word from a random but fixed coordinate across this set of discovered patients sharing similar semantics.

According to another embodiment, method 1800 further includes: assigning a unique visual word ID to the instances of the visual word.

According to another embodiment, method 1800 further includes: computing similarity of the shared semantics at the patient-level to promote balance between the diversity and consistency of anatomical patterns.

According to another embodiment, method 1800 further includes: iteratively repeating the self-discovery operation of visual words to automatically generate a dataset of visual words associated with their pseudo labels, which are extracted from C number of random unique coordinates for use with a subsequent representation learning operation.

According to another embodiment of method 1800, transforming the visual words to generate transformed visual words comprises applying one or more of the following transformations: a non-linear transformation; a local-shuffling transformation; an out-painting transformation; and an in-painting transformation.

According to another embodiment of method 1800, each of the visual words carry local information defining anatomical features selected from the group comprising: anterior ribs 2 through 4; anterior ribs 1 through 3; right pulmonary artery; and Left Ventricle (LV).

According to another embodiment of method 1800, the C-way multi-class classification task causes the trained model to learn from the visual words across the plurality of medical images received at the system characterized by a deep semantically enriched representation.

According to another embodiment of method 1800, the system comprises an encoder-decoder network with a classification head at the end of the encoder; wherein a self-classification branch of the network encodes the input visual word into a latent space followed by a sequence of fully-connected (fc) layers; and wherein the classification branch predicts the Visual word ID associated with the visual word.

According to another embodiment of method 1800, the classification branch classifies the visual words by applying a categorical cross-entropy loss function.

According to another embodiment of method 1800, the system comprises an encoder-decoder network; wherein a restoration branch of the network encodes the transformed visual words into a latent space; and wherein the restoration branch decodes the transformed visual words back to an original resolution from the latent space to recover each the original visual words from a corresponding transformed visual word.

According to another embodiment of method 1800, the restoration branch restoration branch is trained by minimizing an L2 distance between original visual words and reconstructed visual words.

According to another embodiment of method 1800, the training comprises applying a multi-task loss function defined on each transformed visual word as $\mathcal{L} = \lambda_{cls} \mathcal{L}_{cls} + \lambda_{rec} \mathcal{L}_{rec}$, where $\lambda_{cls}$ and $\lambda_{rec}$ regulate the weights of classification and reconstruction losses, respectively.

According to another embodiment of method 1800, the system comprises an encoder-decoder network; and wherein the method further comprises fine-tuning the trained encoder-decoder network for target segmentation tasks.

According to another embodiment of method 1800, the system comprises an encoder-decoder network; and further in which the method further includes fine-tuning the trained encoder network for target classification tasks.

Without loss of generality and for simplicity of representation, within an exemplary chest X-ray, the sophisticated anatomy of the lungs yields consistent and recurring anatomical patterns across X-rays in healthy or diseased images of lungs, which are referred to as "visual words." TransVW or "transferable visual words" is able to learn generalizable image representation from these consistent anatomical patterns without expert annotations, and transfer the learned deep model to application-specific target models.

Medical imaging protocols typically focus on bodily region of interest for specific clinical purposes, resulting in images of similar anatomy—e.g., the lungs in the case of chest, exhibiting complex, consistent, and recurring patterns across acquired images (see FIGS. 1A-1E); the recurrent anatomical patterns in medical images are associated with rich semantic knowledge about the human body, thereby offering great potential to foster deep semantic representation learning and produce more powerful models for various medical applications. Described methodologies therefore leverage the concept that the sophisticated, recurrent patterns in medical images are anatomical visual words, which can be automatically discovered from unlabeled medical image data, serving as strong yet free supervision signals for deep convolutional neural networks (DCNN) to learn disentangled representations, which are not biased to idiosyncrasies of the pre-training task and/or dataset, via self-supervised learning.

Through the application of the above described self-supervised learning framework, described methodologies therefore apply and perform (a) self-discovery, (b) self-classification, and (c) self-restoration of visual words for learning general-purpose image representations.

For instance, first, a pre-trained feature extractor (K.) (e.g., an auto-encoder) is utilized to compute deep latent feature vectors of unlabeled training images. Then, for discovering each visual word, processing selects a random reference patient, finds similar patients based on deep latent features, crops instances of visual word from a random yet fixed coordinate, and assigns a unique visual word ID to them. Instances of visual words may be extracted at different random coordinates and yet exhibit great similarity and consistency among discovered instances of each visual word across instances.

As an output, the described self-discovery methodology automatically generates a curated dataset of visual words associated with semantically meaningful labels, providing a free and rich source for training deep models to learn semantic representations. In order to do so, processing perturbs visual words with g(·) and give the perturbed visual words as input to an encoder-decoder network with skip connections in between and a classification head at the end of the encoder. Further processing then trains the network to learn a diverse and high-level representation by classifying visual word IDs and restoring the original visual words, resulting in more comprehensive pre-trained models, named TransVW.

Thus, according to such embodiments, an exemplary self-supervised learning framework has three components: (1) A novel self-discovery scheme that automatically builds a well-balanced and diversified dataset of visual words, associated with semantically meaningful labels, directly from medical images, (2) A unique self-classification branch, with a small computational overhead, compels the model to learn semantics from the consistent and recurring visual words discovered during the self-discovery phase, and (3) A self-restoration branch that leverages the context of visual words for learning complementary representation to that learned from the self-discovery and self-classification.

The resulting framework may thus be referred to as transferable visual words (TransVW) since the learned image representations through visual words can be transferred to a broad variety of target tasks providing a novel scalable unsupervised approach to automatically build a set of anatomical visual words from unlabeled medical images in any modality and a new pretext task that, when utilized, results in an annotation-efficient pre-trained model, which achieves better performance than prior known models, reduces training time, and reduces the annotation efforts required in comparison with previously known the state-of-the-art (SOTA) methodologies.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
    a memory to store instructions;
    a processor to execute the instructions stored in the memory;
    a receive interface to receive a plurality of unlabeled medical images obtained from a plurality of human patients;
    wherein the system is specially configured to perform self-supervised learning for an artificial intelligence (AI) model in the absence of manually labeling the plurality of unlabeled medical images, by executing instructions via the processor for:
    selecting a subset of the plurality of unlabeled medical images, corresponding to similar patients, based on deep latent features therein;
    extracting two-dimensional (2D) patches or three-dimensional (3D) cubes each representing an appearance of an anatomical pattern reoccurring at fixed coordinates across each of the selected subset of the plurality of unlabeled medical images, and assigning one of a plurality of labels to each of the 2D patches or 3D cubes based on their fixed coordinates;
    transforming each of the 2D patches or 3D cubes to generate transformed 2D patches or transformed 3D cubes, respectively
        by perturbing each of the plurality of anatomical patterns resulting in a plurality of perturbed anatomical patterns;
    performing, via an encoder-decoder network having skip connections in between and a classification head at an end of the encoder, a self-classification operation on the plurality of perturbed anatomical patterns by formulating a multi-class classification task that discriminates among the plurality of perturbed anatomical patterns based on their respective label to learn anatomical pattern semantics from the plurality of perturbed anatomical patterns and generate a corresponding plurality of latent representations;
    performing a self-restoration operation that receives the plurality of latent representation and recovers the corresponding plurality of anatomical patterns from the plurality of perturbed anatomical patterns to learn image representation from multiple perspectives and encode anatomical diversity in the plurality of anatomical patterns.

2. The system of claim 1, wherein transforming each of the 2D patches or 3D cubes to generate transformed 2D patches or transformed 3D cubes comprises applying one or more of the following transformations:
    a non-linear transformation;
    a local-shuffling transformation;
    an out-painting transformation; and
    an in-painting transformation.

3. The system of claim 1, wherein each of the assigned labels carry local information defining anatomical features selected from a group consisting of:
- anterior ribs 2 through 4;
- anterior ribs 1 through 3;
- right pulmonary artery; and
- Left Ventricle (LV).

4. The system of claim 1:
- wherein the system further comprises an auto-encoder network;
- wherein a classification branch of the auto-encoder network encodes the plurality of anatomical patterns into a latent space followed by a sequence of fully-connected (fc) layers; and
- wherein the classification branch predicts the label assigned to each of the plurality of anatomical patterns.

5. The system of claim 1, wherein the classification branch classifies the plurality of anatomical patterns by applying a categorical cross-entropy loss function.

6. The system of claim 1:
- wherein the system further comprises an auto-encoder network;
- wherein a restoration branch of the auto-encoder network encodes a transformed anatomical pattern from the transformed 2D patches or transformed 3D cubes into a latent space; and
- wherein the restoration branch decodes the transformed 2D patches or transformed 3D cubes to an original resolution from the latent space to recover each of the plurality of anatomical patterns from a corresponding transformed anatomical pattern.

7. A non-transitory computer-readable storage media having instructions stored thereupon that, when executed by a system having at least a processor and a memory therein, cause the system to perform operations including:
- receiving a plurality of unlabeled medical images;
- wherein the system is specially configured to perform self-supervised learning for an artificial intelligence (AI) model in the absence of manually labeling the plurality of unlabeled images, by performing the following operations:
- selecting a subset of the plurality of unlabeled medical images, corresponding to similar patients based on deep latent features therein;
- extracting 2D patches or 3D cubes each representing an appearance of an anatomical pattern reoccurring at fixed coordinates across each of the selected subset of the plurality of unlabeled medical images, and assigning one of a plurality of labels to each of the 2D patches or 3D cubes based on their fixed coordinates;
- transforming each of the 2D patches or 3D cubes to generate transformed 2D patches or transformed 3D cubes, respectively
  - by perturbing each of the plurality of anatomical patterns resulting in a plurality of perturbed anatomical patterns;
- performing, via an encoder-decoder network having skip connections in between and a classification head at an end of the encoder, a self-classification operation on the plurality of perturbed anatomical patterns by formulating a multi-class classification task that discriminates among the plurality of perturbed anatomical patterns based on their respective label to learn anatomical pattern semantics from the plurality of perturbed anatomical patterns and generate a corresponding plurality of latent representations;
- performing a self-restoration operation that receives the plurality of latent representations and recovers the corresponding plurality of anatomical patterns from the plurality of perturbed anatomical patterns to learn image representation from multiple perspectives and encode anatomical diversity in the plurality of anatomical patterns.

8. A method performed by a system having at least a processor and a memory therein to execute instructions, wherein the method comprises:
- receiving a plurality of unlabeled medical images;
- wherein the system is specially configured to perform self-supervised learning for an artificial intelligence (AI) model in the absence of manually labeling the plurality of unlabeled medical images, by performing the following operations:
- selecting a subset of the plurality of unlabeled medical images, corresponding to similar patients based on deep latent features therein;
- extracting two-dimensional (2D) patches or three-dimensional (3D) cubes each representing an appearance of an anatomical pattern reoccurring at fixed coordinates across each of the selected subset of the plurality of unlabeled medical images, and assigning one of a plurality of labels to each of the 2D patches or 3D cubes based on their fixed coordinates;
- transforming each of the 2D patches or 3D cubes to generate transformed 2D patches or transformed 3D cubes, respectively
  - by perturbing each of the plurality of anatomical patterns resulting in a plurality of perturbed anatomical patterns;
- performing, via an encoder-decoder network having skip connections in between and a classification head at an end of the encoder, a self-classification operation on the plurality of perturbed anatomical patterns by formulating a multi-class classification task that discriminates among the plurality of perturbed anatomical patterns based on their respective label to learn anatomical pattern semantics from the plurality of perturbed anatomical patterns and generate a corresponding plurality of latent representations;
- performing a self-restoration operation that receives the plurality of latent representations and recovers the corresponding plurality of anatomical patterns from the plurality of perturbed anatomical patterns to learn image representation from multiple perspectives and encode anatomical diversity in the plurality of anatomical patterns.

* * * * *